US012623589B2

(12) United States Patent
Rodriguez Barros

(10) Patent No.: US 12,623,589 B2
(45) Date of Patent: May 12, 2026

(54) INDIRECT VISION SYSTEM WITH HIDDEN POLYFUNCTIONAL REFLECTOR SYSTEM FOR VEHICLES

(71) Applicant: Alejandro Rodriguez Barros, Mataro (ES)

(72) Inventor: Alejandro Rodriguez Barros, Mataro (ES)

( * ) Notice: Subject to any disclaimer, the term of this patent is extended or adjusted under 35 U.S.C. 154(b) by 170 days.

(21) Appl. No.: 18/699,316

(22) PCT Filed: Oct. 6, 2022

(86) PCT No.: PCT/ES2022/070635
§ 371 (c)(1),
(2) Date: Apr. 8, 2024

(87) PCT Pub. No.: WO2023/057676
PCT Pub. Date: Apr. 13, 2023

(65) Prior Publication Data
US 2025/0222857 A1 Jul. 10, 2025

(51) Int. Cl.
| | |
|---|---|
| *B60Q 1/26* | (2006.01) |
| *B60Q 1/00* | (2006.01) |
| *B60Q 1/34* | (2006.01) |
| *B60Q 1/50* | (2006.01) |
| *B60R 1/06* | (2006.01) |

(Continued)

(52) U.S. Cl.
CPC ......... *B60Q 1/2665* (2013.01); *B60Q 1/0023* (2013.01); *B60Q 1/2696* (2013.01); *B60Q 1/34* (2013.01); *B60Q 1/525* (2013.01); *B60R 1/06* (2013.01); *F21S 43/14* (2018.01); *F21S 43/31* (2018.01); *F21S 43/50* (2018.01); *F21V*

*7/06* (2013.01); *B60Q 2400/50* (2013.01); *F21W 2103/25* (2018.01); *F21W 2103/60* (2018.01);

(Continued)

(58) Field of Classification Search
CPC .................................................... B60Q 1/2665
See application file for complete search history.

(56) References Cited

U.S. PATENT DOCUMENTS

| | | | |
|---|---|---|---|
| 7,677,775 B2 * | 3/2010 | Oehmann | B60R 1/1207 362/135 |
| 2005/0276058 A1 * | 12/2005 | Romas | B60Q 1/2665 362/494 |

(Continued)

FOREIGN PATENT DOCUMENTS

| | | |
|---|---|---|
| EP | 0955208 A1 | 5/1999 |
| EP | 2441620 A1 | 4/2012 |

OTHER PUBLICATIONS

International Search Report; Nov. 30, 2022.

*Primary Examiner* — Eric T Eide
(74) *Attorney, Agent, or Firm* — Patshegen IP; Moshe Pinchas

(57) ABSTRACT

Indirect vision system VIS comprises mirrors and/or cameras and a mixed-function multi-focal multi-functional DS light signal device having the reflector 50 and its associated source hidden under an opaque cover Hi capable of developing an illuminating surface 3 with a line design or luminous perimeter figures, associate and combine within the light perimeter, under the Hi cover, in the H casing or in the structure, other devices and functional subassemblies. With aerodynamic profile associated with protecting and improving the perception of light signal.

19 Claims, 35 Drawing Sheets

(51) Int. Cl.

| | |
|---|---|
| *F21S 43/14* | (2018.01) |
| *F21S 43/31* | (2018.01) |
| *F21S 43/50* | (2018.01) |
| *F21V 7/06* | (2006.01) |
| *F21W 103/25* | (2018.01) |
| *F21W 103/60* | (2018.01) |
| *F21Y 115/10* | (2016.01) |
| *F21Y 115/30* | (2016.01) |

(52) U.S. Cl.

CPC ........ *F21Y 2115/10* (2016.08); *F21Y 2115/30* (2016.08)

(56) References Cited

U.S. PATENT DOCUMENTS

| | | | | |
|---|---|---|---|---|
| 2011/0001428 A1* | 1/2011 | Rodriguez | ............ | B60R 1/1207 |
| | | | | 362/519 |
| 2011/0074958 A1* | 3/2011 | Pastrick | ................... | B60Q 1/48 |
| | | | | 348/148 |
| 2012/0075879 A1* | 3/2012 | Uematsu | ................ | B60Q 1/381 |
| | | | | 362/540 |
| 2014/0176715 A1 | 6/2014 | Pastrick et al. | | |

* cited by examiner

DL

Li 1 bis

E1

E0

150   155

PL

6B

30 =F

13

12

20

150

10

1 bis

1

PL

E1

LI

D3

LIR

12-X

Lir

D1

12

150

238

238

230

244

232

234

245

E1

DL

LI

PL

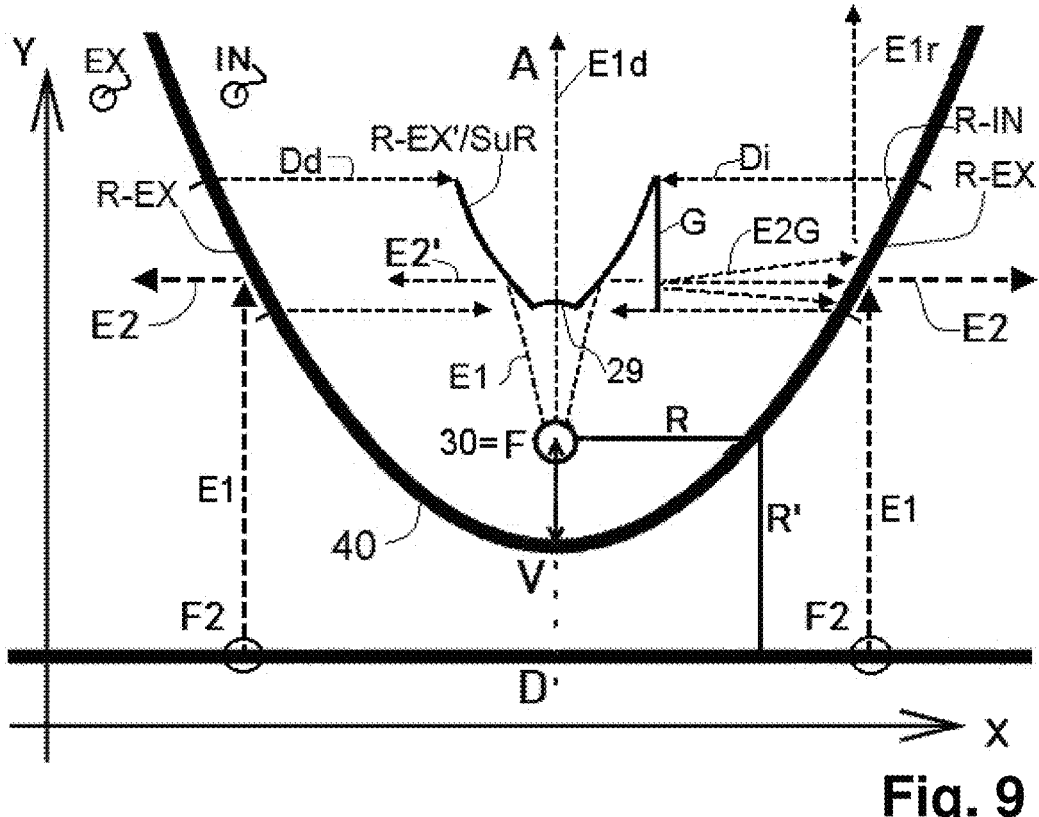
Fig. 9
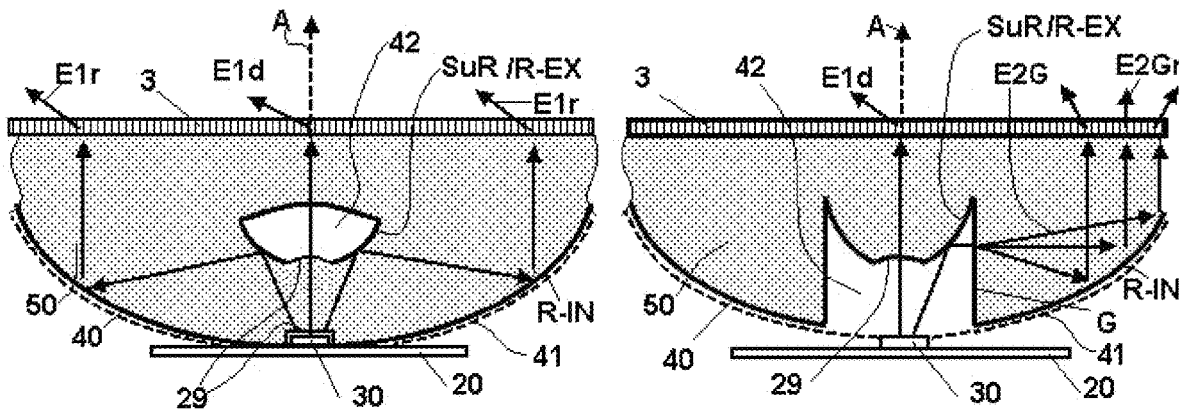
Fig. 10a                                    Fig. 10b

Fig. 18a
Fig. 18b
Fig. 18c
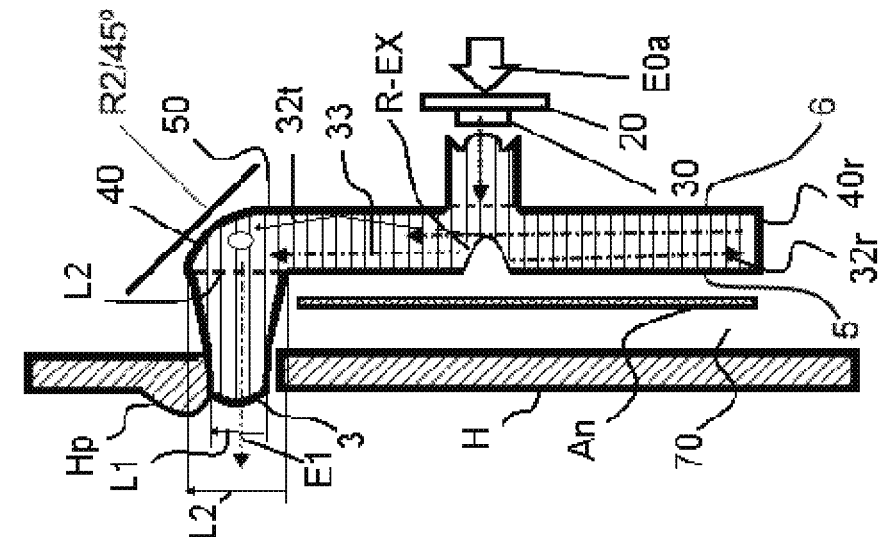
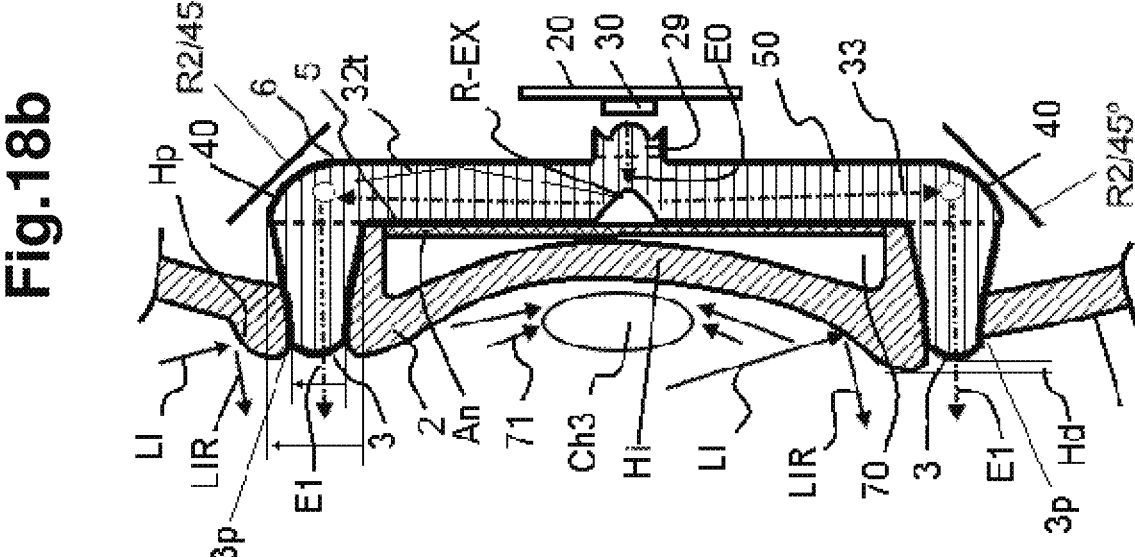
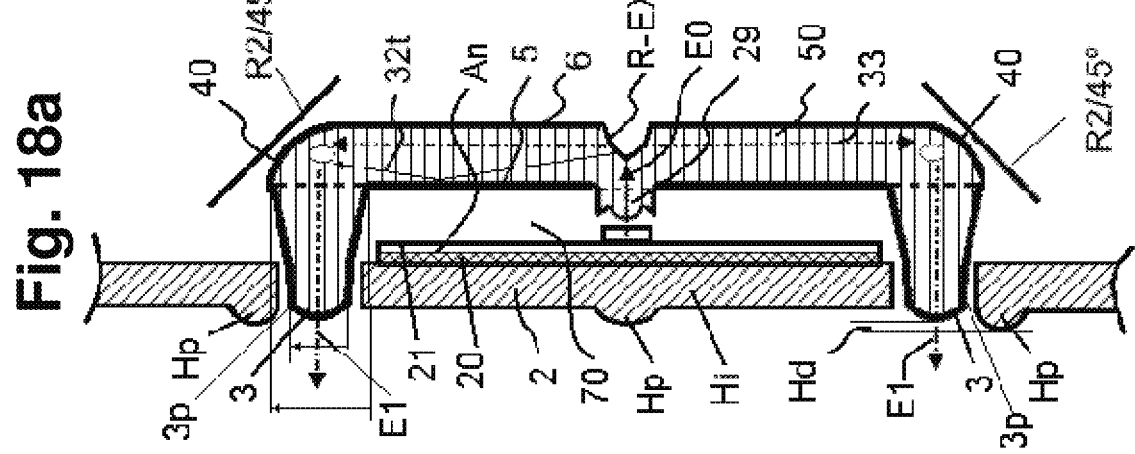

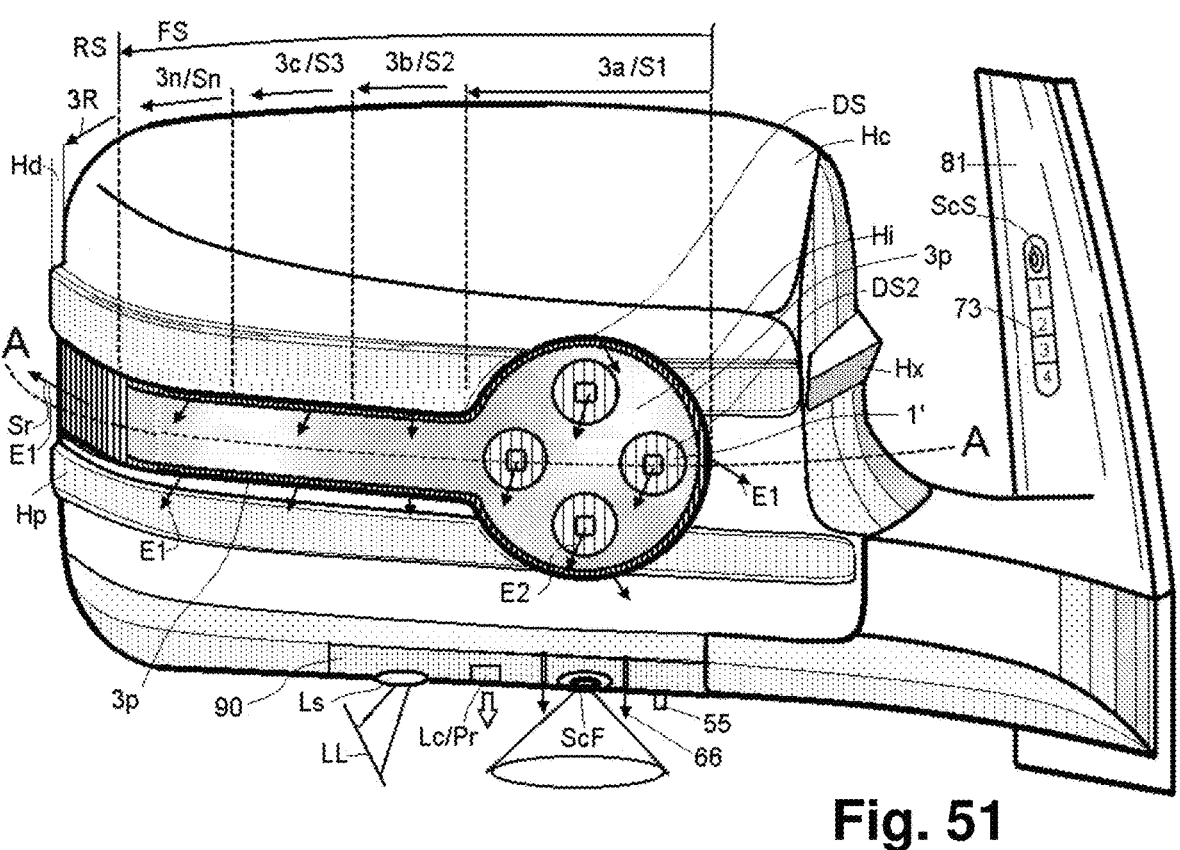
Fig. 51
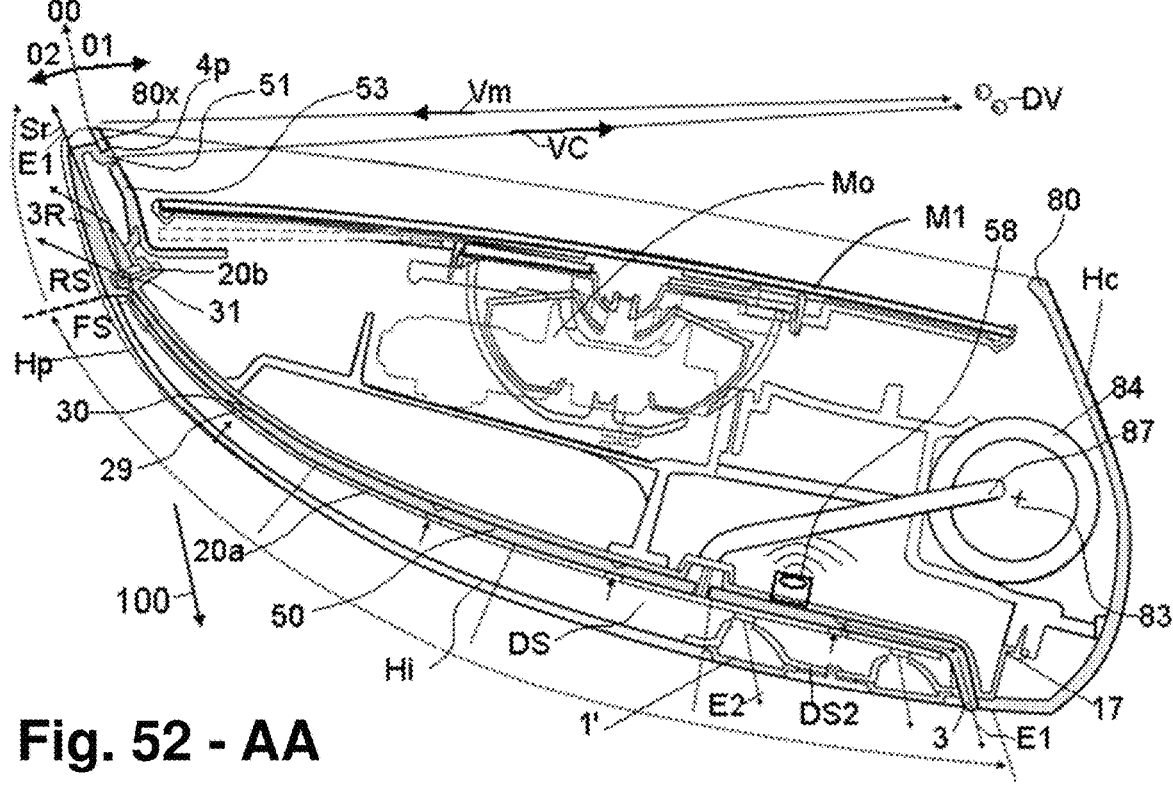
Fig. 52 - AA

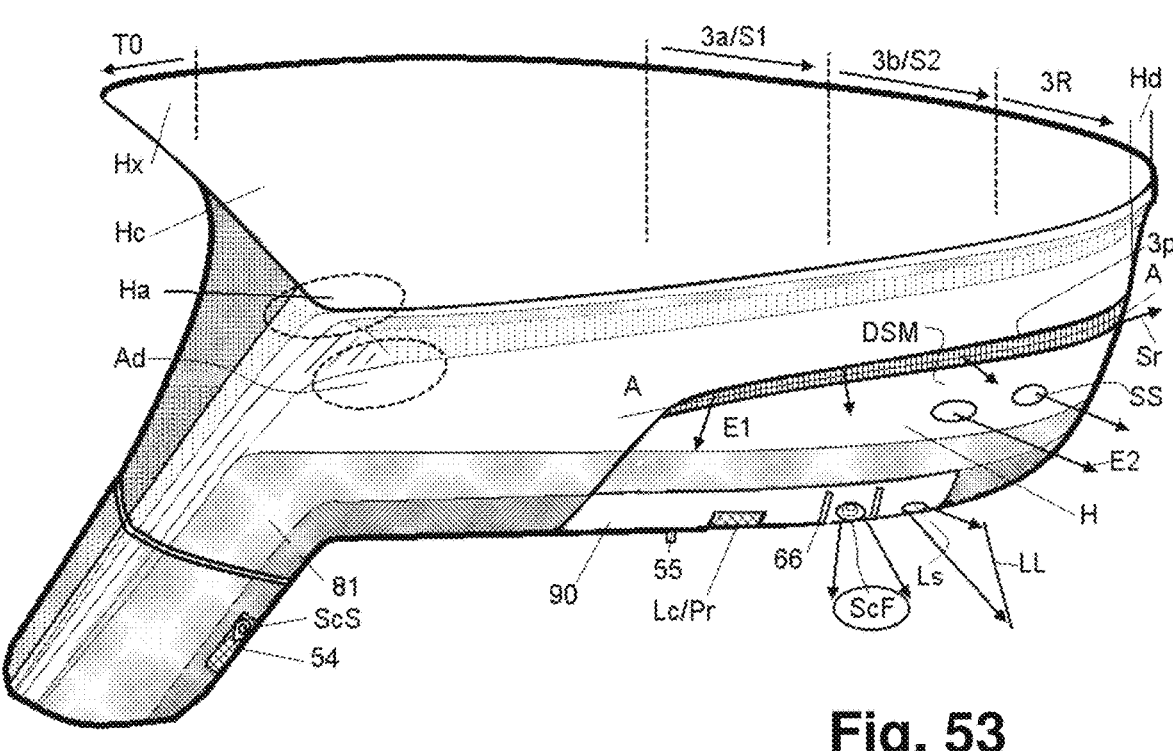
Fig. 53
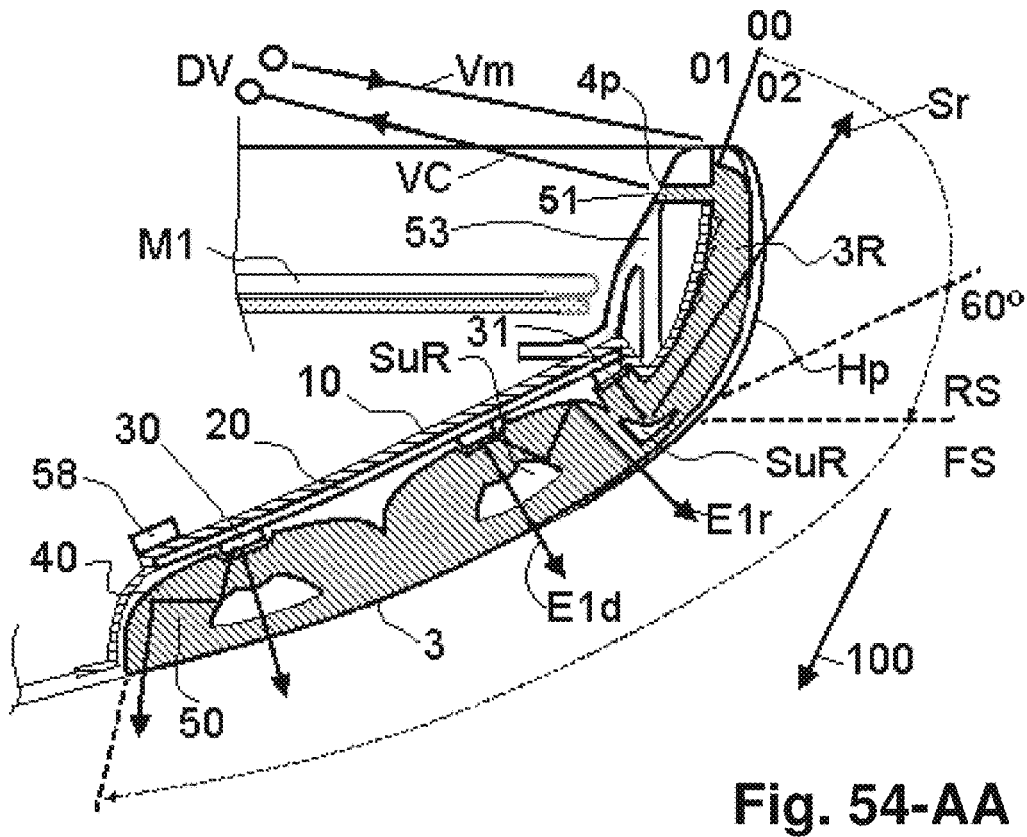
Fig. 54-AA

INDIRECT VISION SYSTEM WITH HIDDEN POLYFUNCTIONAL REFLECTOR SYSTEM FOR VEHICLES

FIELD OF THE ART

Indirect vision system with multifunctional hidden reflector signal for vehicles, comprising:

A structure formed by a casing body, a frame and a support arm fixed to the body, at least one opening that defines said frame occupied by a rearview mirror, a camera and/or a combination thereof to reflect, capture or transmit images.

A multifunctional device emitting at least one light signal.

It concerns in particular an indirect vision system for the side of a vehicle with a multifunctional, multifocal signal device that generates at least one light signal and several other combined functions of mixed activation, based on a complex optical-reflector body comprising:

A main reflective substrate associated with a multipoint light source arranged as a second internal skin hidden under an opaque cover to be free from the incidence of external stray light, improving signal concentration and perception.

Said main reflector is a tangential reflecting substrate in the shape of a transparent elongated ribbon with internal reflection means, divided into sectors with at least one entry point of the associated source light per sector that are integrated into a single one, A linear illuminating surface that forms a gap in at least part of the perimeter of the cover that hides the reflector, both cover and illuminating surface occupy an opening that is the surface of the housing that contains them.

Said optical body has two parts, on the one hand the main reflecting substrate with a transverse main focal ray-axis in each sector and, on the other hand, an inclined surface as a secondary reflector with an advanced profile that ultimately forms an illuminating surface that defines at least one light line with a horizontal emission focal axis; said illuminating surface is always forward of the secondary reflector, the primary reflector and source being concealed in an angled position substantially perpendicular to said advanced profile, capable of:

Develop designs of open, closed, continuous, discontinuous luminous perimeter figures or their combination corresponding to the shape of said inclined surface.

Emit signal in three different illuminated field areas;

Two external ones, front-lateral multifocal and rear monofocal, not visible to the driver of the vehicle, A third internal zone by an independent illuminating surface visible to the driver of the vehicle, Performing the same device more than one function, capable of exchanging said cover and associating other devices or functional subassemblies under said cover, inside or outside said luminous perimeter figures or in different parts of the structure of said indirect vision system.

STATE OF THE PRIOR ART

Indirect vision systems that have lights and signals, or "blinker", (market name derived from the English for the turn signal in the external mirror) are known in the state of the art.

These systems have a structure projected into a vacuum on the side of the vehicle and offer the advantage of applying functional devices to "see and be seen", emitting signals to the front, side and rear, (previously it was indicated with the arm) and at the same time capture or reflect images of the environment directly by a mirror or indirect by a camera associated with a monitor. They also occupy an exterior area associated with the doors and locks to access the vehicle.

It is known that said blinkers emit a signal in one or two areas on the side of the vehicle with a signal field in front and behind that is not visible to the eyes of the driver or if it is visible that does not bother the eyes of the driver but this part of vision is still an uncontrolled parasitic light that can be dangerous on rainy or foggy days or in total darkness.

The blinker, due to being in a structure projected into a vacuum, also has NON resolved problems:

Receives the incidence of light from the environment in the horizontal and superior plane, —The light emitted, in many situations, is less than the ambient light received, especially during the day. The official requirement for luminous intensity in the focal axis and photometry measurement angle for this type of signal is low, 0.6 cd candela. (class 5 device Official Approval Regulation R6, ECE/UN), consequently, the external incident light that is introduced into the reflectors, parabolas, light guides or any reflective optical body is greater than the signal emitted in almost all angles It has little space and interior volume due to the movement of the mirror and its motors.

Offers NON desired aerodynamic resistance, increases noise, turbulence and consumption.

The convex shape of the structure's shell always has part of its surface exposed to a perpendicular ray of external incident light, which becomes external stray light.

The light guides, used as a transmitting reflector, are always exposed to the incidence of external light due to their larger surface area. They comprise a curved transparent tube that copies the curve of the surface of the housing that contains it, the illuminating surface (transparent surface or translucent through which it emits the signal) and its reflector is larger than the coupling surface on the focal axis of the light source. they have;

a light source coupled at one end, works as a light reflector-distributor along its length, with facets, prisms, or engraved reflection surfaces on a side face, bottom of said tube, emits by reflection in said facets or prisms when the light changes direction perpendicular to the axis of the source, and emits said signal on the other lateral side, or illuminating surface, and also a part towards the back at the end of the tube. Said light guide, the light as it travels along it loses intensity because the transmittance of the material is reduced and due to said reflective facets; and at the same time, the illuminating surface captures all the external incident light because it always receives some external ray perpendicular to it.

The light guide is an extended emitter traveled by light along that loses light along, but it is also an extended reflector exposed to external incident light that gains external light along; For example, if you have a 10 lumen light source at the entrance and 100 reflection points and each one emits the equivalent of 0.1 lumen and also a part is refracted in the opposite direction to the one reflected and is absorbed by the reflector or the nearby background, which is a channel that surrounds it from below, and creates an opposite effect, the light guide has a very large surface to receive the incidence of external light, FIGS. 4-6.

Said external incident light is easily introduced into said transparent tube and is reflected in the exposed prisms and facets to take the opposite path to the signal emission, producing a disordered and diffuse internal parasitic light; The lack of compensation between parasitic emitted and received light counteracts signal perception and it is demonstrated that the light guide is not the best element for signal perception applied to a rearview mirror housing.

In the state of the art we observe documents (Docs) of mirror devices with luminous signal, all have some type of reflector to produce the technical effect of reflecting, distributing and directing the emitted light and all are in some way exposed to stray light. external incident.

Any device of the luminaire, lantern or flashlight type that has its basic concept:

a light source a reflector based on some form of reflective parabola, and a totally transparent or translucent illuminating surface. We explain this concept in FIG. 7, it is known that a parabolic reflecting mirror formulates (y=n·x2) internal reflection R-IN, where all the rays R emitted from its focus F are reflected in said parabola 40 and emit E1 through a total illuminating surface 3f in a direction parallel to the focal axis A. It is easy to demonstrate the reverse application, (concept of the parabolic mirror of the Newton telescope, the parabolic antenna, or solar cooker), where all the incident rays LI of an external ambient light DL are reflected and converge as parasitic light PL in said focus F, if the light emitted E1 by the focus F is similar to the received LI, the signal is not perceived, this principle partly occurs in the blinker with hollow reflectors with conical or parabolic curves 40 and also when exposed or collimated transparent solid reflectors are applied as the light guides.

In FIG. 8 we recreate the concept of this patent that concerns enclosing in a signal device with a parabolic reflector 40 or its variants (collimator, light guides) all the light from the source that is emitted at the focus F between two surfaces of tangential reflection 5 and 6 to form a reflective substrate 50 with a flattened parabolic profile that presents a figure with a perimeter where two sides are differentiated, on one side a reflective parabola shape 40 and on the other a linear surface that is the illuminating surface 3.

This substrate 50 includes the means to couple and direct the light from the source 30 or focus F in a concentrated manner E1c and is perpendicular to the axis A or coincides according to a radius R, and directs the light to an opposite side where it has a light output illuminating surface 3, with the technical effect of concentrating the light on the substrate and reducing the total illuminating surface 3f to a less linear shape 3, to avoid external incident light LI and produced an internal parasitic reflection R-IN in parabola 40.

Said illuminating surface 3 is linear, concentrated and narrow in the shape of a luminous ribbon and; Said reflector being a substrate makes it easy to hide it from said external incident light under an opaque cover that in this case is part of the casing H, Hc of the structure or its variants.

We observe in:

Doc.1—R & Schefenacker, U.S. Pat. No. 5,774,283. Blinker with a bulb, parabola and illuminating surface, emits in a single forward direction, adds some sensors but the technical effect on the emitted light is not suitable and receives all the external incident light. (prior. Feb. 18, 1998)

Doc.2—R & Schefenacker, US2001010633 EP 1120312, and WO2005/100089. It is a blinker with two parabolas and opposite LEDs oriented to reflect on said parabolas and a large illuminating surface, towards the front, it is observed that it receives all the external incident light and is reflected towards said LEDs in the reverse path as stray light, its application It has been a total failure.

Doc. 3—A. Rodríguez Barros, EP09075388, prior Jul. 12, 2000. It is a divisional of a family of blinker patents EP 1304260A1 is based on a series of parabolas, reflectors, cones and collimators; Although the cones create a shadow delimitation, the majority of the metallized reflector assembly 12 is exposed to the incidence of external light behind the illuminating surface, which is the transparent 1. See FIGS. 205, 206, 207, 211, 213, 215, 216, 217 218.

We observe that to reduce space and adjust to the curved shape of the assembly housing, the technique is applied as a solid transmitting reflector, the light guide, in some cases located as an external surface, which is the worst location with respect to the external incident light. Examples.

Doc. 4-R & Schefenacker, U.S. Pat. No. 6,099,153 corresponds to DE 29804489U prior 08/AU/2000, It is a blinker that has an external light guide that is the same reflector and illuminating surface, the exposure to the external incident light is total, in practice only the part of the signal that emits backwards is seen, the rest is not seen nothing, the incidence of external parasitic light through said illuminating surface is very high.

Doc 5—Donnelly, EP 0967118, U.S. Pat. No. 6,176,602 (prior. Jun. 22, 1998). It belongs to a family of patents, "continuation in part" from U.S. Pat. No. 5,371,659, all in the public domain. They claim the concept of a signal device (32), (30) that emits a pattern backwards with respect to the axis of circulation of the vehicle (66), (72) adding an extra volume to the housing (26) of the rearview assembly located in a position "bottom" lowest and inferior to the level of the mirror (28), that is, it is not behind the mirror moon, it is below a tangential plane lower than said mirror moon 214; This signal is dangerously visible to the driver's eyes, as expressed by his memory of up to 10% of the part from which the light emits FIGS. 1 to 14, and also increases the volume of the mirror assembly, aerodynamic resistance and fuel consumption.

Add a forward and backward emission pattern, FIGS. 21 and 22 when emitting from said lower "bottom" position, reveals that using 2 light guides (230) and (250) without any protection or superimposed transparent cover; The light guides themselves are the external surface so it receives external incident light from all angles.

In FIG. 6 of this patent we recreate FIG. 26 of Donnelly to demonstrate the negative technical effect of the parasitic incident light external PL DL, LI with respect to the light guide 230 which is a decreasing tube that has; a very small light entrance at one end 244, axial reflection facets 238, a light source 232 and a larger exposed surface 234, 245, FIGS. 22 to 26, this guide 230 emits backwards, the parasitic light PL makes the reverse path within said light guide 230 easily, but in addition to emit forwards it needs another independent light guide 250 and another light source 258 therefore requires 2 light guides with two wide surfaces exposed to external incident light from all angles. Its "bottom" position limits the illuminating surface (245) to a single horizontal and straight design, FIGS. 27 and 30, therefore the signal device is attacked by, external incident light LI from all angles, both light guides 230 and 250 and so on for any other variant of reflector that applies this rearview mirror assembly with blinker, in addition the dangerous vision through the driver's eyes and the increase in gasoline consumption has been a failed application. Not only is the external incident light parasitic, but it also passes through the light guide optical bodies 230, 250 and the whole, see FIG. 28, 29 from side to side, results in an ineffective signal during the day.

Doc 6—A. Rodríguez Barros, EP06008490, U.S. Pat. No. 7,255,464, prior. PCT Jun. 22, 2001. It is a division of a family of blinker patents EP 1304260A1 is based on 150 cylindrical tubular light guides, of improved position by being protected by a separate external transparent cover 1, and by a dark background to improve contrast, but they still receive the less in part said external incident light. In FIGS. 4 and 5 of this patent we recreate FIGS. 74-A and 76-B by A Rodríguez Barros, where the operation of said separation D1 of the light guide 150 with respect to the transparent cover 1 is observed and that part of the ambient light DL as external incident light LI is rejected as reflected light LIR but another part NO and is transformed into parasitic light PL within said light guide 150, traveling the opposite path to that of emission and creating a diffuse and disordered internal reflection, even on the internal reflector surface 12 even if it is colored neutral or dark as a result cancels out part of the emitted signal.

Doc.7—Hella EP 03102456 (prior. Aug. 21, 2002) ES2 261 877. It is a blinker that applies two external transparent light guides superimposed on top of each other, therefore the technical effect of external incident light entry is worse.

Doc.8—AUDI EP 1 470 957 (prior. Apr. 25, 2003) DE 10318741. Withdrawn, it is an application for a driver warning signal for blind spot detection, with a double emission intensity, as is also located in the external casing of the indirect vision system, in this case it is possible for different turn signal applications to use the hidden reflector technique of the requested patent to improve the perception of the warning regarding the incidence of external light.

Doc. 9 DE19808139 A1 Magna Auteca Feb. 27, 1998. It is a blinker based on a transparent that reflects on its rear surface surrounded by a neon tube, that is, it emits a diffuse light without a defined axis, it is similar to computer screens, the light is generated by a perimeter neon tube, and this technology dates back to the 1930s/1940s. It is expensive, fragile and, to operate, requires an electronic circuit and a 1500 V current transformer, which increases the weight of the system and the cost. In external incident light it would be similar to placing a computer screen in the sun, the illuminating surface receives all the external incident light and transmits it towards the perimeter of the neon, and nothing is seen. Furthermore, it does not guarantee the emission of a signal in the focal axis towards the back where the Official Approval photometry is carried out. ECE/UN. In reality it was never built.

Lear Automotive Docs U.S. Pat. No. 6,264,353, EP 1133411 refers to a blinker that is installed under the rear-facing mirror glass only. Same as the patent WO 00/26061 Muth Company talks about a turn signal under the mirror glass with no technique on the luminous core like the one presented here, this type of signal is not considered original equipment, it is only a replacement, because it does not It can be approved with the Official ECE/UN Regulations because it is in a moving part of the vehicle, the mirror, its focal axis is not fixed and can also produce dangerous reflections of light in the driver's eyes, especially on rainy days.

It is also an influential part of the state of the art, the official homologation requirement, ECE/UN Regulations, equivalent versions in the USA and Japan, directives and products, now globalized, for vehicle lights.

In the class 1 front or class 2 rear lights of a vehicle (Regulation R48 and R6 UNECE) this phenomenon of lack of signal perception due to external incident stray light is much less because said devices are of high intensity and luminous power and:

They emit in a single focal axis, (in front or behind),

They do not have space problems, they can take up a lot of volume and have thermal, electronic interfaces or sources of greater luminous power than ambient light.

They may be recessed towards the bottom of a large cavity, far from external incident light, It has no problems with knocks (the bumper is before). Comparing the official requirement according to UN/ECE R6 Regulations:

Blinker, side flashing, class 5 is 0.6 cd candela on the focal axis, smaller than ambient light in part.

Lights (front and back), class 1 and 2 greater than the ambient light always. Differences from the "blinker"; For example, a DRL (Daytime running light, white color) R87, ECE/UN, located at the front of the vehicle, requires a photometry of 400 cd candela on the focal axis, that is, 666 times greater than the blinker.

Reality shows that manufacturers, in order to reduce costs, comply with the UN/ECE Official Regulations, R6, for the blinker the required intensity is, (FIG. 1, the panel where the photometry is carried out can be seen at the back of the vehicle), 0.6 cd candelas on the focal axis horizontal angle 5° and plane H=0°, and extends to the side as a "minimum" horizontal angle <60°; that is, the blinker must extend beyond 60° and to take advantage of its potential due to its vacuum position and safety advantage, it is capable of emitting a signal and extending to the front with an illuminated angle of up to 180° or more, then the intensity of the emitted signal is distributed over said extension, which is beyond what is officially required. In practice, this intensity is even lower to such an extent.

From the above it is demonstrated:

1—The disadvantage of the blinker in terms of signal perception in the face of any reflection or ambient light, especially during the day, due to its shape and location, it always has a beam of external incident light perpendicular to its surface, which makes it easier to enter the transparent and The signal is not seen, its technical and objective effect as a signal, especially in the frontal area, loses effectiveness, is nullified and is dangerous.

2—Partial vision of the illuminating surface of the blinker is dangerous and contradictory because it is associated with an element that must be looked at, danger that is noticeable in darkness or rain.

3—In the state of the art, there are NO known signal devices in VIS indirect vision systems with reflecting optical bodies, transmitters, light distributors, hidden and free from the incidence of external light or that carry out the process of transmission, reflection, of light arranged as a second interior skin and also allow obtaining a linear illuminating surface with a reduced width of less than 10 mm. capable of covering designs with a minimum capillary width of approximately 1 mm. and at the same time comply with the light emission intensity required by Official ECE/UN regulations, and also capable of enclosing within a perimeter a space and hollow volume that can be used by associating and combining other devices and functions.

There are also no known devices with mixed dynamic and repetitive activation at the same time and that perform more different functions by changing the activation frequency.

The innovative solutions in this application comprise solutions, on the signal and the structure;

The reflector hidden from the incidence of external stray light.

A narrowing in the signal output phase that prevents external parasitic light and concentrates the emitted one, High intensity throughout the illuminating surface because the emitting focus is close to it and includes sectors such as parabolic reflecting substrates that concentrate and distribute on a substrate of tangential and parabolic reflection all the light from a Lambertian source, that is, with a spherical pattern (Lambert) that LEDs normally emit.

Mixed activation operation, it is capable of having several emitters distributed along the route by sectors and substrates, of being activated by differentiating the emission zone in front of the emission zone towards the back, said focal axes in front can be turned on in a dynamics by sectors in relation to a firing order and off, the device with the longitudinal light guide with light entry at one end and exit at the other is not capable of doing so.

More than one function, the same signal that serves as the turn signal flasher, is capable of being associated with the door handles to provide advance warning of the opening of the doors, to the driver and to the approaching cyclist, or to an automatic braking or pedestrian detection system to indicate to said pedestrian that they are in front of the vehicle in a dangerous situation.

The opaque casing of the system provides an aerodynamic design, supportive of other functions, hiding and protecting from the incidence of eternal light on the signal reflectors, impacts, and also has an advanced shape that organizes the aerodynamic flow, it is capable to offer a second technical effect and advantage by placing in an advanced area towards the driver and the body, by means of an anti-turbulence appendage, an independent operating indicator light closer to the driver's eyes.

The concept of being a second internal skin, with respect to the casing that contains it, allows reducing the general volume of the system, turbulence and consumption.

Is capable of extending in any direction and having an illuminating surface with any linear, straight, curved design, or open or closed perimeter geometric figures.

It has an independent light output based on an optical appendix to assist the driver that uses part of the light from the same light source to locate the mirror to avoid driver stress.

it encloses and is associated with an interchangeable opaque cover that hides said reflector and is capable of containing a small volume in the shape of a substrate, which contains the PCB circuit on one side as a light source and on the other side as an antenna. to receive and/or emit radio frequency waves forming a multifunctional module, You can add, enclose and associate with other devices with other selectable functions between a front camera, a laser emitter, a logo projector, a welcome light, an infrared IR light to support the night vision of said camera, a sensor temperature, a third side surveillance camera that can be remotely monitored by radio frequency, an RFID sensor, or a matrix keypad for an access key to the vehicle or unlocking the locks or activating said surveillance function.

It is necessary to have solutions to the problems that are not covered by the state of the art that we present in this patent application and to provide innovations to improve the product, safety, help the driver and lower the cost by standardizing and unifying functions in modules. Interchangeable poly-functional.

BRIEF DESCRIPTION OF THE INVENTION

The present invention concerns an indirect vision system for the side of a vehicle with a multifunctional mixed multifocal light signal device that has a reflector and light distributor with an associated light source hidden under an opaque cover that is part of the housing. that contains it, or under an independent opaque cover with the technical effect that said reflector is free from the incidence of external stray light to improve the perception of the emitted signal, comprises:

A structure formed by a housing body, a frame and a support fixed to the body with at least one opening where it houses at least one camera, a mirror or a combination thereof.

A multifunctional device is a mixed multifocal signal with a reflective substrate and light source hidden behind an associated opaque cover that leaves a gap in at least part of its perimeter or in the opaque cover itself, said gap comprising the linear illuminating surface derived from the reflective substrate through which it emits a mixed activation light signal, and both cover and illuminating surface occupy an opening in the housing that contains them.

It includes at least two external zones and an internal emission zone with different focuses:

A first external backward zone of repetitive activation synchronized to the first that has a single horizontal focal axis Sr, both zones are capable of functioning and being activated differently, belong to the same signal device, and use the same body element integrated complex reflector optic, A second zone external to the front of dynamic activation with an on and off order of several horizontal focal axes, A third internal zone comprising a small independent illuminating surface 51 that occupies another independent opening 4p located inside the frame 80x of said housing, derived from an optical appendage 52 of said reflecting substrate 50, with a reference focal axis VC directed towards the driver's eyes to help locate the mirror and automate where to look when activating the turn signal, with the effect of avoiding tension and stress. Said first or second external zone is capable of providing a light source to the third internal zone.

All areas are capable of developing various functions by changing the color of light emission or activation frequency or associated in support of other functional systems.

Said multifunctional signal device DS comprises a complex optical-reflector body composed of several parts that have special characteristics, details below, it comprises:

A multipoint light source with a circuit and its electronic interface,

An inner cover for protection, fixation and prevents light leaks.

A primary light reflector composed of a transparent solid complex optical body, comprising a primary reflecting substrate in the form of an elongated solid substrate with at least one reflective surface or parabola, and at least one entry and control point of the associated source light, An external opaque cover that hides and keeps said reflective substrate and its associated source free from the incidence of external stray light, which are arranged as a second internal skin with respect to said cover that hides them.

In turn, said complex optical-reflector body, has two parts and three phases, is characterized by applying several reflective means in order to direct all the source light towards an illuminating output surface, it comprises:

A main or primary reflector that is based on a tangential reflecting substrate with light entry An inclined reflection surface that is a secondary light output reflector or perimeter reflector R2 arranged behind the external transparent or translucent illuminating surface 3, always placed in front of said inclined surface, therefore the main reflector or the associated source is never visible that are hidden, capable of:

Said primary main reflector. It comprises a plurality of means for reflecting, directing, transmitting, distributing, concentrating and associating the source light according to a reference axis-ray 33 towards an inclined surface, output reflector R2 or secondary reflector, comprising:

When the illuminating surface 3 is linear, the transverse reference axis-ray 33 that crosses its width in a short distance, said elongated reflective substrate 50 is on one side with respect to the illuminating surface, it comprises at least one reflective parabola profile 40, a 40c extended reflective parabola collimator or a reflective substrate surface of similar reflective technical effect.

When the illuminating surface 3 is an at least partially closed perimeter figure, it comprises several omnidirectional reference axes-rays, said reflective substrate is included in the perimeter with respect to the illuminating surface.

Said reference axis-rays are perpendicular in a plane to said secondary reflector R2 and are directed at least towards said part of its perimeter that comprises said secondary reflector R2 inclined surface to make a change of direction between 0° and 90° and emit a signal in several horizontal focal axes along said illuminating surface 3 integrated external that occupies at least one opening 3p on the surface of the housing H and on the outside and inside of said 80x widened frame.

The primary reflective substrate is based on a sector capable of repeating itself to form an integrated reflective substrate of several sectors each with at least one source light entry point and acquiring the shape of a transparent solid elongated ribbon, hidden behind an opaque cover. which includes three phases:

A main phase applying a hidden reflector 50,

A light input phase PH1 from a multipoint light source 30, 31 to said reflector and, A light output phase PH2, comprises a linear illuminating surface 3 to emit a multifocal signal E1 in several horizontal focal axes S1, S2, S3, Sn, Mr.

Said illuminating surface is linear, responds to the perimeter reflection of the hidden reflecting substrate and is capable of developing any linear shape, curves, straight lines, or open or closed perimeter figures.

Said light source is composed of a PCB motherboard circuit, a thermal interface to dissipate heat, preferably comprising; LEDs, multi-chip LED bar or OLED substrate and is capable of associating other circuits with other functions on the same board.

HIDDEN INTEGRATED REFLECTOR. It concerns a laminar substrate in the form of a transparent and flattened solid elongated laminar strip, said solid strip substantially copying in parallel the shape of the cover, part of the housing H that contains it or an associated independent cover Hi, as a second internal skin, positioned under said casing, lid or associated independent opaque cover H, Hc, Hi hidden, eclipsed and free from the incidence LI of external stray light DL, composed of several reflecting sectors which in turn are associated solid reflecting substrates, preferably of parabolic profile 40, each one representing at least one flattened section with a position between horizontal and vertical with a parabola profile coinciding with the axis or rays of said parabola limited and flattened between two tangential reflection surfaces 5 and 6 substantially parallel to each other, produce a internal tangential reflection 32t in order to associate and equalize a main transverse axis-ray 33 for light transmission. and are integrated into a single reflecting body, it comprises:

LIGHT ENTRY. A first phase PH1 of light entry, preferably through one of said lateral surfaces 5 and 6 of said reflective substrate 50, with at least one light entry point 29 from said source 30 for each reflective substrate sector 50 located in the area middle of the substrate or part of its perimeter capable of coinciding with the focus 29/F of a parabola 40, FIG. 15, represented by a plane P1 that together represent said substrate 50; said source 30 has coupling means 29, which are optical or optical-reflective integrated in the same source or in the substrate 50, its object is to deflect-reflect the light from the front axis E0 between 0° and 90°, which is preferably perpendicular and control in a specific direction, (selectable between a direction towards the perimeter of the signal output surface or omnidirectionally to associate to sub-reflections), the light of the focal axis E0 of said source 30, to coincide with an internal reference axis 33 that is transmitted and reflected within said reflecting substrate 50 transversely to said elongated laminar tape, graphically represented by a axis-ray basic average vector 33.

Said reference ray-axis 33 is the directing axis and in a horizontal plane it is perpendicular to the secondary reflector R2 and/or to a linear illuminating surface 3 for signal output, which corresponds to the perimeter edge of said reflector-distributor substrate 50 that crosses the width. Within said ribbon-shaped reflective substrate 50, there are a series of rays associated with the directing ray-axis as direct, reflected or sub-reflected rays that apply a tangential reflection 32t between two surfaces 5 and 6 that limit and direct them in said direction similar to said reference axis-ray 33 in a direction substantially perpendicular to the exit illuminating surface 3 that coincides with the edge of said reflecting substrate 50 or to a break that begins and produces in the inclined reflection surface R2, or reflector of signal output R2 (parabolic, curved or flat with a similar effect) that comprises a part of the perimeter of said reflector 50 that is a light output reflector R2/45° and is the link of break and change of direction substantially perpendicular between the planes P1 and P2, said change of direction is between 0° and 90° which represent the intersection between the reflective substrate 50 as plane P1 parallel to the opaque cover H that leaves it eclipsed, hidden and free of external incident light LI and the advanced profile of the output phase PH2 formed between two other tangential reflection surfaces 7 and 8 substantially parallel to each other, represented by the plane P2 which is perpendicular to said cover H and generates the linear illuminating surface 3, which is the final end of said optical appendage-reflector PH2 and occupies at least one external opening 3p in said housing H, located behind the mirror M1 and upstream of the opening of the mirror M1, capable of concentrating the emission of light, separating said reflector 50 from the incidence of external light and creates a horizontal emission reference axis E1, capable of emitting in a mixed multifocal manner in several horizontal focal axes S1, S2, S3, Sn for said area to the front-lateral FS; and with a focal axis Sr in the other area towards the rear RS. FIGS. 1, 2, 3, 15, 17.

MAIN REFLECTOR. It concerns a main reflecting substrate 50 associated with a multipoint light source 20, 30, in the form of a transparent elongated solid substrate, integrated by a plurality of sectors in a single complex optical-reflective body that substantially copies the internal shape of the H, Hc, Hi shell that contains it as a second internal skin. Form a reflector made up of several sectors S1, S2, S3, . . . . Sn, FIG. 25, where each sector is a substrate and together they form a larger integrated substrate, in the shape of a flattened ribbon, with reflective means to direct the light towards an illuminating signal output surface.

Said reflective sectors comprise perimeter shapes of reflective parabola 40 or collimated reflective parabolas 40c or reflective shapes of similar technical effect when the illuminating surface is linear and substrate shape when the illuminating surface is a perimeter geometric figure, comprising:

Two substantially parallel nearby surfaces 5 and 6 of tangential reflection FIG. 15, separated by a distance that defines a thickness T less than 10 mm. whose objective is to limit, reflect and direct all the light from said source 30, within a parabola sector 40, this limitation defines said concentrated parabola sector with a flattened shape of substrate 50, FIG. 8, therefore all the light from The source 30 that starts from the focus F through the internal reflection means is transmitted with the average rays 33 and is concentrated with greater intensity on said illuminating surface 3, represents a 2D profile of a parabolic reflector 40 capable of extending through of an x axis and form a parabolic reflector extended like a ribbon by means of a collimator 40c to which corresponds a 3x extended illuminating surface. FIGS. 8-12.

(Normally in a 3D profile, the light emitted at the focus F of a 40 reflector parabola or its versions; collimator, extensions, light guides, hollow reflectors, transparent solids, with prisms, cones, sub-reflectors, surface optics, would be reflected in the direction of parallel rays, coinciding with the basic concept of a luminaire that comprises: a light source 30, a focus F, a reflective parabola 40 and a total light output illuminating surface 3f. FIG. 7).

INTERNAL AND OUTPUT REFLECTOR PERIMETER. The reflective substrate 50 defines for a sector a flattened geometric figure with two parts on its perimeter, on the one hand an internal reflector in the shape of a parabola and on the other hand an inclined surface that is a secondary or exit reflector. The concept of a flattened parabola, 2D profile has:

PARABOLA REFLECTOR PERIMETER. A perimeter reflection part that preferably corresponds to said parabolic reflector sector 40, parabolic collimator 40c or its equivalent variants corresponding to an axis parallel to the plane P1 of said substrate and to the axis of the parabola A, in order to orient the rays in a similar to the transverse reference axis 33 as in any reflective parabola and, SECONDARY REFLECTOR R2, OUTPUT REFLECTOR PERIMETER. Another reflection part that occupies at least part of the perimeter of the reflecting substrate 50, is intersected by an inclined surface R2/45° which can be another parabola with an axis perpendicular to the plane P1 of said substrate, in order to produce a perimeter reflection that includes the PH2 phase with a change in direction in the light and in the shape that reflects the reference ray-axis 33, between 0° and 90° to approximate an axis horizontal that becomes a short-stroke ray-axis 34 that in turn generates the final horizontal emission E1, represented by the plane P2, preferably perpendicular to the surface of the casing H or independent cover Hi that contains it and hides and generates:

A light output phase PH2 with an advanced horizontal optical-reflector profile PH2 with a horizontal ray-axis 34, said advanced profile ends in an external illuminating surface 3 made up of sectors 3a, 3b, 3c, 3n, 3R arranged in al at least one opening 3p associated in the housing H capable of generating a multifocal light output of mixed activation consistent with the integrated sectors of said reflective substrate 50.

Said deviation between 0° and 90° horizontally corresponds to the position of the reflecting substrate 50 inside the housing until the deviation coincides to obtain said final horizontal emission axis E1, it corresponds to a surface, parabola sector, or approximately inclined surface. at 45° reflection of similar effect of light output R2, R2/45°, which generates the final horizontal signal output emission E1 by said illuminating surface 3, or extended 3x, sectors 3a, 3b, 3c, 3n, 3R that a in turn they form the emission axes S1, S2, S3, Sn, Sr.

DIRECTION OF LIGHT FROM THE SOURCE.—The light from the source 30 has a path from the entry point 29 that has reflection means to match the direction of the source axis E0 to the reference ray axis 33 inside the reflecting substrate 50, it comprises and is capable of:

At least one substantially vertical, transverse reference ray axis 33 that crosses the width of said reflective substrate 50 originating from a source axis E0 limited between two lateral surfaces 5 and 6 of tangential reflection 32t, substantially parallel to each other that form said reflective substrate 50 to associate and direct a series of direct, reflected, sub reflected rays to said reference ray-axis 33 in a direction substantially perpendicular to said secondary reflector R2, which generates a change of direction between 0° and 90° to produce at least a horizontal ray axis 34 oriented to said illuminating surface 3, capable of emitting a signal with at least one horizontal reference focal axis E1.

Emitting a signal through said illuminating surface 3 integrated with at least one horizontal reference focal axis E1 in a mixed multifocal manner in two different focus areas visible in the environment surrounding the VE vehicle;

A first external mono-focal rearward emission zone RS with a horizontal rearward focal axis Sr with the optical-reflective means that generate it arranged in the third T3 furthest from the body and, A second external emission zone to the front-side FS with several horizontal focal axes S1, S2, S3, Sn with the optical-reflective means and interface that generate it, upstream of the opening of the mirror M1, behind the mirror M1, according to a horizontal plane FSx between an upper tangent tgs and a lower tangent tgi to said mirror.

SUB-REFLECTOR. Said reflective substrate 50 has reflection correction elements, it includes hollow elements, holes or sub-reflectors, SuR FIG. 10a, 10b, which provide interposed interior surfaces 42 to produce changes in direction, they can be combined according to the objective technical effect. and selectable between direct light E1d, reflected light E1r, diffuse reflections E2G or retro-reflections; Its objective is to enclose, reflect, distribute and direct all the light from the source 30 between said two tangential reflection surfaces 5 and 6 by applying angles of incidence less than 15° that represent an average ray 33 represented by an average vector or set of rays of direction towards a part of its perimeter where the inclined exit reflector surface is and incident at 90°/a (ideal perpendicular angle) on it to produce an internal reflection R-IN in said exit reflector perimeter R2. Said surface is normally a parabola sector 40, which can be replaced by an inclined surface with a similar reflection effect, it has a break R2/45° or 45° surface to change the direction of said average ray 33 to a horizontal direction in front. side E1 coinciding with the direction of the focal axis of the multifunctional signal device DS the horizontal plane H=0°. FIGS. 13, 14 and 15.

LIGHT OUTPUT. A light output phase PH2 or second phase that begins in said output reflector perimeter R2, has:

—Interior perimeter reflection means R-IN through an advanced optical-reflector profile PH2 that deviates said medium ray-axis 33 substantially perpendicularly, creating a change of direction, or break in said reflective substrate 50 produced by an inclined surface R2/45° exit reflection that occupies at least part of the perimeter of the reflecting substrate 50, capable of producing an internal perimeter reflection that deflects between 0° and 90° horizontally to said main ray-axis 33 to form a gap between two substantially parallel surfaces 7 and 8 and another short-stroke ray-axis 34 that coincides with a horizontal axis of signal emission E1, represented by another plane P2, preferably perpendicular to the surface of the housing H that contains it.

Said advanced optical-reflector profile PH2 at its final end, which is the linear illuminating surface 3 where the horizontal signal E1 emits, occupies at least one opening 3p and has fitting means, fixing 17 and elastomeric joints 14e to prevent entry of air and water. or noises. FIGS. 13-20.

Means for concentrating the light emission, concerns a narrowing in the advanced optical-reflective profile which is a substrate or tape with a short width, with two tangential reflection surfaces 7 and 8, arranged at an angle with respect to said substrate. reflector 50, (when said reflector is positioned in any position where its directing ray-axis 33 is not horizontal) and reflects the main ray-axis 33, as ray-axis 34 and in turn as horizontal emission axis E1, through an integrated external illuminating surface 3 which is the end of said advanced optical-reflective profile and generates a luminous line emission.

The illuminating surface 3 is formed by extruding along a guideline 35, the section they together form:

The hidden reflective substrate 50, with the light entry points 29.

The secondary or perimeter reflector which is the inclined exit surface R2/45°, and The PH2 advanced optical-reflector concentrator profile. FIG. 16.

The integration of said parabolic reflector sectors allows having a linear illuminating surface 3 capable of covering the entire housing H from end to end and also having several horizontal focal axes at the front-side that define a part of the signal at the front FS with sectors S1, S2, S3, Sn. FIGS. 21-27.

REFLECTOR, POSITION AND FORM. The complex reflecting optical body in a vertical section defines these shapes:

A—When the illuminating surface is linear, it represents an "L" profile, where the larger side is the main reflecting substrate and the smaller side is the advanced profile that ends at the illuminating surface.

B—When the illuminating surface is a perimeter figure or two separate lines, it represents an elongated "U" profile, where the base is the main reflecting substrate and the upward projections are the advanced profiles that end in two illuminating surfaces.

These surfaces, once extruded, define the luminous emission figure capable of: 1

Have the main laminar reflecting substrate and the associated source, located as a second internal skin hidden behind an opaque cover H, Hc, part of said casing, to avoid and remain free from the incidence of external stray light LI on it and optimize signal perception during the day 2—Said reflective substrate is a transparent solid 50 formed by flattened parabolic reflecting substrates 40 integrated and associated with each other.

3—Each reflective sector has at least one light input 29 from said light source 30.

4—Part of the perimeter of these associated reflectors generates a horizontal signal emission beam E1 through a linear illuminating surface 3 throughout the entire length of the housing H, Hc that contains it through at least one opening that comprises the external part of the body-shell structure.

5—The H, Hc, Hi cover configures a design associated with the DS signal, in order to improve aerodynamics, signal perception, protect from impacts and protect from external light, it produces up to 4 related functions, the VIS system is polyfunctional with respect to its shape and design, it includes:

A protruding projection Hp for impact protection adjacent to the illuminating surface 3, A forward profile Ha with the technical effect of avoiding external incident light LI on said illuminating surface 3 and converting it into rejected, reflected or absorbed light LIR, An anti-turbulence Ch3 lateral aerodynamic channel created between Hp and Ha.

A protruding distance Hd with the frame that prevents rubbing at the end far from the body.

Generates at least one of four air outlet channels;

Ch1 towards the interior between casing H and CAR vehicle, complemented by a protruding appendage Hx, Ch2 down, Ch3 towards the external side away from the body of the CAR vehicle, A0, up. FIGS. 13-16, 21, 22, 23, 33-36, 43.

6—Said reflector 50 is generally substantially flat, like a ribbon, therefore it can be located edge-on (perpendicular) or parallel to the housing that contains it, consequently the transverse reference axis-ray 33 is capable of being located in a position between parallel 0° and perpendicular 90° with respect to a vertical plane.

The reflective substrate 50 represented in diagram by a plane P1 positioned parallel to the housing H, is capable of generating a space 70 between said substrate 50 and the cover of the housing H said substrate on the inclined surface R2 applies a change of direction or break in the perimeter and reference ray-axis 33 it passes from vertical to horizontal as axis 34 precursor of the horizontal emission focal axis E1.

7—ILLUMINATING SURFACE. Said external linear illuminating surface 3, or extended 3x, is the end of the advanced optical-reflector profile PH2.

OPENING. Said surface 3 occupies at least part of an external opening 3p on the external surface of said housing H individually or associated with the independent cover Hi, it is configured with variants depending on the design and functions of the multifunctional signal module DS, selectable between:

At least one opening in the housing H,

A gap between the casing H and the associated independent cover Hi,

An opening inside the cover Hi which in turn is the geometric figure that occupies the opening 3p, The luminous perimeter eclipses a geometric figure that surrounds the cover Hi.

More than 10% of the perimeter of an associated cover Hi, which is the one that occupies an opening 3p in said casing.

The illuminating surface is capable of emitting horizontal signal E1 in a mixed multifocal manner in at least two areas of different focus:

A first monofocal rearward emission zone RS with a horizontal rearward focal axis Sr arranged in the third T3 furthest from the body, A second front-lateral emission zone FS with several horizontal focal axes S1, S2, S3, Sn arranged behind the mirror M1 according to a horizontal plane FSx between an upper tangent tgs and a lower tangent tgi to said mirror, both zones visible by the environment surrounding the EV vehicle. The illuminating surface 3 corresponds to the inclined surface R2 secondary reflector or exit perimeter reflector and to several integrated sectors of said hidden reflector 50 with its focal axes S1, S2, S3, Sn and Sr, it comprises at least the external sectors 3a, 3b, 3c, 3n and 3R with linear luminous shape, capable of:

Cover the external surface of the casing H from one end to the other, occupying in extension at least part of the 3 thirds that the casing block H is divided into, with a shape similar to a linear luminous tape.

A convex curve with respect to a horizontal section of the housing body, FIGS. 16, 25.

At least one horizontal segment in the front signal part FS that participates in dynamic ignition.

Designs that occupy at least one 3p opening on the outside of the surface of the casing H of said casing of curved, straight luminous lines or perimeter geometric figures, open, closed, regular, irregular, continuous or discontinuous or their combination, without leaving to comply with the official photometry of the signal emitted in a horizontal focal axis rearwards by the farthest end of the body that comprises the third third block T3 furthest from said CAR body without affecting the vision of the driver of the DV vehicle.

Be free of the incidence of external stray light LI on the reflector 50.

Increase the concentration of light on the illuminating surface by means of concentration, of the advanced optical-reflector profile, through a tangential reflection by narrowing the thickness T between the tangential reflection surfaces 7 and 8 of the light output passage PH2. FIGS. 13, 14.

Have a variable width and different types of light emission, direct, diffuse, semi-diffuse, continuous homogeneous, or discontinuous heterogeneous through a plurality visible sectors in an opening or in a plurality of openings on the surface of the housing that conceals the reflector.

Have a coloration on said transparent, tinted or translucent illuminating surface of different colors, preferably orange, white; or colorless in case the coloration of the emitted light is generated by the wavelength of the light source.

Have a smooth, machined finish, with multi-optics, engraved or micro-engraved or reflective dichroic, nanometric, screened, an associated film that allows part of the light to pass through a transparent opaque, clear, dark, mirrored, dichroic, or holographic screen. or in injected bi-material.

8—POLYFUNCTIONAL. Said linear perimeter figures of illuminating surface comprise an interior surface occupied by an opaque cover that hides the reflecting substrate, said cover H is part of the housing that contains it or of an extra independent cover Hi; and comprises below a space that is an interior laminar volume 70 capable of associating or including other functional devices to compose a poly-functional, multiple, grouped, combinable and mixed device and system selectable from:

A radio frequency antenna An and/or its integrated amplifier circuit and connectors, associated with the interface of the PCB circuit of the light source, integrated on the other side of said circuit or separately.

Another lighting device such as smart light, corner light, or corner light or auxiliary light for slow maneuvers.

A temperature sensor.

An RFID (radio frequency identification) reader.

A matrix keyboard for access key, activation or door opening.

An ScF front camera with forward focus to see the rolling area of the front wheel, especially the one opposite to the driver.

An IR infrared light to support the night vision of any camera.

A laser line light projected on the side floor parallel to the vehicle to indicate how far the doors open, An image, logo or welcome projector.

A side welcome or security light

A sound signal emitting device or buzzer, or mini speaker.

A side marker light.

A keyboard matrix for vehicle access code 73.

These devices are capable of associating, establishing combinations or packages of functions and support to other vehicle functions; form an independent module of said intermittent signal as a single multifunctional standard module capable of being exchanged in the structure of the indirect vision system, which becomes a system of flexible indirect vision by fitting into the same structure, shape, simplifying connections and assembly speed in order to save costs in engineering, development, assembly labor and providing with the exchange the quick and cheap option of a package of functions in vehicles with different characteristics, according to convenience.

Mixed activation involves applying a difference between zones of the same signal device, the front zone has several horizontal focal axes in front and side, and the rear zone has a single focal axis which in turn is suitable to comply with photometry. official FIG. 1 as a class 5 flashing signal device, Regulation R6, ECE/UN, in the focal axis of signal emission backwards on plane 60 at the farthest end of the body without affecting the vision of the driver of the vehicle. (With some small variation in angle it is equivalently homologable in the USA SAE J914, SAE J915 or in Japan art. 41 or vice versa. The same principle is for front and/or rear signs of motorcycles, bicycles, or derivatives, according to R. no. 51, no 52 and no 53 ECE/UN.)

The multifunctional signal device DS in conjunction with the system structure is located behind the mirror M1 between an upper tangent tgs and a lower tangent tgi thereof, FIG. 34, and; considering the casing body as a block divided vertically into three blocks that represent three vertical thirds T1, T2, T3; realizes the light output through a rear reference axis Sr through the third T3 that comprises the farthest end of the CAR body on the outside of the frame 80$x$; defines and differentiates a signal emission field 01 from a shadow field 02, where the eyes of the driver DV are located, delimited by an imaginary line 00. FIGS. 3, 22 and 36.

MIXED ACTIVATION. The mixed concept is a consequence of applying 3 different activation zones with the same optical body. It includes the zones; external front-lateral FS dynamic, external back RS repetitive, internal anti-stress localizer 51 repetitive. Said mixed activation of the signal for the flashing function comprises:

External front-side signal FS, turns on and off in a differentiated and dynamic way, through a low-cost activation time controller 22 that controls at least three sectors S1, S3, and S3, therefore it is capable of developing the activation function dynamic in the front signal part FS with a minimum of three LEDs following an activation order that begins with the S1 sector closest to the CAR body, FIGS. 1-3 and ends with the S3 or Sn sector furthest from the CAR body; said controller 22 is arranged at the interface of the PCB circuit of the light source 20, it activates the front sectors FS sequentially at low cost, each sector has at least one LED 30 with its corresponding input 29 per sector and each one covers a wide expanse of illuminating surface 3.

External signal behind RS. The horizontal reference focal axis Sr of the backward signal RS has a repetitive drive activated directly by the general system of the vehicle through the general circuit in the can-bus network of controllers, and comprises a specific light source 20$b$ with at least one LED 31, (different from the rest of the LEDs 30 of the light source 20), arranged in an extension or at one end of the PCB that generates said repetitive on and off backward signal along the horizontal reference axis Sr.

Internal anti-stress locator signal 51. It is a signal specially developed and configured with the same optical body and the same light source.

It uses the same light source with its LED 31, 30R or an additional LED but with the same light source interface PBC circuit 20, 20$b$ that generates the backward signal RS, visible by the external environment VE in signal zone 01, It also provides as a light source by means of an optical appendix 52 device 51, to locator M1 the mirror, in order to produce an anti-stress visual aid to the driver DV, it emits through a reference axis VC through a small independent illuminating surface 51 that occupies another opening 4$p$ has any geometric shape, preferably square, circular or triangular, arranged in the widening of the frame of the housing 80$x$, surrounded by an opaque anti-reflective area 53 to improve its perception and contrast, said emission is low intensity diffuse light with a focal axis of reference VC, directed towards the NO signal area 02 reserved so that the DV driver's vision can see the image of the mirror M1 without disturbance.

The mixed activation signal concept is capable of covering the three fields of emission, dynamic FS forward signal and both RS/Sr emissions towards the rear and/or VC towards the driver's eyes repetitive DV activation turns on off (one is directed to the surroundings). VE in the signal zone 01 and another to the DV driver in the NO signal zone 02, with an on-off activation frequency of 90+/−31 cycles per minute (bpm).

POLYFUNCTIONAL SIGNAL DS. This visual warning with two different illuminating surfaces 51 and at least the rearward signal 3R, directed to different actors (DV driver and VE environment) is capable of:

Activated with commands related to opening the doors from the inside or outside of any operating mode.

Associate with a controller that generates equal or greater activation frequency (>120 bpm, greater than the turn signal)

Indicate a second function of advance warning of vehicle door opening to the driver and the environment at the same time.

Associate with a projector Ls a laser line LL parallel to the vehicle on the ground to indicate how far the front doors Do1 and rear doors Do2 of said vehicle will be opened, FIG. 3,56,58.

Associate with an internal and/or external sound emitter 58 that generates conditioned behavior when activated to direct the gaze and automate the behavior without thinking, with the technical effect of producing a reflex act.

The reflective optical means that generate the backward signal RS, comprise and are selectable between an external light guide 50', internal, a hollow reflection and correction surface 43 of said emitted light Sr, an emission LED 30R, 31 of direct or reflected emission, a prime 40' or a reflective surface placed 40', to the LED 30R, FIGS. 28-32, being part of the same optical body as the reflectors 50 and employing a circuit 20$b$ connected by cable to the circuit 20 of the front emission part FS.

This form of mixed activation is capable of generating an action of activation and deactivation of the sectors that indicate an advance from the body to the side with at least 3 LEDs 30, they turn on and add up until obtaining a final stay on for all of them. sectors greater than 120 milliseconds. Such lighting by different reflector sectors and focal axes S1, S3, S3, Sn, does NOT need to use a plurality of LEDs to produce the same technical effect, (typically 8 LED units or more, or an expensive driver with a plurality of output pins signal).

Said sectors on the illuminating surface 3 have a confluence area that mixes the emitted light E1$c$ from each source point producing an effect of flowing and mixing light in advance, FIG. 25, in this way it improves signal perception, safety at low cost and increases reliability and robustness (having fewer elements is more reliable since many tracks and many LEDs are easier to overheat and damage.

The mixed activation of the multifunctional signal device DS in one of its modes of functioning as a blinker FIGS. 3, 26 and 33 to 40 comprises a synchronization:

The front signal part FS, the front reflecting sectors S1, S2, S3, Sn, and the corresponding illuminating surface 3*a*, 3*b*, 3*c* and LEDs 30 have successive dynamic activation that starts in the LED 30 and sector closest to the body. from the vehicle to the furthest one by applying a specific controller chip 22 and; in the same period of time that these frontal sectors are activated and deactivated.

The rear signal emission part RS is activated repetitively by means of at least one LED 31 with a frequency of 90+/−31 bpm or cycles per minute, a frequency that includes and extends what is required in R6, part 6.2. 2 and 6.5.9 UNECE/UN, synchronizing the activation and deactivation of the front series on the same frequency. That is to say, at the moment that the rear signal RS cycles, the front signal FS activates and deactivates all its sectors. FIG. 58.

The same LED source 31 of the rearward signal RS is capable of providing signal light and the same repetitive frequency of the anti-stress locator 51 of the mirror M1 with the technical effect of driver assistance. All the signal emission DS is visible by the surroundings. VE and the location signal of the anti-stress mirror 51 is only visible by means of a diffuse focal axis VC by the driver of the vehicle DV. FIGS. 3, 31, 32, 36, 54, 58.

MIXED ACTIVATION and ILLUMINATED FIELD. Said DS signal device is multifunctional and multifocal, it emits in at least two areas (with respect to the vehicle's circulation axis 100.) with mixed dynamic-repetitive activation, with respect to the vehicle's circulation axis it combines; a repetitive activation with a frequency of 90+/−31 cycles per minute (bpm) with a dynamic zone, comprising:

A mono-focal RS rear zone with a Sr rear reference axis, which extends from −5° to more than 60° as a minimum angle, repetitive and, An area oriented towards the eyes of the driver of the vehicle DV with a reference focal axis VC as an anti-stress locator oriented towards the interior of the vehicle, spanning from −5° to −90°, repetitive, combined with, an independent illuminating surface 51 located inside the repetitively activated 80x widened frame. Said focal axis VC emits a low-intensity diffuse light within the NON-illuminated field 02 of the vehicle interior and ranges from −5° to −90°.

A dynamically activated multifocal FS front zone with at least 3 reference focal axes S1, S2, S3, . . . . Sn, ranging from 60° to more than 180°, dynamically activated and initiated by activating the focal axis S1 closest to the body to the farthest focal axis Sn, keeping all focal axes on at the end of the cycle for at least 200 milliseconds before turning off, synchronized each cycle with the repetitive zones of the mirror M1.

This mixed and coordinated dynamic-repetitive activation between zones and different focal axes is not achievable by class 1 vehicle devices in front and class 2 behind a vehicle that have a single focal axis and in one direction and are not visible to the driver. FIGS. 1-3, 58.

The reflective media in the input phase 29 or output R2, R-IN as an ideal concept comprises parts of reflective parabolas that in concept generate emissions of parallel rays, but this theoretical concept has a correction margin and is susceptible to application with an effect similar technical another type of reflector or a surface inclined at a similar angle of 45°R1/45°, R2/45° FIG. 12-15, alternatively part of a conical would produce a similar technical reflection effect given the correction exerted by the surfaces of tangential reflection 5 and 6, 7 and 8 both in the input or output phase.

Said tangential reflection surfaces 5 and 6, and the advanced optical-reflector profile 7 and 8, have a separation that defines a thickness T less than 10 mm, (<10 mm), they can be approximately parallel by the same correction principle and margin of rectification of tangentially reflected light 32*t*, applying low reflection incidence angles of less than 15°, and generating a medium ray 33 as an ideal reflection with a non-limiting concept.

OPAQUE COVER and HOUSING. The concept of hidden reflector 50 and linear illuminating surface 3 allows for:

An opaque lid or cover that hides said reflector 50 can be of a different color and made of another material: polycarbonate, ABS, carbon, aluminum, with respect to the rest of the housing and have a plurality of design combinations of the outer housing of the reflector. system.

A design regarding the shape of the casing with three technical effects;

Aerodynamic,

Protection against the incidence of external light on the light signal,

Protection against impacts based on an associated Hp profile, close to the illuminating surface.

BLIS and AERODYNAMICS. The aerodynamic effect associated with at least one signal device comprises a shape with an advancing aerodynamic attack point or profile Ha associated with a depression area shape Ad; with the technical effect of favoring the aerodynamic outlet of air, generating up to four air outlet channels and at the same time protecting from the incidence of external light:

Ch1 towards the inside between casing H and vehicle CAR,

Ch2 down,

Ch3 towards the external side away from the vehicle body CAR, FIGS. 35 and 43.

A0, upwards, which is not a channel but a correction to turbulence and more effective penetration. These design options have the technical effect of generating less turbulence, noise, providing extra protection to the incidence of external light on said illuminating surface and protecting it from impacts, which is normally made of PMMA methacrylate, which is a fragile and brittle material. before the blows.

The aerodynamic effect associated with at least one signal device also makes it possible to develop an extension Hx of the casing H towards the CAR body, starting from an imaginary line 0 that corresponds to a third TO outside the block of thirds of said casing capable of housing a luminous device Bs, BLIS warning of a driver assistance device associated with sensors and radars as it is the area closest to the driver's eyes DV. FIGS. 35-51.

Develop designs of luminous, perimeter, varied, regular or irregular, continuous or discontinuous linear geometric shapes that allow the vehicle brand to be individualized as a characteristic, susceptible to protection as a registered model, Have an empty space within said luminous perimeters that can be associated with other devices such as an An antenna, an audible buzzer 58, another DS2 luminous device or a catadioptric reflector.

Develop devices with high light intensity, not achievable by ineffective longitudinal light guides during the day, and also extend their application to other lights or indicators to develop driver assistance devices capable of emitting from a linear geometric figure such as a triangle which symbolizes danger and being visible in broad daylight.

Simplify industrialization by applying a simple assembly method and not forming a closed assembly, which needs an external transparent surface, enclosing a volume that needs a watertight weld, or a perfect metallized process finish like any visible reflector or avoiding condensation problems.

In product variants said multifunctional signal device DS with hidden reflector applies for emission in the rear reference focal axis Sr, with a general transparent cover 1', 50' or a light guide 50' with different solutions and reflective means associated with the same transparent optical body of said hidden reflector 50. FIGS. 28, 29, and 31.

SECURITY CAMERA. The VIS indirect vision system that applies vision systems through mirrors or cameras is capable of incorporating in its support 81 another independent ScS or surveillance side camera, capable of remote monitoring or for facial recognition of access to the vehicle or as a Third camera with approach capture images in the side area of the vehicle 65 in front of the access door, recognize images for security, prevent theft or vandalism on said access area or locks with remote monitoring by radio frequency Wi-Fi or Bluetooth, activate access to the vehicle, said camera is capable of recognizing movement and having night vision and functioning associated with or replacing an RFID reader, or a vehicle access control matrix keypad 73, said images are stored in a removable digital memory inside the vehicle in a USB port or similar 75.

DESCRIPTION OF THE DRAWINGS

The attached drawings are illustrative, NOT limiting, an expert in the field by relating similar elements or varying the design, can obtain a product with equivalent technical effects without going beyond the scope of the present invention.

Figure 1:
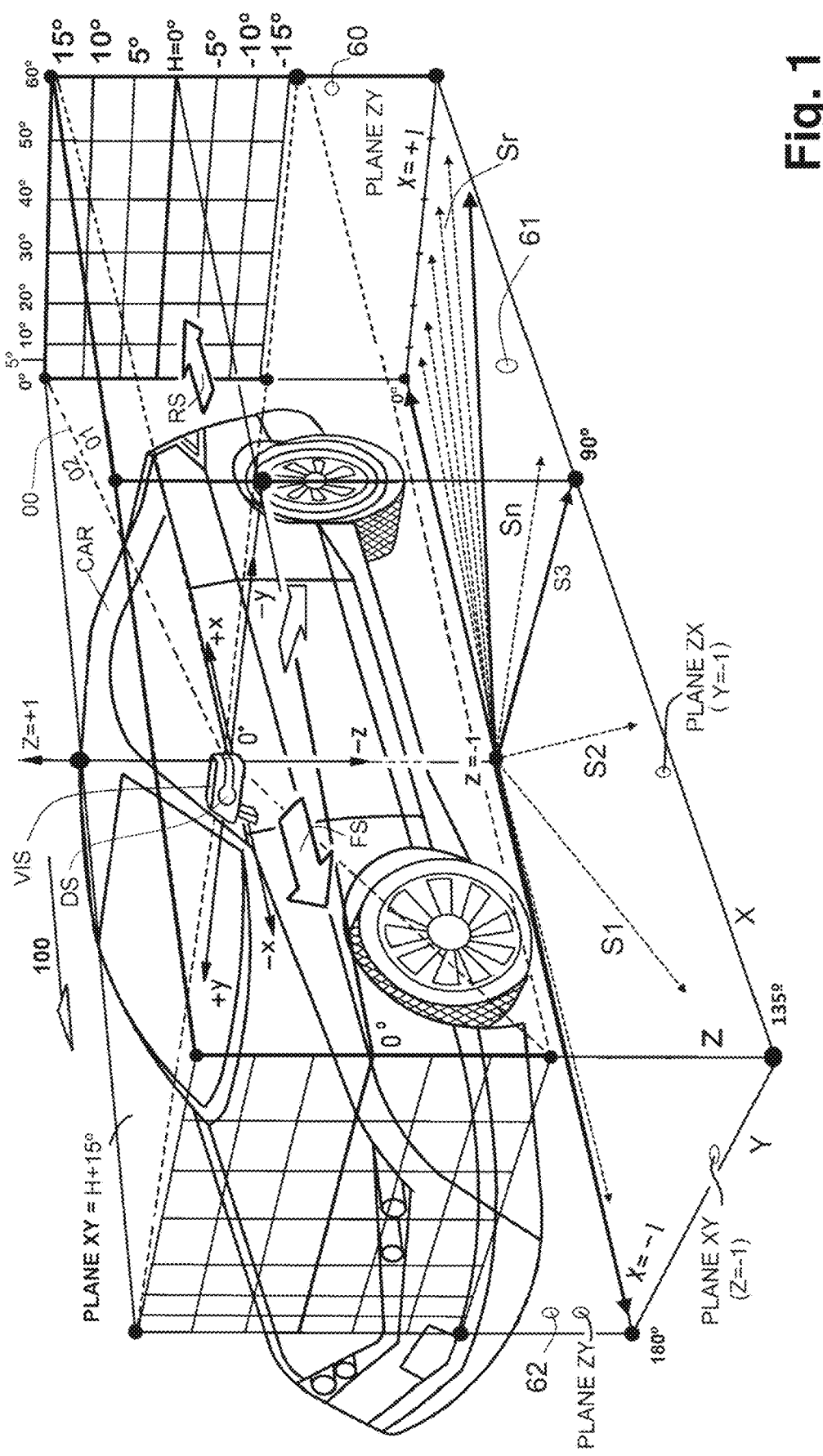
FIG. 1—Perspective of a vehicle with VIS indirect vision system, with DS multifocal mixed signal device with hidden reflector, the development planes of the vehicle are observed, 60, 61, 62 with respect to the circulation axis 100, the ZY plane (back) is a grid where the photometry of the rear signal device RS is measured, according to UNECE Standards Regulation No. 6, between 5° to 60° as a minimum horizontal angle, and +/−15° vertically; On the ground plane ZX, a projection of the angle of 60° we see projected other signal sectors that correspond to focal axes S1, S2, S3, Sn, of the same mixed signal Magnified DS multifocal form the frontal FR side and forward emission; A line 00 is observed dividing a signal zone and a non-signal zone; The signal DS is a mixed multifocal signal, covering a back-illuminated field RS, associated with another illuminated field different from the front FS; Its on-off activation by sectors can be different on one side or the other, dynamic in front with serial, sequential, consecutive activation of each of its focal axes and repetitive backwards with a single horizontal focal axis, monofocal.

The external viewing points VE at the front, side and rear, DV driver's eyes internal viewing points, A signal field 01 differentiated by an imaginary line 00 from a non-signal field 02 where the DV driver's eyes are The emission fields of the signal DS with respect to an axis 101 parallel to the circulation axis 100 that passes through said signal device and extend;

The rearwardly emitted signal field RS has a horizontal reference focal axis Sr oriented at −5° and covers a minimum angle of 60° or more.

The signal field emitted towards the front-side FR, multifocal S1, S2, S3, Sn, ranging from 60° to 180° or more.

Each focal axis encompasses an illuminated horizontal field wide enough to intersect merge with each other and generate a continuous illuminated horizontal signal field capable of encompassing the external signal area 01 from −5° to +180°, even with the illuminating surface composed of sectors separated by the opaque cover of the system casing.

The emission field of the mirror location anti-stress light indicator which is part of the signal device DS, and emits with the same source through an independent illuminating surface with a reference focal axis VC oriented towards the eyes of the driver DV within the field no signal 02, covers from −5° to −90°

The emission field of the VB light indicator associated with the "BLIS" or "ADAS" aid system and its RZ blind spot and lane change warning radars.

The axis of vision of the rearview mirror image Vm and the monitors M perceived by the driver DV.

On the right side, the field of view of images captured as a VIS indirect vision system, by ScF front cameras, MZ1 mirrors, or MZ2 mirror spotter or M monitors, the blind zones 99, especially on the front wheel opposite the driver, this blind zone, the front camera ScF 98 is captured, which together with other cameras at the front and rear 96 and 95 configure a 360° vision and detection system over the vehicle's surroundings, together with the RZ radar sensors.

The open doors Do1, Do2 associated with the projected laser line indication LL, on the lateral floor of the vehicle and parallel to the axis 100 represents the second function of the turn signal DS when it is activated with another frequency associated with the opening action of the doors. the doors in advance from inside the vehicle. The position projected into the vacuum of the protruding structure of the indirect vision set VIS is observed, as an advantage to emit signals and capture images "see and be seen", it is a disadvantage due to the incidence of external stray light LI of daylight DL, or from other vehicles that make the signal emitted less efficient.

The RZ front radar or a front camera 96 is capable of capturing objects and pedestrians in front and activating automatic emergency braking together with both DS signal devices, as a third function other than the turn signal, as an assistant to said emergency braking. emergency or simple detection being supportive to indicate and signal at least in its frontal zone FS to the pedestrian in danger in front.

The 65 field of vision in front of the vehicle access doors of a third intelligent camera with ScS lateral orientation surveillance motion sensor stands out, remotely monitorable by radio frequency capable of performing a double function, surveillance, capturing and recording data or image recognition to unlock locks.

Figures 4, 5, 6:
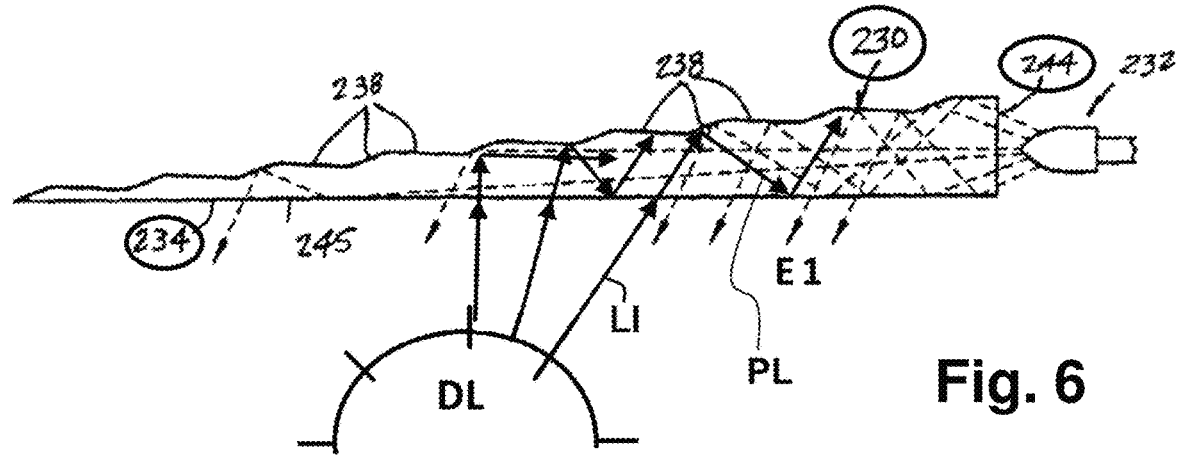

FIGS. 4 and 5—They recreate FIGS. 74-A and 76-B of patent E06008490.2 and ES200001834 by A. Rodríguez Barros to observe the effect of external stray light DL on a light guide 150 even having a cover transparent external 1 and a dark background 12-x.

Figures 21, 22:
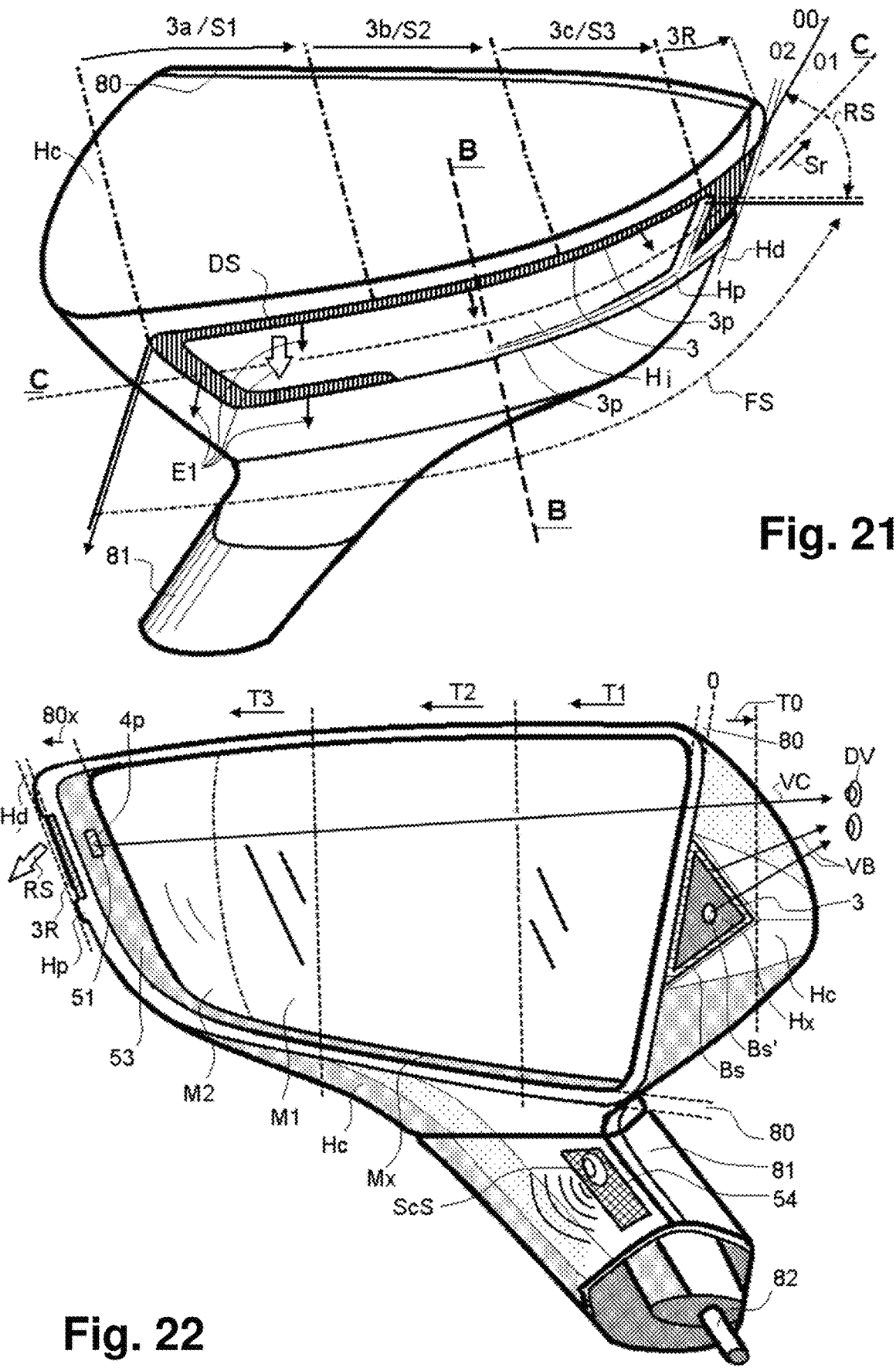
Figure 26:
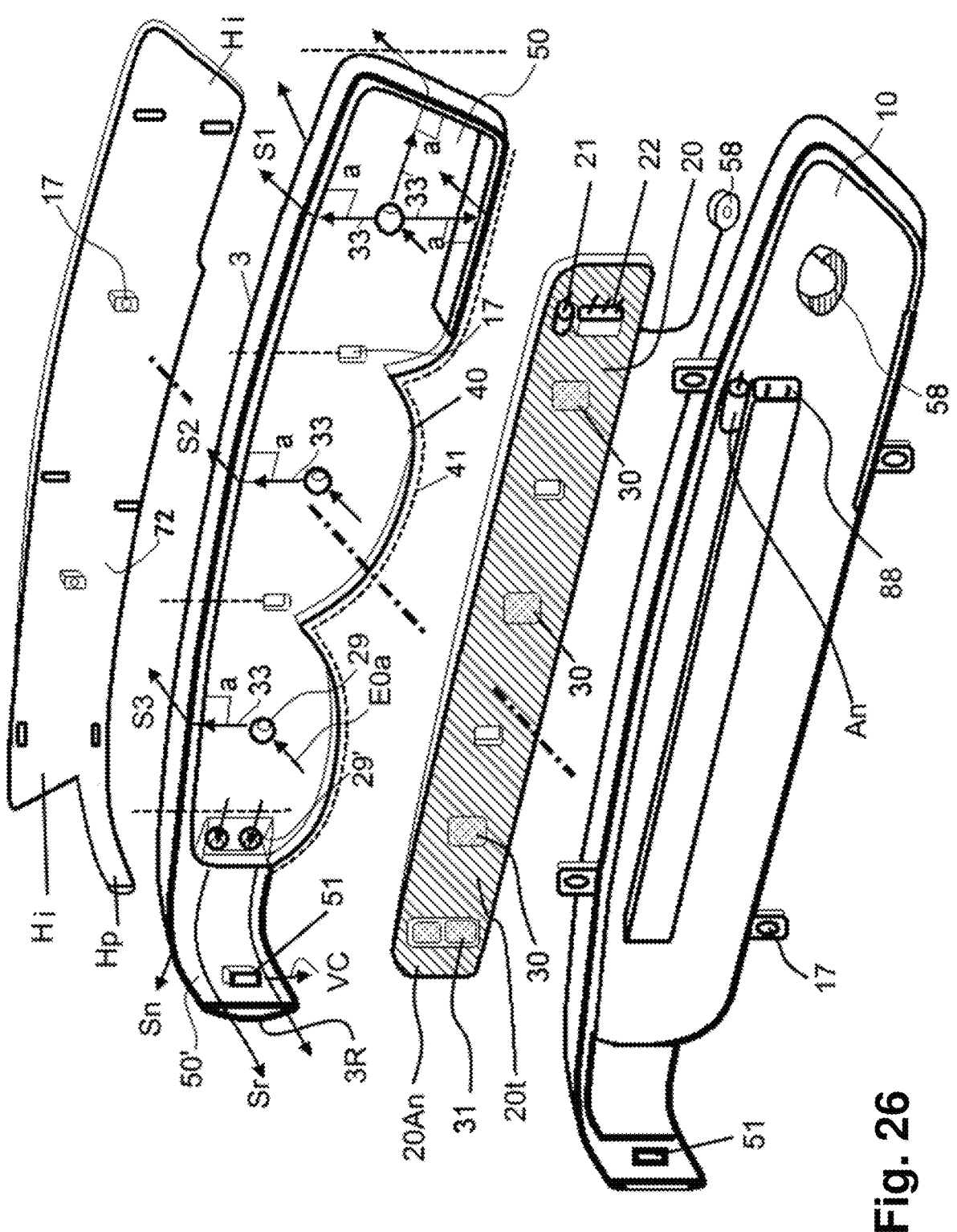

FIG. 6—Recreates FIG. 26 of patent EP09671118 A2 of Donnelly Corporation where it is observed in FIG. 22, 23 that the signal device to emit in two directions has two light guide reflecting elements pipes 230, 250 with reflective facets 238 and large surfaces exposed 234 to the incidence of external stray light DL and in addition the signal emission area 245 would be visible to the driver, which is a contradiction in safety. See a light when you need to see the rearview mirror.

Figure 7:
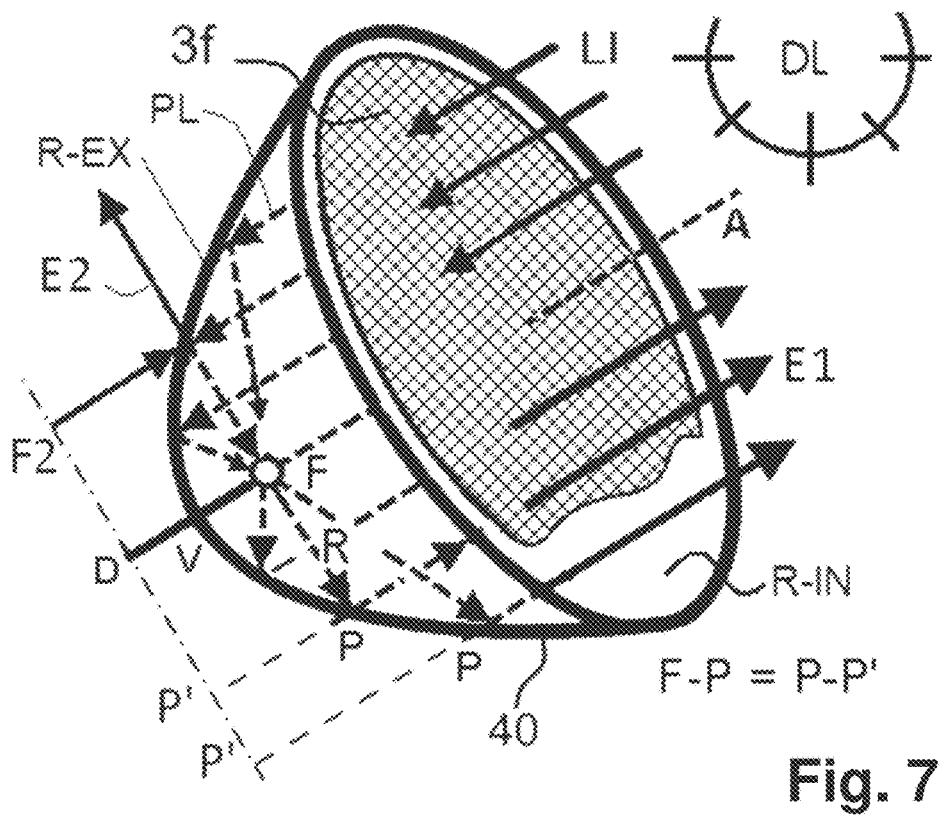

FIG. 7—Basic concept of a street lamp, luminaire or lantern type, based on a parabolic reflector 40, an emitting focus F and a total illuminating surface 3f, against the emitted R rays E1, the total illuminating surface 3f collects all the external incident light LI of the daytime ambient light DL, and is reflected in said parabola 40 as internal reflection R-IN in the opposite direction to that of emission towards said focus F, therefore it counteracts the emitted light and the signal perception loses effectiveness.

Figure 8:
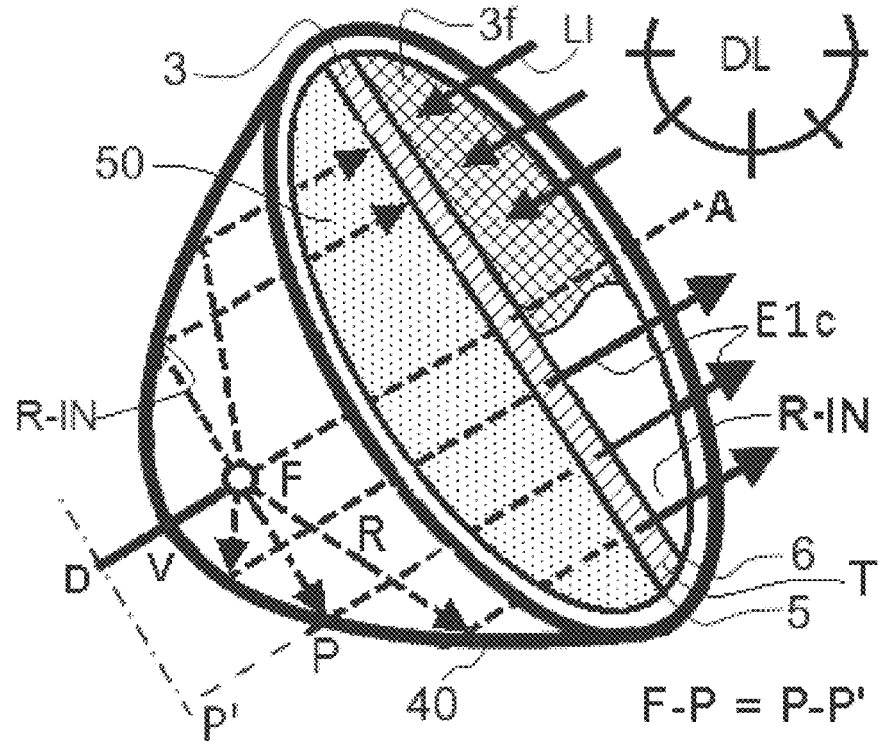

FIG. 8—Concept solution to the problem of FIG. 7, basis of the present invention, limit between two tangential reflection planes 6 and 5, parallel to the emission focal axis A or a radius R and creates a transparent reflecting substrate 50 that It is a sector of said parabola 40, a part of the perimeter helps reflection on one side and another part of the perimeter creates the illuminating surface 3 and generates the concentrated signal output, it produces the technical effect of avoiding the incidence of external parasitic light LI, and concentrate all the emitted light on a linear and narrow illuminating surface 3, capable of emitting the rays from a similar source F concentrated as E1c and optimizing signal perception for the same amount of source light; the emission becomes concentrated linear.

FIG. 9—Section of a parabola reflector 40, as an internal reflector IN and an external reflector EX, explains in diagram the concept of a parabola as a reflector and its versions applied in the patent to define a sub-reflector SuR/R-EX' used for the phase input 29, as light input into the reflecting substrate 50 of the emitted light E1 by focus F or LED 30 by applying a displacement to generate a parabola sector collimator R-EX in a left and right direction Di, Dd, towards the center of the focal axis A with the technical effect of producing an omnidirectional reflection or directed towards the sides E2, converted into E2', at the same time that it is capable of letting through the direct emitted light E1d with two different left and right variants.

FIG. 10a—Variant for direct-reflected light distribution, according to FIG. 9 to the left of the focal axis A, to produce a change in direction, generate a surface by applying a hole 42 in the shape of a parabola, (concept FIG. 9, a left of the focal axis A) and have a surface as an external parabolic reflector R-EX or sub-reflector SuR within the reflecting substrate 50, and produce a double internal reflection R-IN towards the perimeter parabola 40 which may be covered with a metallized material or reflective 41 that facilitates reflection and prevents internal light leakage with the technical effect of directing and distributing all the reflected light emitted E1r, E1d direct towards the opposite perimeter where the illuminating surface 3 or signal emission surface is located, another option It is a cover to improve dark, gray or black contrast. The reflective substrate 50 has a change of direction which is output phase 3.

FIG. 10b—Variant for distribution of direct-reflected light as diffuse light (concept FIG. 9 to the right of the focal axis A), to produce a change of direction in the reflecting substrate 50, apply a hole 42 in the shape of a parabola as in the FIG. 9 in this way generates an external parabolic reflector surface R-EX or sub-reflector SuR, within the reflecting substrate 50 and produces a diffuse reflection E2G when passing through an etched lateral surface G that orients the direct emissions and reflections E1d, Diffuse E2G and E2Gr diffuse reflected towards the exit illuminating surface 3. Here the reflecting substrate 50 has a change of direction that forms the exit phase 3.

Figure 11:
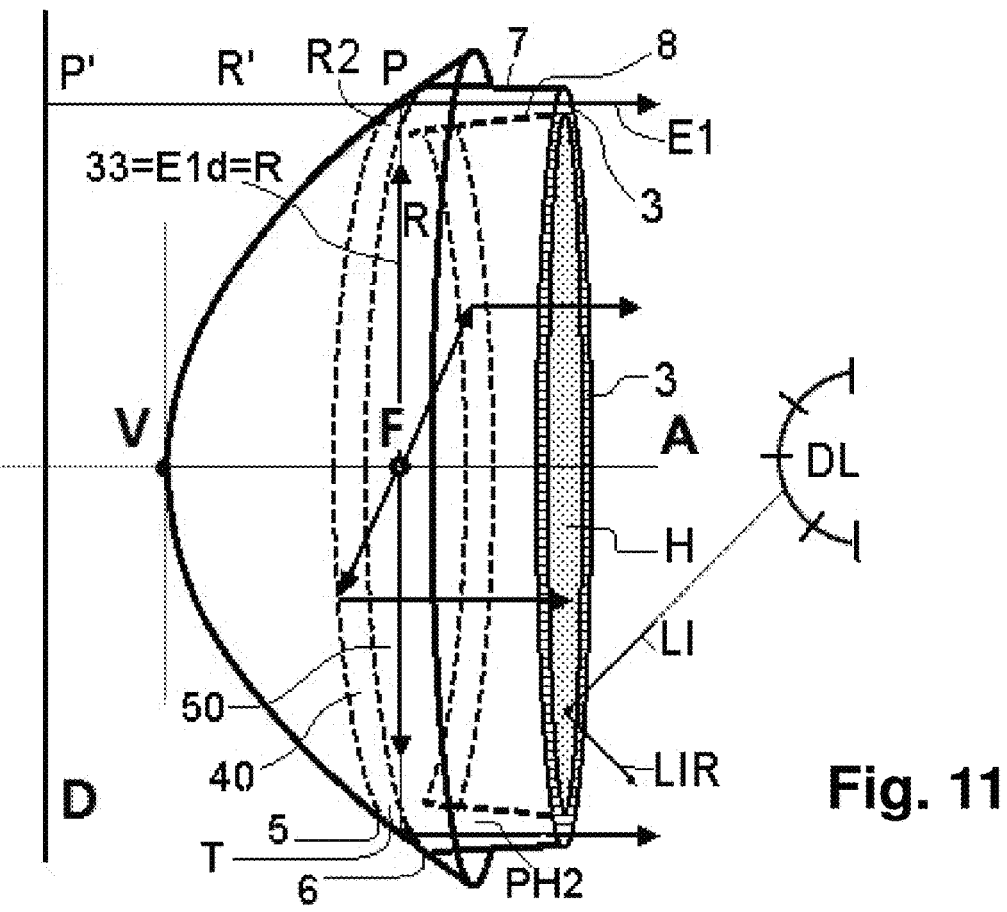

FIG. 11—Perspective view and transparency of the concept of FIG. 7, the reflection surfaces 5 and 6 limit the rays R emitted from a focus source F forming the reflecting substrate 50 which is perpendicular to the axis of the parabola A, the ray-axis 33 is reflected in a parabola sector 40, which is the output reflector R2, which coincides with a corresponding illuminating surface shape 3 that precedes said output reflector R2 and concentrates all the light emitted by the focus F with a linear shape of a closed circular figure; The opaque cover H hides the reflector 50 and the focus source F with the effect of avoiding the incidence LI of external parasitic light DL on said reflector 50, and emits the signal E1.

A second phase of light output is observed, a narrowing between surfaces 7 and 8, NOT parallel to each other, to produce a concentration of light on the illuminating surface 3.

The illuminating surface is never in front of the source F, it is in front of the output perimeter reflector R2.

The reflective substrate 50 has a break, a change in direction that produces the exit reflection perimeter surface R2=parabolic sector 40=perimeter circle and generates the section PH2 composed of said surfaces 7 and 8, which is an advanced optical-reflective profile that ends on the illuminating surface 3, therefore it is always facing the exit perimeter reflector R2.

Figure 12:
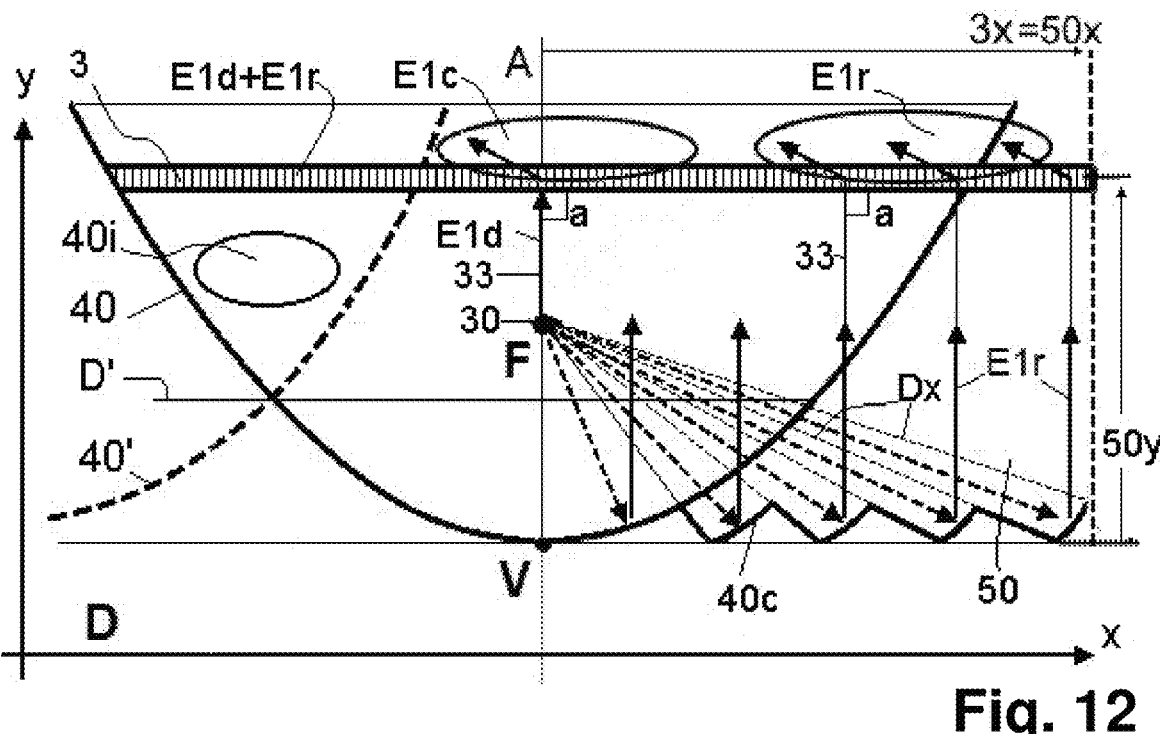

FIG. 12—Schematic of a parabola reflector 40 defines displacements of sectors of reflecting parabolas a parabola collimator 40c and the development of the optical body reflector substrate 50, the technical effect is to vary the distance in width and length 50x, 50y, and extend the illuminating surface 3x, chain areas with other reflecting parabolas with interference zones 40i, and optimize, homogenize the light concentrated on the illuminating surface 3, reduce the volume of the reflector 50 as a substrate. Direct emitted rays E1d and reflected E1r and in the interference zone direct and reflected rays E1d+E1r are observed. Here the reflecting substrate 50 has a change of direction perpendicular to the reflecting substrate 50 in output phase 3.

Said reflective substrate 50 is characterized in that the main average ray-axis 33 is transmitted and reflected in a perpendicular direction, (angle a=90°) as direct emission E1d towards the illuminating surface 3, E1d is transverse with respect to the substrate 50 and is transmitted widthwise. The internal reflection means, the parabola perimeter 40, the extended version parabola collimator 40c are suitable so that the reflected rays E1r also pass through said substrate 50 across the width and with perpendicular incidence, (angle a=90°) on the illuminating surface 3.

Figure 13:
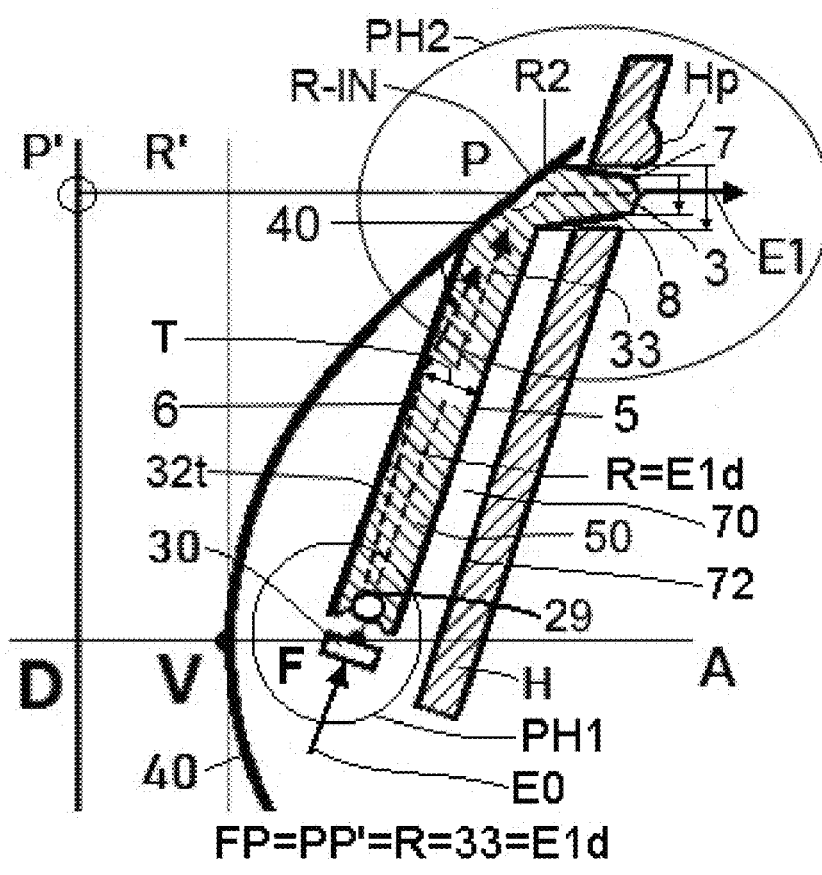

FIG. 13—Cross section of a reflecting substrate 50 hidden by an opaque cover H, the light source 30 has its entrance into the reflector 50 through the focal axis F parallel to the reflection surfaces 5 and 6, applies optical control means 29 on one edge and defines the light entry phase PH1, on the opposite perimeter it has the exit phase PH2 which is an advanced optical-reflector profile, applies concentration means of light based on a narrowing with the technical effect of increasing the concentration of emitted light E1 on the illuminating surface 3. In the reflector 50, the ray emitted by the tangential reflection 32t on the limiting surfaces 5 and 6 stands out as an axis. average ray 33 and its position is included at any angle between the directrix D equal to 0° and the axis of the parabola A, equal to 90° with respect to said directrix. The reflecting substrate 50 applies a change of direction in the emission focal axis E1 in the output phase PH2, towards the illuminating surface 3 and has a different direction to the source focal axis E0 in the input phase PH1. The separation between said surfaces 5 and 6 define a thickness T that is less than 10 mm.

Figure 14:
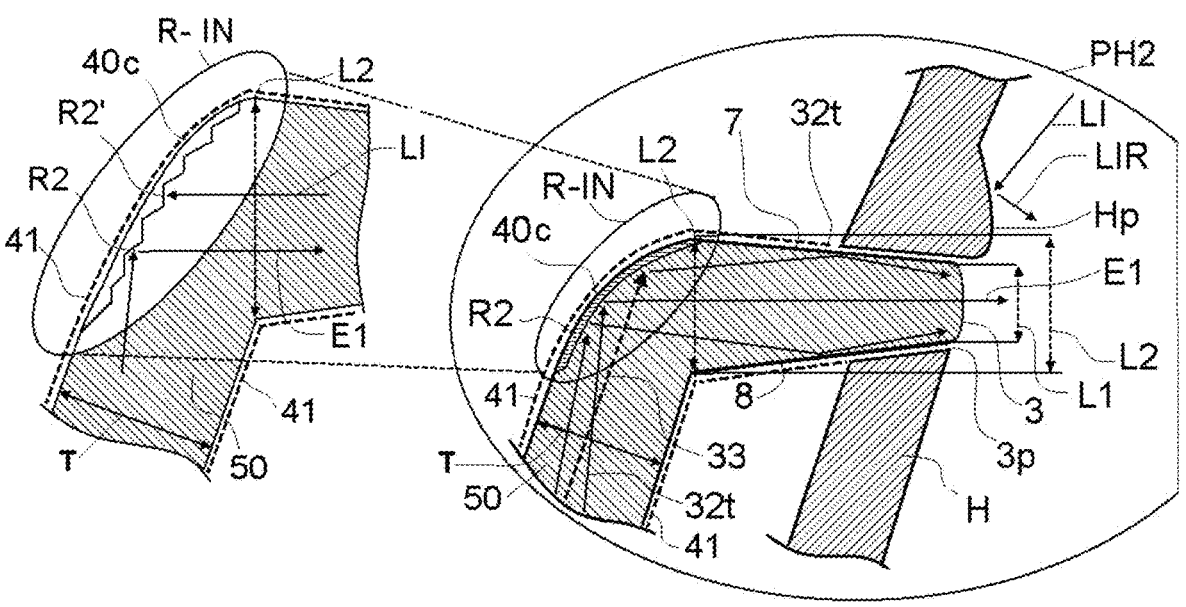

FIG. 14—Detailed view of the light output phase PH2 of the reflecting substrate 50 applies a taper between the surfaces 7 and 8 as concentration means by tangential reflection with a start to the end of the reflection parabola 40c defined by a distance L2 is reduced towards the illuminating surface 3 with L1<L2. The technical effect is that the opaque cover H hides the reflecting substrate 50. In the part associated with the linear opening 3p, the cover has a protruding projection Hp as protection against impacts and to prevent the incidence of external stray light LI on said illuminating surface 3, which becomes rejected reflected incident light LIR. In the zoom, it is observed that the internal reflection parabola comprises reflection means integrated by micro surfaces or nanometric development to define a collimated parabola 40c composed of reflection surfaces R2 and surfaces R2' that neutralize the external incident light LI. The separation between said surfaces 5 and 6 define a thickness T that is less than 10 mm.

Figures 15, 16:
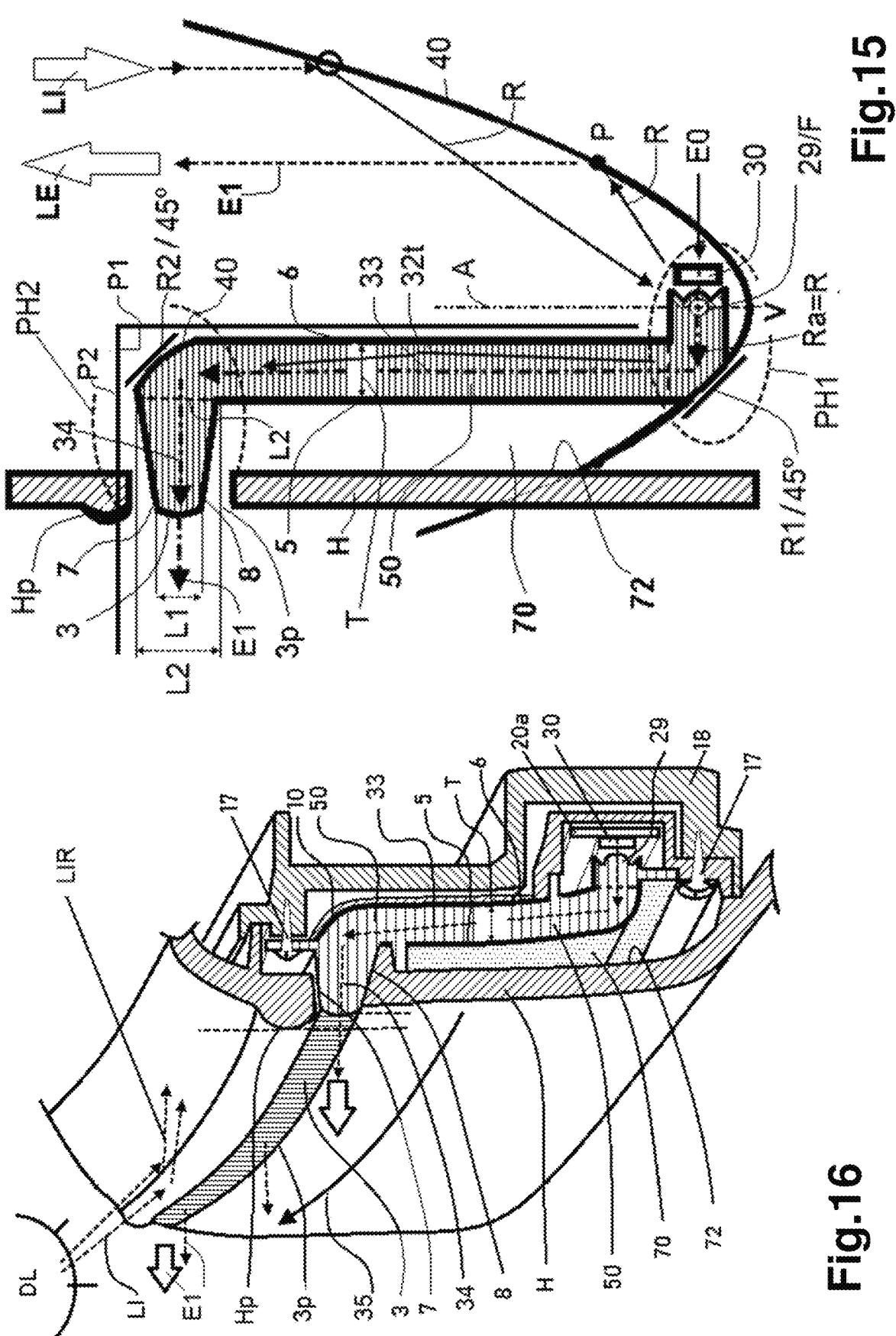

FIG. 15—Cross section of a reflecting substrate 50 hidden by an opaque cover H, the light source 30 enters the reflector 50 through the focal axis F perpendicular to the tangential reflection surfaces 5 and 6, it comprises optical means of control 29 by an edge of the reflecting substrate 50 and define the light entry phase PH1, on the side of one of the tangential reflection surfaces 6, the axis E0 of the light source 30 is parallel to the emission axis E1 generated by a second reflection in the output phase PH2, the ray emitted, transmitted and reflected in the reflecting substrate 50 is an average reference ray axis 33 and the tangential reflection 32t has a correction margin that allows the reflection surfaces to be replaced by other surfaces at approximately 45°, R1/45° and R2/45° of incidence and obtain a similar technical effect with the same result on the illuminating surface 3 of the emitted signal E1, without applying reflection parabolas. The reflecting substrate 50 is observed represented by the plane P1, the break or change of direction by the reflecting plane R2 and the plane by the position of the exit substrate between the surfaces 7 and 8 by the plane P2 that generates the illuminating surface 3 by the 3p opening; the reflective substrate 50 that copies the shape of the opaque cover H generates a space 70 that can be occupied with other functional devices.

FIG. 16—Cross-sectional view of a DS mixed signal device with reflecting substrate 50 hidden by cover H, similar to the concept of FIG. 15 but applied to the structure of a real indirect vision system arranged between chassis 18 and housing cover H; A line 35 is observed as an extrusion guideline in the design of said section, which is the method that allows integrating and developing an extended linear illuminating surface, leaving the entire reflection interface, source and reflecting substrate 50 hidden and protected from the incidence of external parasitic light. LI, DL.

Figure 17C:
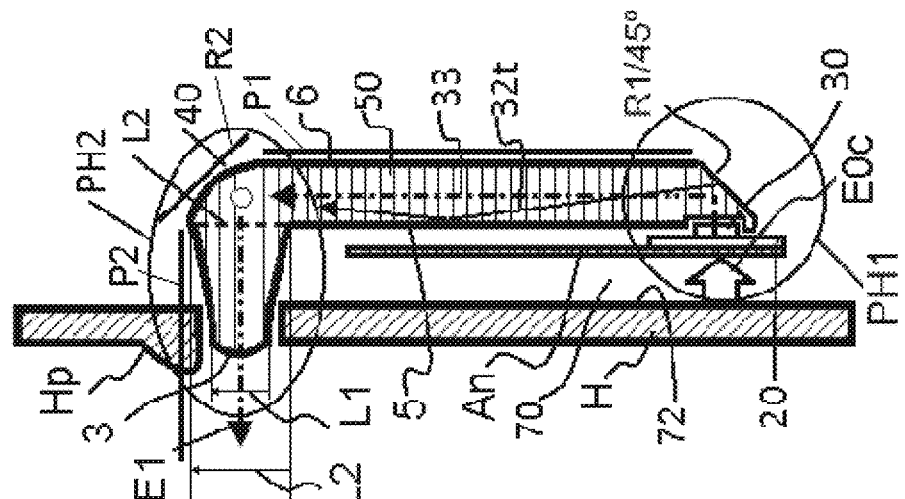
Figure 17B:
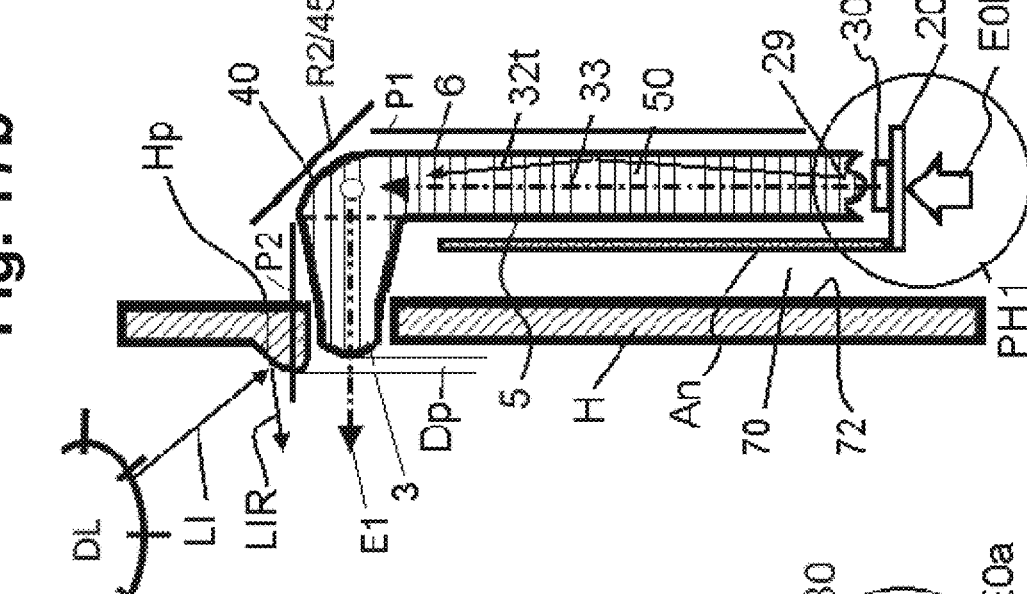
Figure 17A:
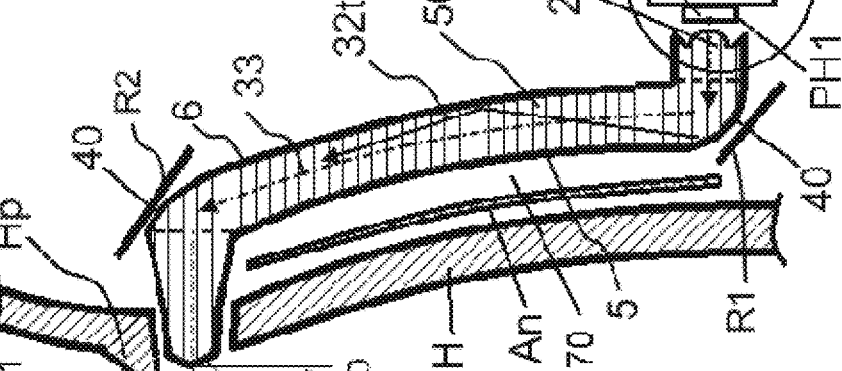

FIG. 17a, 17b, 17c—Views of different concept sections, similar to FIGS. 13, 14 and 15, It is characteristic that:

The focal axis E0, E0a, E0b, E0c of light source 30 is capable of being positioned at any angle between 0° and 180° with respect to the emission focal ray axis E1, which is always horizontal.

The illuminating surface 3 is never facing the source 30 or the reflecting substrate 50, which are hidden behind the cover H and free from the incidence of external light; It is always facing the inclined perimeter exit surface R2. Its input phase PH1 has optical or reflection control means 29 to direct the average emitted rays 33 from one of the perimeter parts of the reflecting substrate 50 towards the opposite perimeter part of the output phase PH2, representing the beginning of said phase. exit through the second reflector R2 or part of the reflecting parabola 40 or reflecting surface of similar effect;

FIG. 17a, the focal axis 30 is the same as the emission axis E1;

FIG. 17b, the focal emission axis is perpendicular to the emission axis E1;

FIG. 17c, the focal axis 30 is opposite to the emission axis E1.

In addition, there is a free space 70 and it is observed in all sections; As a characteristic of the multi-functional device, the circuit interface 20 of the LED 30 is associated with:

A circuit with antenna geometry An, (fractal or logarithmic),

A hidden reflector 50 and a hidden source 30.

The Hp casing surrounds and protects the illuminating surface 3 from the incidence of external light Dl, Li with a protruding distance profile Dp.

An opaque cover H that hides said reflector 50 and source 30 to integrate a multi-functional device An antenna+ multifocal light signal emission that emits to the front FS with several focal axes by sectors S1, S2, S3, and to the rear with a focal axis Sr, or by illuminating surface forward 3a, 3b, 3c, 3n . . . and backward 3R.

FIGS. 18a, 18b, 18c—Views of different sections in concept, similar to FIGS. 13, 14 and 15 and FIG. 17a, 17b, 17c where the focal axis of light source E0 is observed in a similar direction in the same or opposite direction with respect to the emission focal axis E1, but the input phase is not on an edge or part of the perimeter of the substrate 50, the reflector 50 is still hidden and the source 30, which is in an intermediate area, has input means to make a perpendicular reflection 29 and R-EX using the method in concept of the FIG. 9 external reflecting parabola, alternatively it can be replaced by a cone or similar perpendicular reflection effect surface. It is seen in FIGS. 18a and 18b that the light output emitted and therefore the illuminating surface 3, is double, that is, it represents the perimeter of a closed or semi-closed linear geometric figure and the hidden reflector 50, does NOT have a front view with a parabola perimeter. 40 or collimated parabola 40c, therefore it fits into the concept of FIG. 11 as a hidden body perpendicular to the emission axis A and is also capable of being chained to other sectors combining different concepts and characteristics, forming part of the same reflecting body 50 of a DS mixed signal device with emission sectors and multiple focal axes capable of developing different shapes in illuminating surface design 3 of lines and integrated perimeter geometric figures.

It stands out in FIG. 18*b*, the cover H has a depression Ad/70 to establish an aerodynamic channel, that is, in addition to hiding the reflector 50, it has the technical effect of channeling the air flow 71 in one direction.

As variants of the light input path of the source 30, LEDs with perpendicular focal axis optics, or "L" mounting LEDs, or two LEDs with mounting on opposite faces in the introduction support circuit 20 can be introduced into the substrate. at entry 29 and its source axis coincides with the main ray-axis of the substrate.

Figure 19:
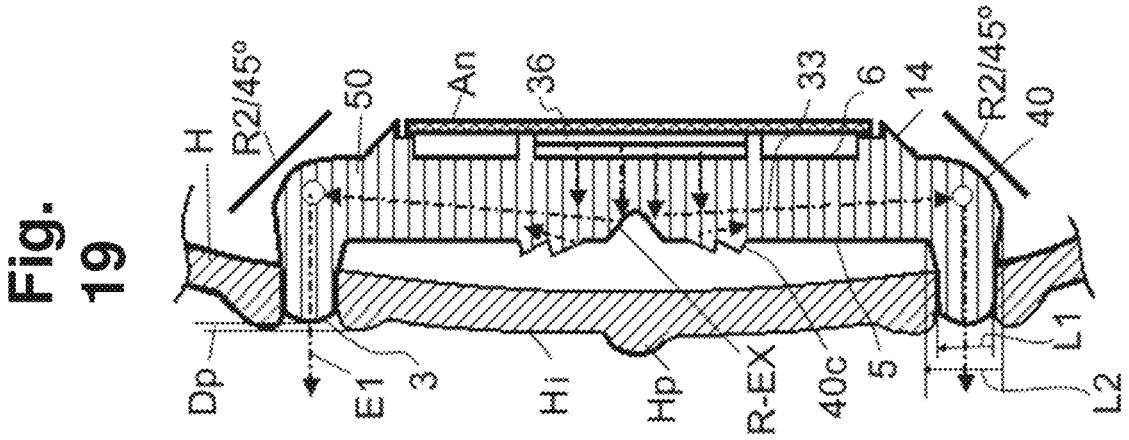

FIG. 19—View of a section similar in concept to FIG. 18*b* but the light source is an OLED electroluminescent substrate, or a multi-chip light strip of light diodes 36, where the substrate support 36 also has an antenna geometry An, integrated on the other side of the PCB (printed circuit board) printed circuit board support.

Figure 20B:
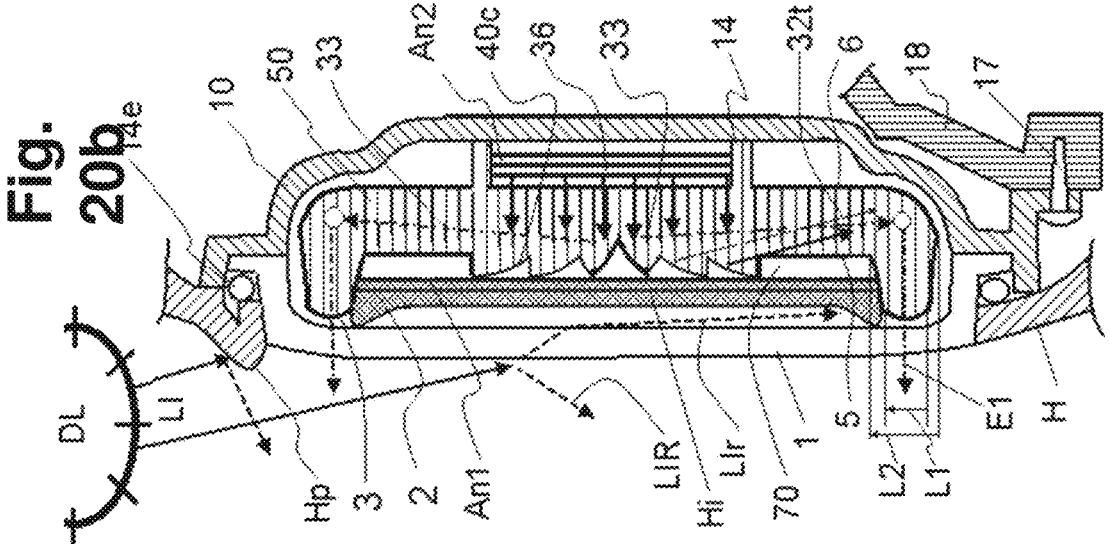
Figure 20A:
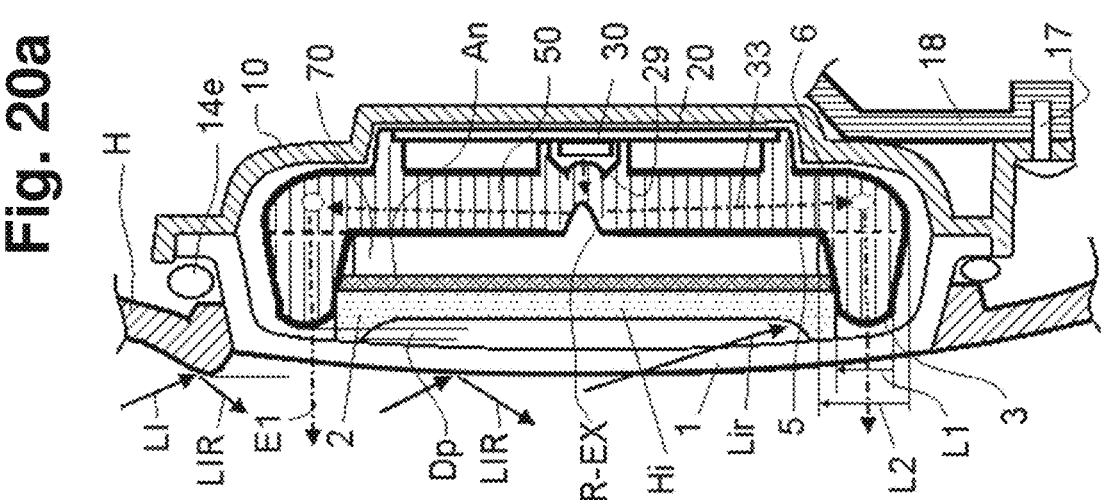

FIGS. 20*a*, 20*b*—View of a section in concept similar to FIGS. 18*b* and 19, but the entire optical body, hidden reflecting substrate 50 and illuminating surface 3 and its entry phases, reflection and distribution of the emitted light, are behind a transparent cover 1 so the cover that hides the reflector 50 is an opaque cover 2 capable of being of lesser thickness or a film capable of having a laminar volume 70 occupied and associating at least one antenna circuit An, or An1 and An2, in this way obtaining a technical effect of developing a device for various radio frequencies, and an extra reflection of the external parasitic light LI.

FIG. 21—Anterior perspective view of a rearview mirror as a VIS indirect vision system with a DS mixed signal luminous device, the sectors of the signal emission field are observed with different emission focal axes E1 and its corresponding illuminating surface which begin at the point closest to the body of the vehicle 3*a*/S1; 3*b*/s2, 3*c*/S3 for the front signal FR, and 3R for the rear signal emission RS, evidently the signal device is arranged behind the mirror M1 and the opaque surface 53 of the 80*x* widened frame defines a signal area of a shadow area where the driver's eyes are, in this way the signal does not influence the vision of the images of said mirror M1, or part of the extended field of vision M2.

Combination of lines and partially closed luminous figures, see section BB, and CC that uses the concepts described in previous figures, the cover H that hides the reflector 50 and the source 30, and for its part in protrusion Hp, protects from blows and generates a aerodynamic channeling.

FIG. 22—Rear perspective view of a VIS indirect vision system with a rearview mirror M1 and a multifocal mixed signal device DS, the design and shape characteristics of the housing Hc are observed as a block divided into three vertical thirds T1, T2, T3, T1 being the third closest to the CAR body of the vehicle, block T1 begins on a line 0 coinciding with the frame 80 in the area closest to the driver and body of the vehicle, the frame 80 which is wide homogeneous, and has an 80*x* widening in the third T3 furthest from the body where it has;

the rearward signal output RS located externally by means of the illuminating surface 3R with a rearward focal axis Sr and, the output of the anti-stress locator 51 located in the inner widening of the 80*x* frame with a different focal axis VC oriented to the driver's vision DV.

Starting from the frame in the first third T1, the frame 80 presents a vertical line 0 where a protruding protrusion begins in direction TO towards the driver's eyes, that is, outwards from the cover, which is an appendage Hx with two functions, improving the aerodynamics and house a warning signal from the blind spot detection system BLIS, Bs, Bs' that uses the same technique and concept of hidden reflector 50 and perimeter illuminating surface 3 with the technical effect of concentrating the signal emission as in FIG. eleven; and also has the effect of channeling the aerodynamic flow into a channel between the structure and the body of the CAR vehicle.

An area of an RFID identification reader 54 is observed on the support 81 as an assistant to identification systems and access keys or activation of coded functions for the vehicle, associated with a ScS side camera.

The signal device DS is arranged behind the mirror M1 and the opaque surface 53 of the widened frame 80*x* (see FIG. 21) defines a boundary line 00 with a signal area 01 differentiated from a shadow area 02 where the driver's eyes are. this form the signal does not influence the vision of the images of said mirror M1, or part of the extended field of view M2). Furthermore, the light output part of the anti-stress locating device of the mirror M1 is an independent illuminating surface 51 that occupies an opening 4*p* in said widening of said frame 80*x* that provides an opaque area 53 surrounding said witness light output 51 to increase its contrast with the technical effect of automatically facilitating the location of the mirror M1, or M2, creating intuitive behavior in anti-stress mode. The sensor and a ScS side camera stand out for the recognition function and access by RFID key on the support fixed to the body 81.

Figure 23:
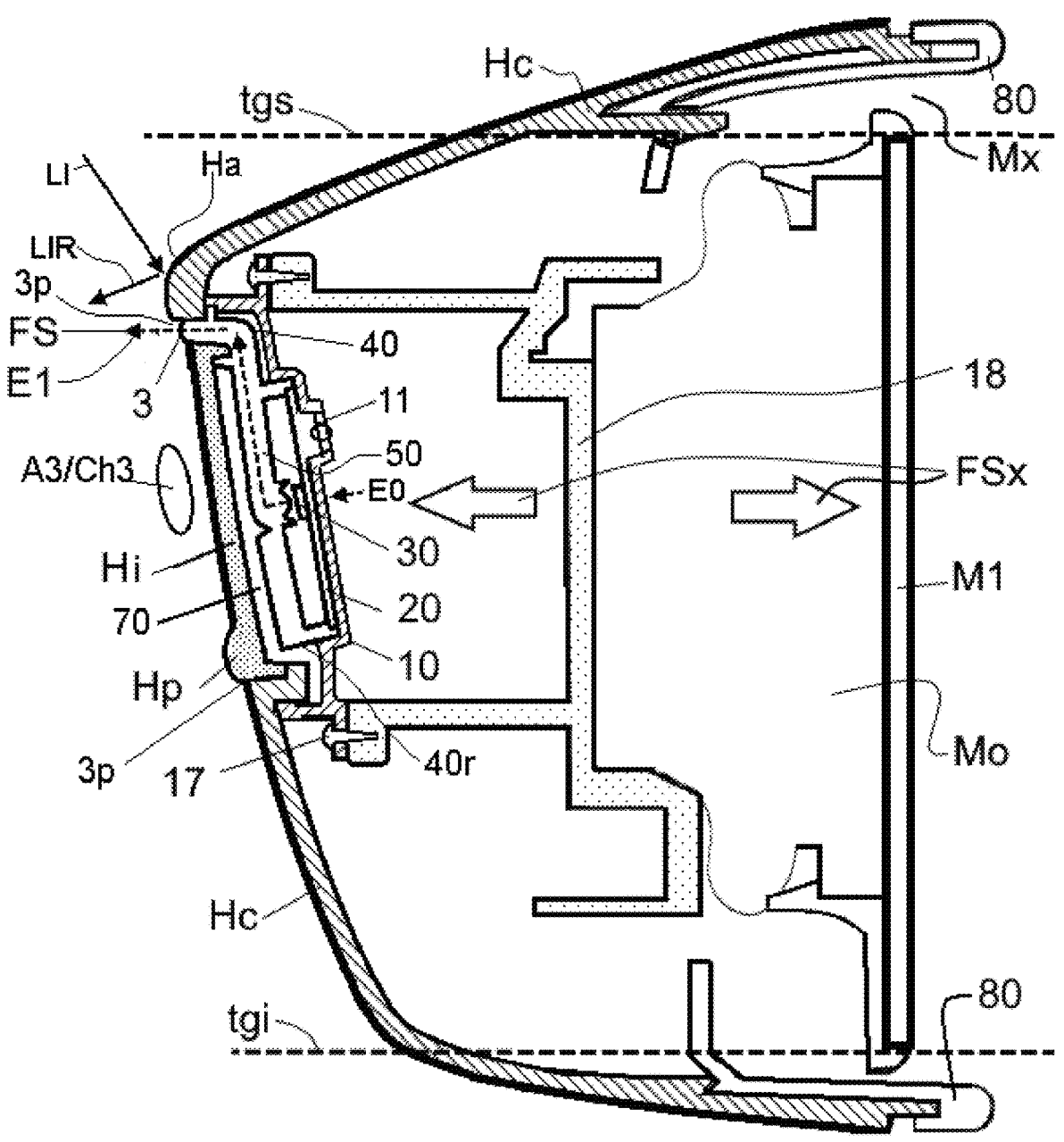

FIG. 23 BB—Vertical section BB of the assembly of the indirect vision system by mirror M1 according to FIG. 21, a concept of hidden reflector 50 and light source 30 hidden by the cover H similar to the concept FIG. 18*c* is observed, it is characteristic is the front signal FS arranged in the horizontal plane FSx, behind said mirror M1 as indicated by the position arrows, between an upper and lower horizontal tangent tgs and tgi. And it also has a substrate volume 70 between the opaque cover H capable of incorporating other devices, and the transparent output surface 3 faces the perimeter reflector 40, while the source 30 and the reflector 50 are hidden.

The triple function of the casing Hc and cover H associated with the signal with an advancing profile Ha is seen;

aerodynamic, forms the side channel Ch3 for air outlet A3.

HP shock protection, protection against external light incidence LI.

Figure 24:
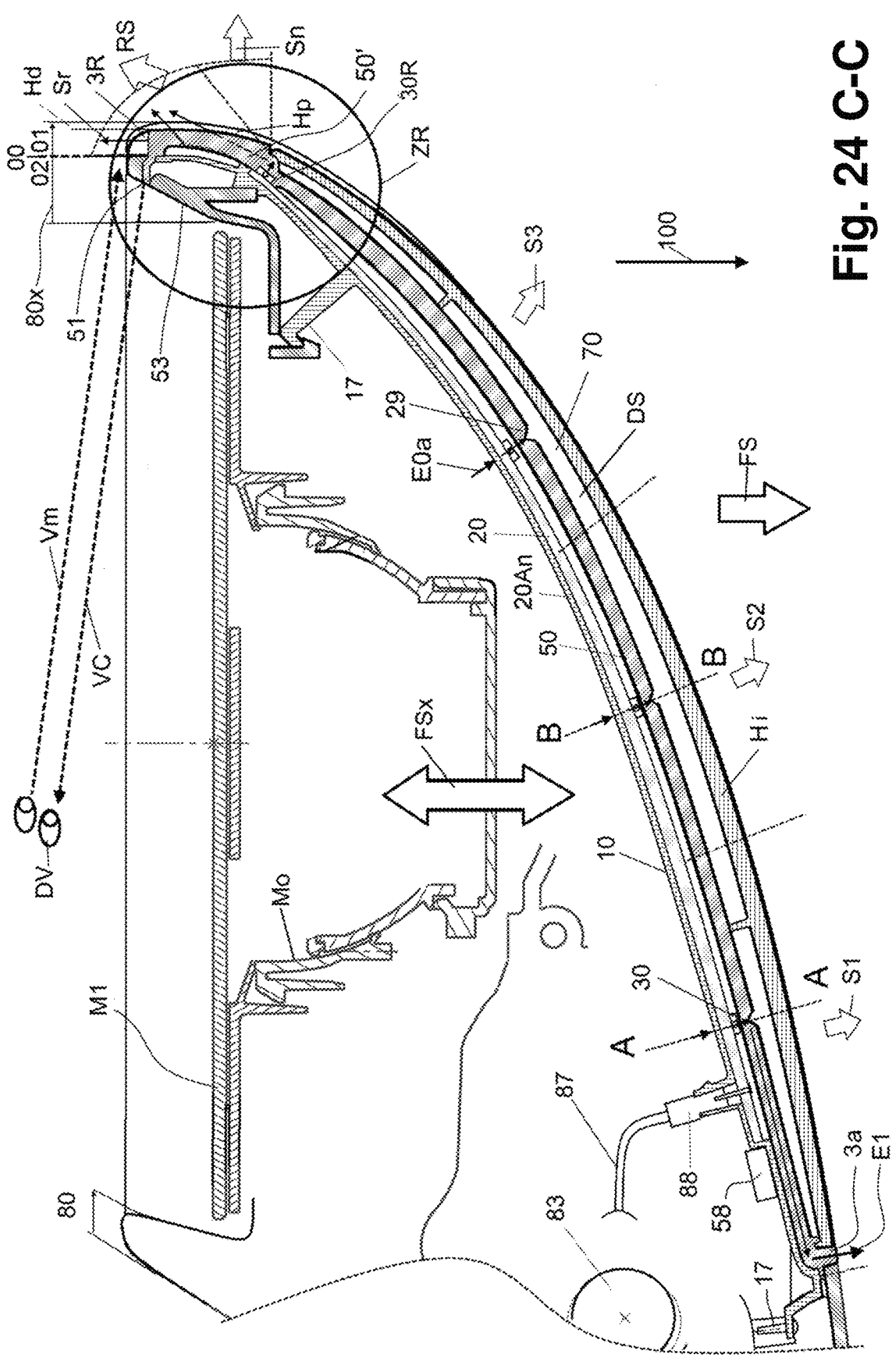

FIG. 24 CC—Horizontal section CC of the assembly of the indirect mirror vision system M1 according to FIG. 21, the hidden reflecting substrate 50 is seen arranged behind the opaque cover H, its chained sectors forming part of the same reflector 50, the interface circuit 20 of the light source, the distanced emitters 30 corresponding to each sector S1, S2, S3, and 30R for Sr, and their corresponding optical light entry means 29. Highlights the emission focal axis E1 of the front signal device FS which is horizontally positioned behind the mirror M1 according to the position arrows FSx, and the driver's vision point DV located in the shadow area 02 to develop the vision of the mirror Vm starting from the differentiated limit 00 of the signal area, but with vision of the anti-stress locator signal 51 through a focal axis VC of the light source 30R of said signal DS in its rearward sector RS, said window 51 is surrounded by an opaque surface 53 part of the 80*x* widened frame and has the technical effect of creating an intuitive anti-stress help behavior to easily locate the M1 mirror.

It reveals the extent of the substrate volume 70 between the opaque cover H and the hidden reflector 50 that occupies the part of the front sectors S1, S2, S3, coinciding with the front emission area FS volume that allows having a 20An printed antenna circuit. The reflective substrate 50 and the source are hidden and free from external light incidence behind the independent opaque cover Hi.

Figure 25:
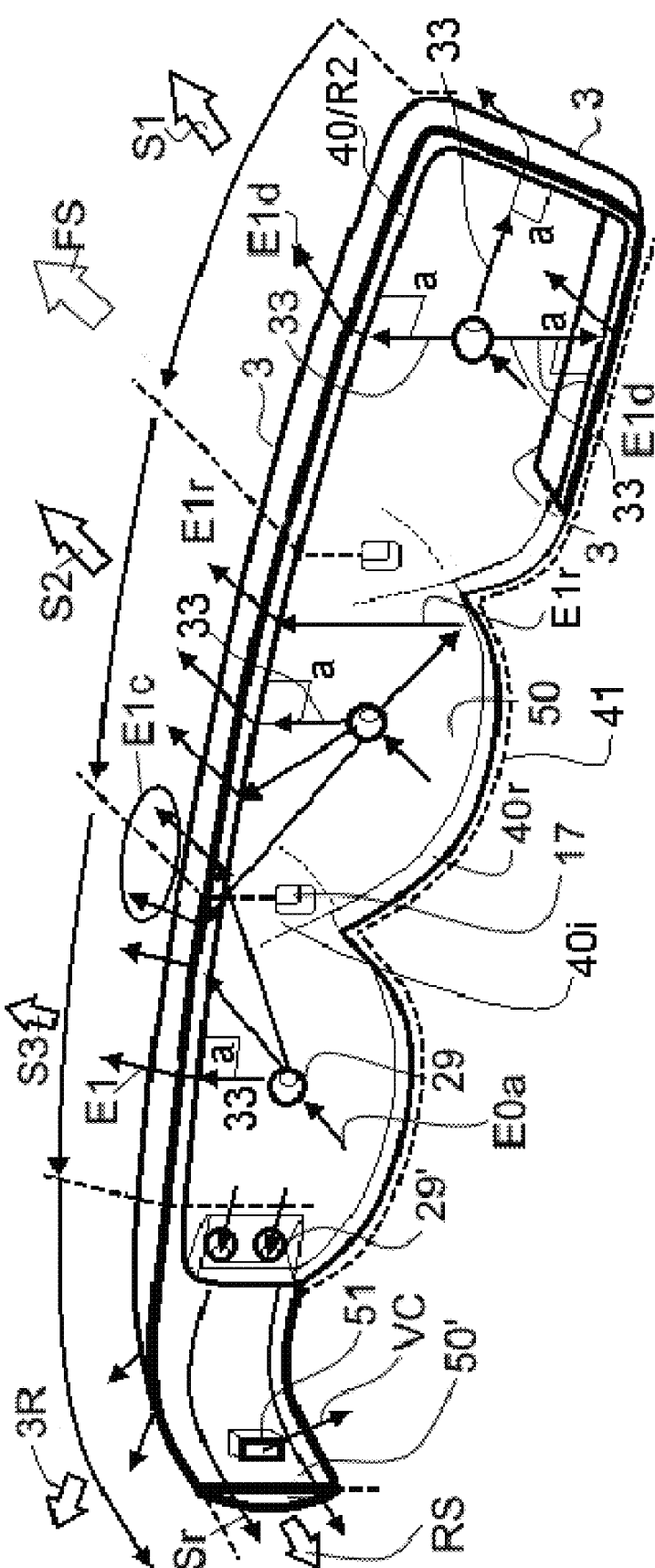

FIG. 25—Optical body of the mixed signal DS composed of the hidden reflecting substrate 50 and the illuminating surface 3 that emits signal in different focal axes, the sectors of the reflector 50 chained with interference zones 40*i* are observed, sector S1 stands out. that the entire perimeter has an illuminating surface, unlike sectors S2 and S3, which part of its perimeter is a parabola of internal reflection 40*r* and the opposite side is the perimeter and is an exit surface.

The illuminating surface 3 is linear and always faces said exit perimeter surface R2. The rear signal sector 3R emits the rear signal RS is a light guide with a second independent light output 51 which is the anti-stress locator. The beams emitted by different reflection transmission methods stand out: direct E1*d*, reflected E1*r* and combined E1*c* are always horizontal.

It is observed in process to prevent the leakage of interior light the parabolic reflectors 50 based on a cover, paint or deposit of material 41 that favors reflection metallic or film or reflective paint part of the industrialization method.

FIG. 26—Explosion of the mixed signal device DS with the reflector hidden 50 by an opaque cover H, its circuit interface 20 that includes temperature dissipating tracks 20*t* and tracks on the opposite side of the PCB circuit that function as antenna 20An, and the inner cover 10 to prevent the leakage of interior light and facilitate the fixation 17 and connections of the anther and lights 21, 22.

Figure 27:
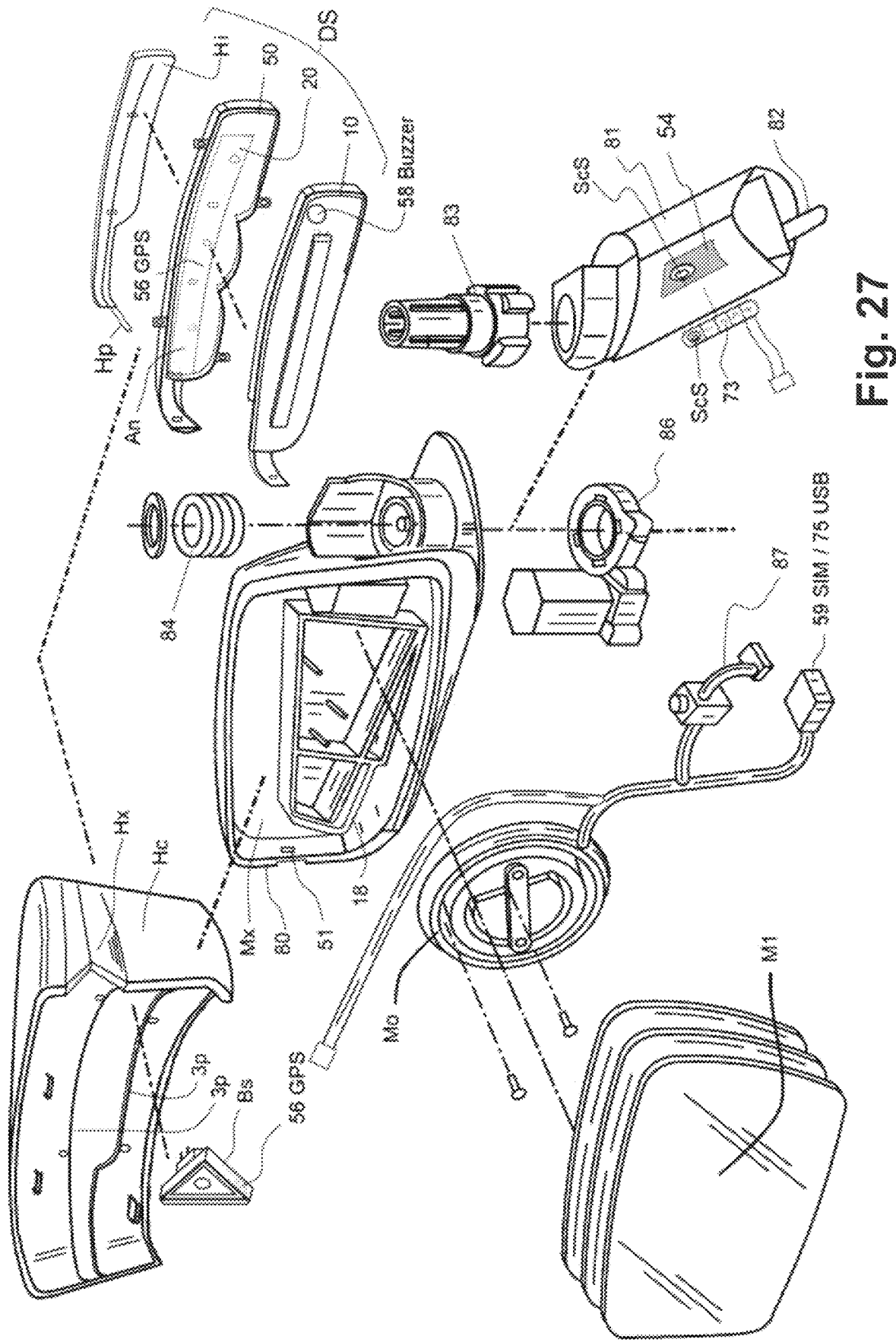

FIG. 27—Explosion of the entire indirect vision system VIS by mirror M1 with mixed signal device DS, blind spot and lane change detection system warning Bs, and RFID 54 identifier detector and ScS surveillance camera on the support 81. In addition to Mo actuators, rotation motors 86 and cables 87. The connector inside the vehicle for a USB port 75 or a SIM card stands out, part of the interface divided into two parts of the GPS or Bluetooth location system or associated antennas located on the DS signal device. And also the access key keyboard module 73, the RFID detection module and the remotely monitorable ScS side security camera, located on the support 81.

Figures 28, 29:
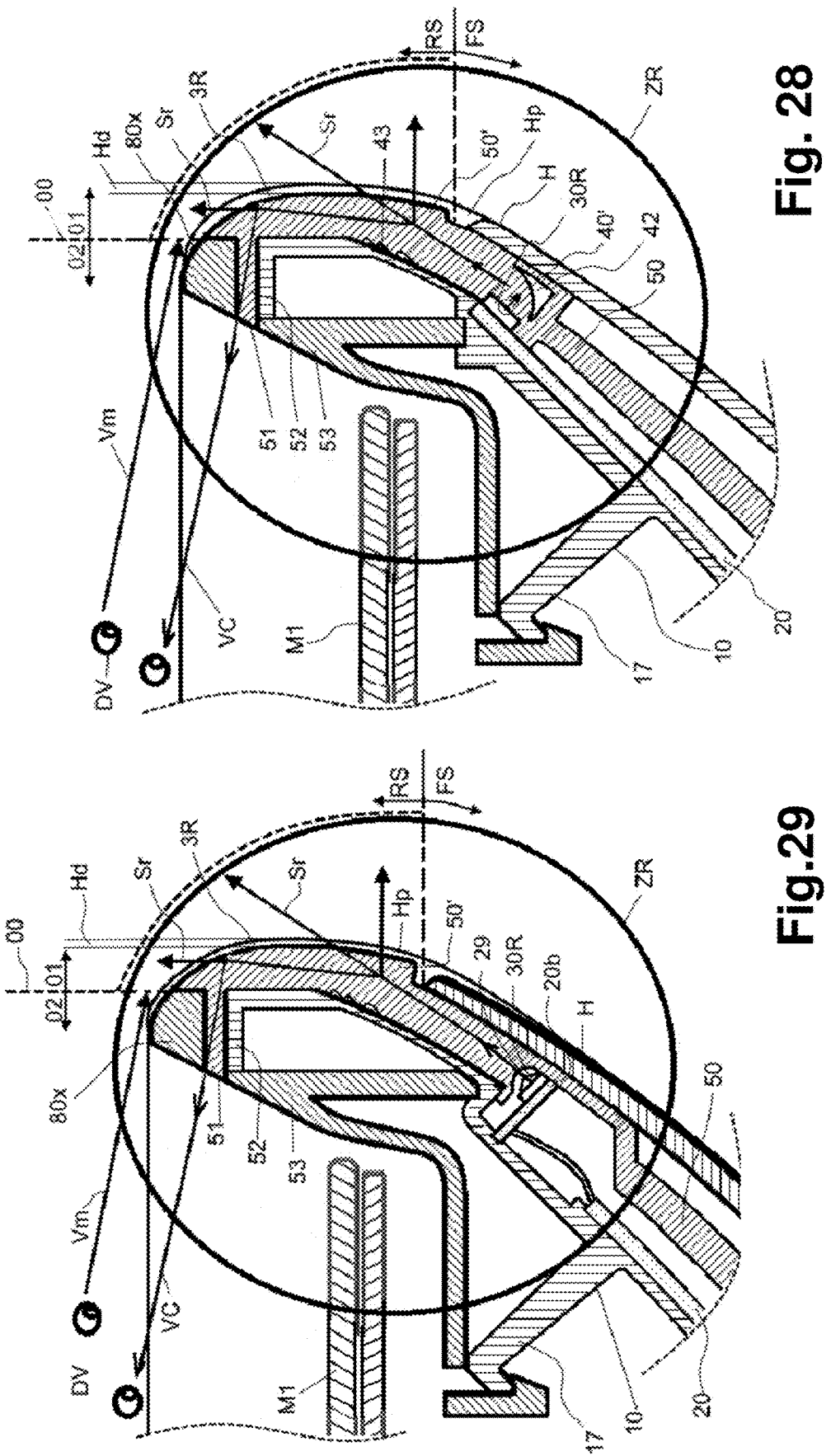

FIG. 28—Detail of FIG. 24 CC when the optical means of the backward signal RS is a light guide that has an illuminating surface 3R; As an example of application and solution, the light source axis 30R is perpendicular to the rear emission focal axis Sr, it has a parabolic or similar sub-reflector 42 40' which is an interposed perforation to create an internal reflection surface, also susceptible to carrying a cover or paint that favors reflection. It has a higher level of protrusion of the HP cover as a protection solution for the transparent body from impacts and light output antistress mirror locator M1 associated with the complex optical body of the reflector 50 and the driver's vision DV.

FIG. 29—Detail of FIG. 24 CC when the optical means of the backward signal RS is a light guide that has an illuminating surface 3R as another example of application and solution, the light source axis 30R is similar to rear emission focal axis Sr, has optical control means 29.

Figures 30A, 30B:
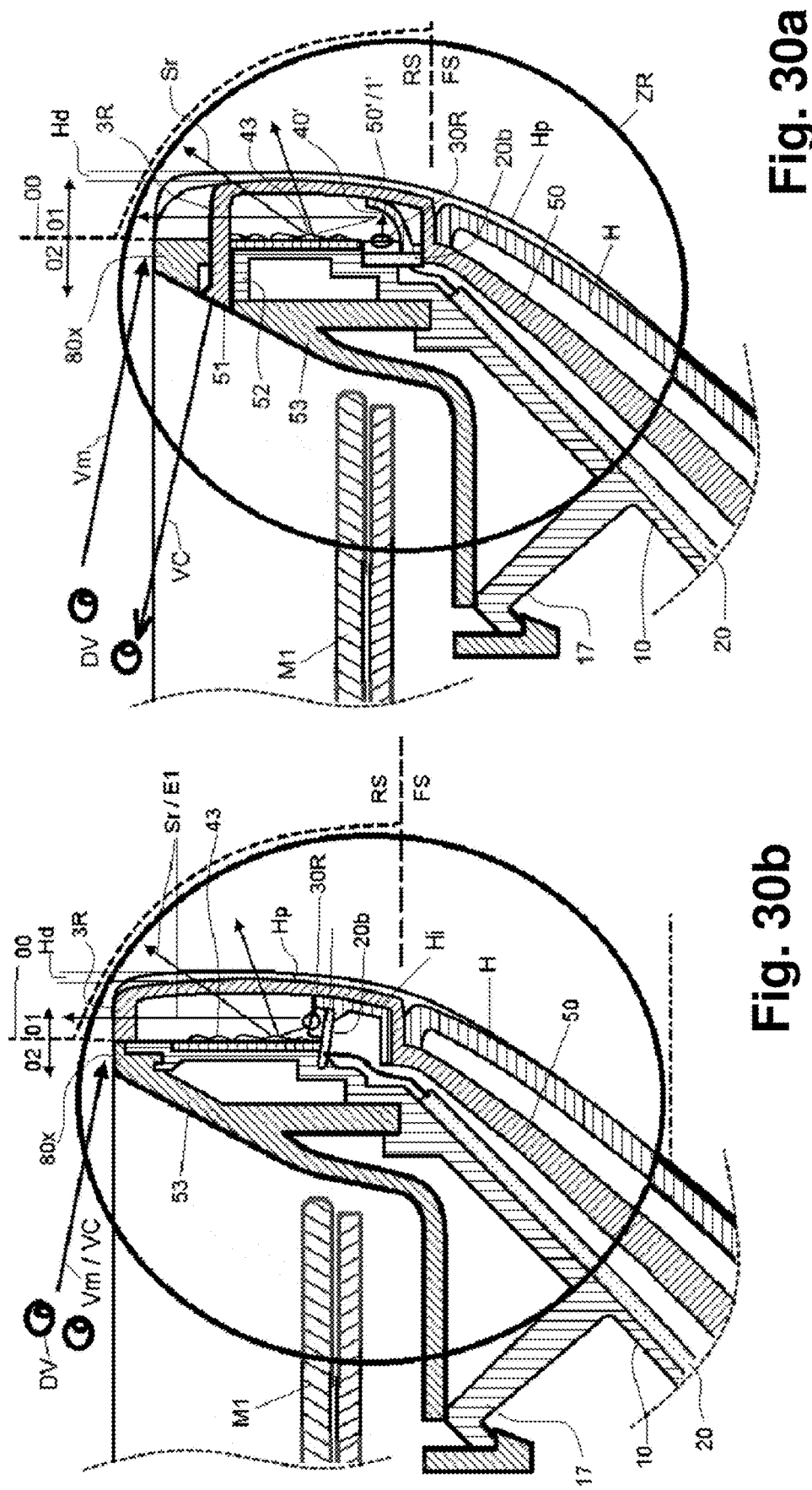

FIG. 30*a*—Detail of FIG. 24 CC, as another example of application and solution, the optical means of the backward signal RS, NOT a light guide, presents an illuminating surface 3R with a hollow area below and when with the emission axis of the light source 30R being perpendicular to the rear emission focal axis Sr, a counter-reflector 50' stands out, comprising a reflecting parabola 40' upstream of the focal axis of the light source 30R, and the reflector 50 becomes an external transparent cover 1'.

FIG. 30*b*—Detail of FIG. 24 CC, as another example of application and solution, the optical means of the backward signal RS, NOT a light guide, presents an illuminating surface 3R with a hollow area below and when the emission axis of the light source 30R is similar to the rear emission focal axis Sr, it has an internal cover Hi that covers the circuit 20*b* and the source 30R, with rear reflection correction means 43, and the reflector 50 becomes an external transparent cover.

It is observed as another example of application and solution that "NO" has an anti-stress locator light output through an independent illuminating surface 51 and the eyes of the driver DV observe part of the illuminating surface of the 3R of the rear emission part RS device signal causing a similar anti-stress localization effect of the M1 mirror, but it is a parasitic and invasive signal vision of the DV driver's field of view that should be reserved at a low level of regulated intensity, it is dangerous in rainy days, Total darkness or fog likely to disturb and blind the driver when looking at the M1 mirror.

Figures 31, 32:
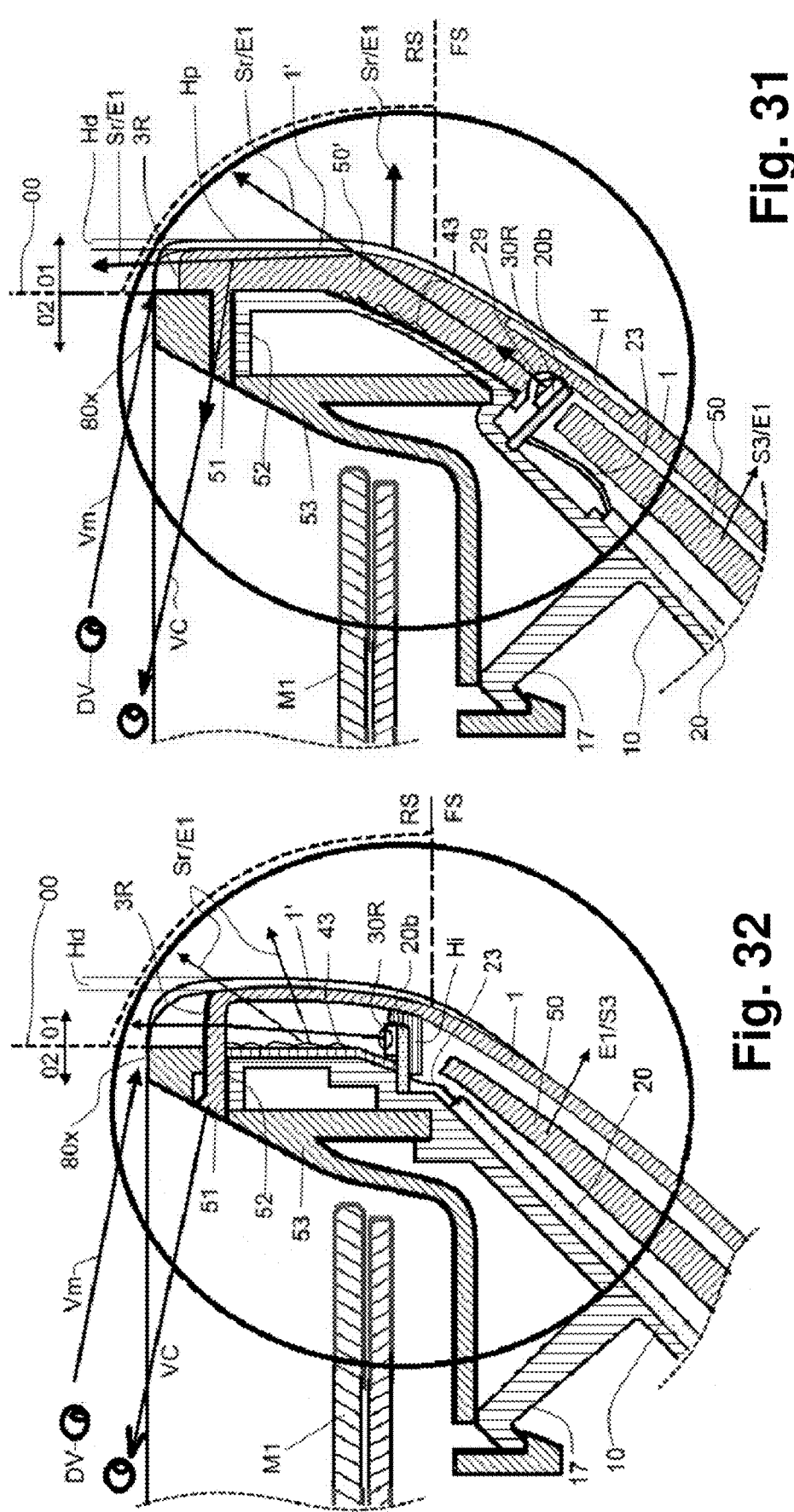
Figure 39:
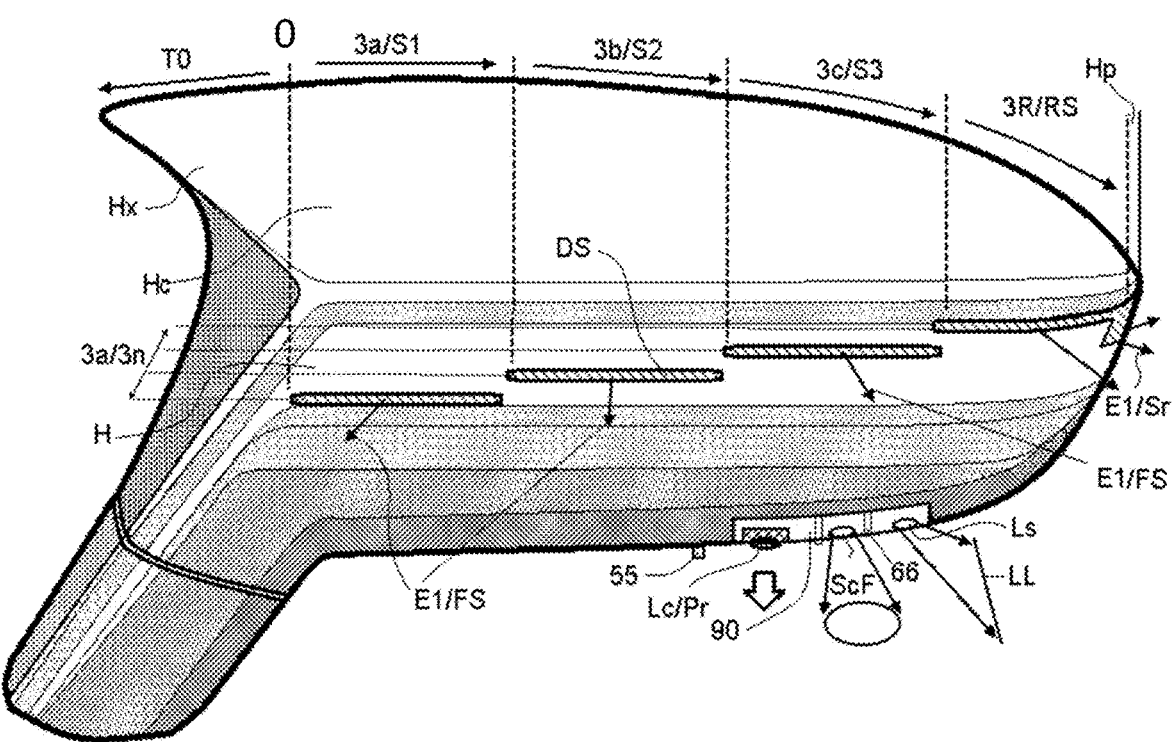

FIG. 31—Detail of the backward signal RS as another example of application and solution, when it has the reflecting body 50 and separately a transparent cover 1 and said cover in the rear emission sector RS is a light guide 50' which has an illuminating surface 3R with the light source axis 30R similar to the rear emission focal axis Sr, has optical control means 29 and entry of the light source into said light guide 50' and a cover H that It is part of the cover H flush with said external opaque illuminating surface associated with the technical effect of optimizing the light emitted backwards and avoiding dispersion, this level of cover is independent of another level in protrusion of the same cover H or Hc that has the technical effect as protection against impacts, and is similar to the parts of the external cover H that cover sectors of the illuminating surface 3*a*, 3*b*, 3*c*, 3R when they correspond to designs of separate sectors FIG. 39 and favors rejecting the incidence of external stray light LI or to the pipeline aerodynamics towards the side. It works associated with the protrusion level Hp of shock protection, to define the aerodynamic channel between both levels. Ch3

FIG. 32—Detail of the rearward signal RS when it also has the reflecting body 50 and separately a transparent cover 1, said cover in the rearward emission sector RS, "NO" is a light guide therefore it is a transparent cover 1' having an illuminating surface 3R with a hollow area below and the emission axis of the light source 30R similar to the rear emission focal axis Sr, and presenting the LED of the rear light source 30R direct with reflection correction means 43 and a Hi cover above said source 30R.

Figure 33:
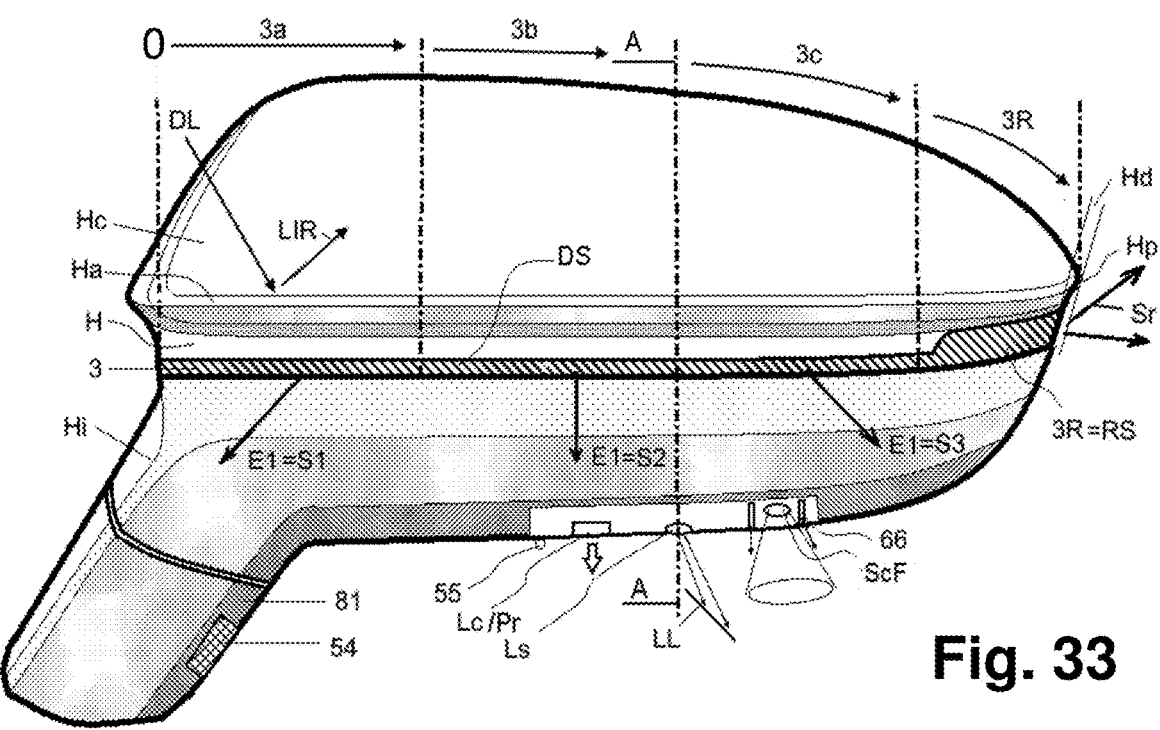

FIG. 33—Front view of a combined multi-functional indirect vision system, which has a mixed multifocal signal device DS, a rear-view mirror M1 and associated a lower multi-functional module with a front camera system ScF, in addition to other functions; complementary infrared lights 66, logo projector or courtesy light Lc/Pr, laser line Ls projector LL, temperature sensor 55, personal income tax key identifier 54. It comprises a linear design of chained sectors 3*a*, 3*b*, 3*c*, 3R which generates a high intensity illuminating surface 3 from end to end of the front of the assembly on the cover Hc that has a triple function associated with said illuminating surface 3, comprising;

An advanced zone Ha with the technical effect of avoiding the incidence of external light LI, Protection against impacts on the signal transmitter in the area away from the 3R bodywork and, Orient the aerodynamic fluid in a lateral or lower channel. Ch2, Ch3.

Figure 34:
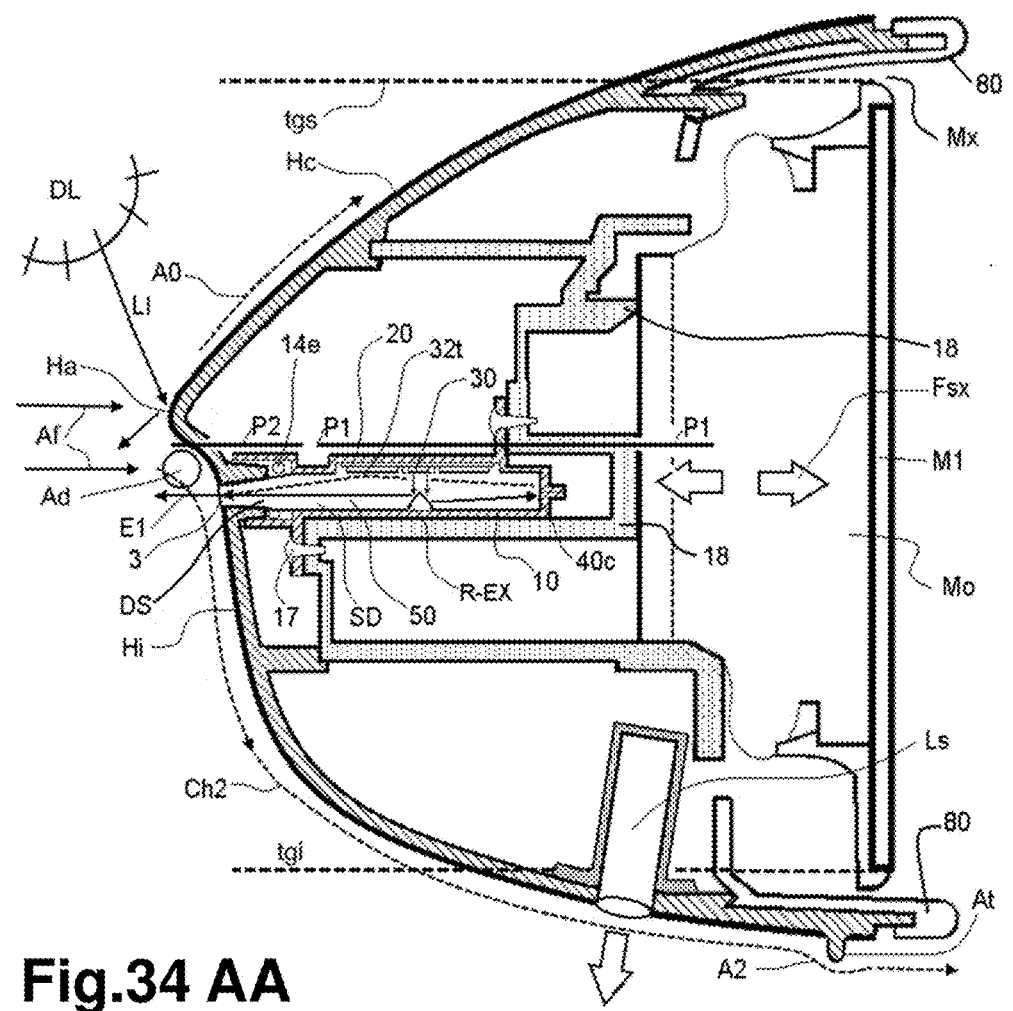

FIG. 34 AA—Vertical section AA of the indirect mirror vision system assembly M1 according to FIG. 33, as another example of application and solution, the hidden reflective substrate 50 associated with the chassis of the assembly 18, arranged perpendicular to the cover or casing of the Hc system, the reflector 50, the advanced reflective light concentration profile coincide on the same axis, the light source 30s lateral and equal is hidden and "NOT" behind the illuminating surface 3.

The Ha advance cover associated with the illuminating surface 3 of the DS signal emitter generates the triple technical effect; avoid the incidence of external light LI, protection against impacts on and orientation of the aerodynamic fluid through the depression area Ad, towards a lower channel Ch2 and has an associated lower anti-turbulence projection A2 with the technical effect of avoiding turbulence and dirt on mirror M1.

<<<<<<<<<<<

Figure 35:
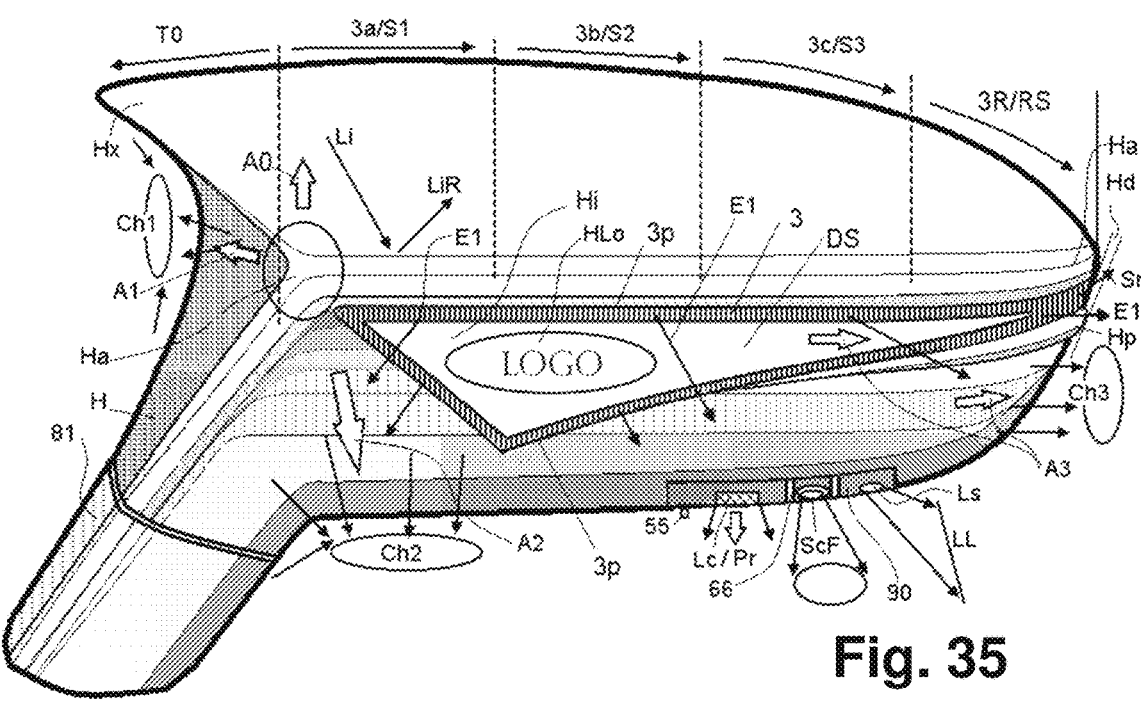

FIG. 35—Front view of a combined poly-functional VIS indirect vision system, it has a DS multifocal mixed signal device with a ScF front camera and infrared light 66 to support night vision. The illuminating surface 3 is a closed perimeter geometric figure and comprises an internal cover or independent lid Hi that hides the reflecting substrate 50 and its associated light source, it is interchangeable customizable capable of carrying a Hlo identifying logo or icon developed by any graphic technique, low relief, change of material, openwork with over-injection, bi-material or similar. The advancing shape of the shell H from the area Ha stands out, which in combination with a protruding projection Hx, produces the technical effect of channeling the aerodynamic fluid without turbulence in four channels, Ch1 of the structure of the VIS assembly towards the body of the vehicle, Ch2 downwards, Ch3 towards the side and A0 upwards, at the same time preventing the incidence of external light LI, protecting against impacts on the signal emitter in the area away from the body 3R.

Figure 36:
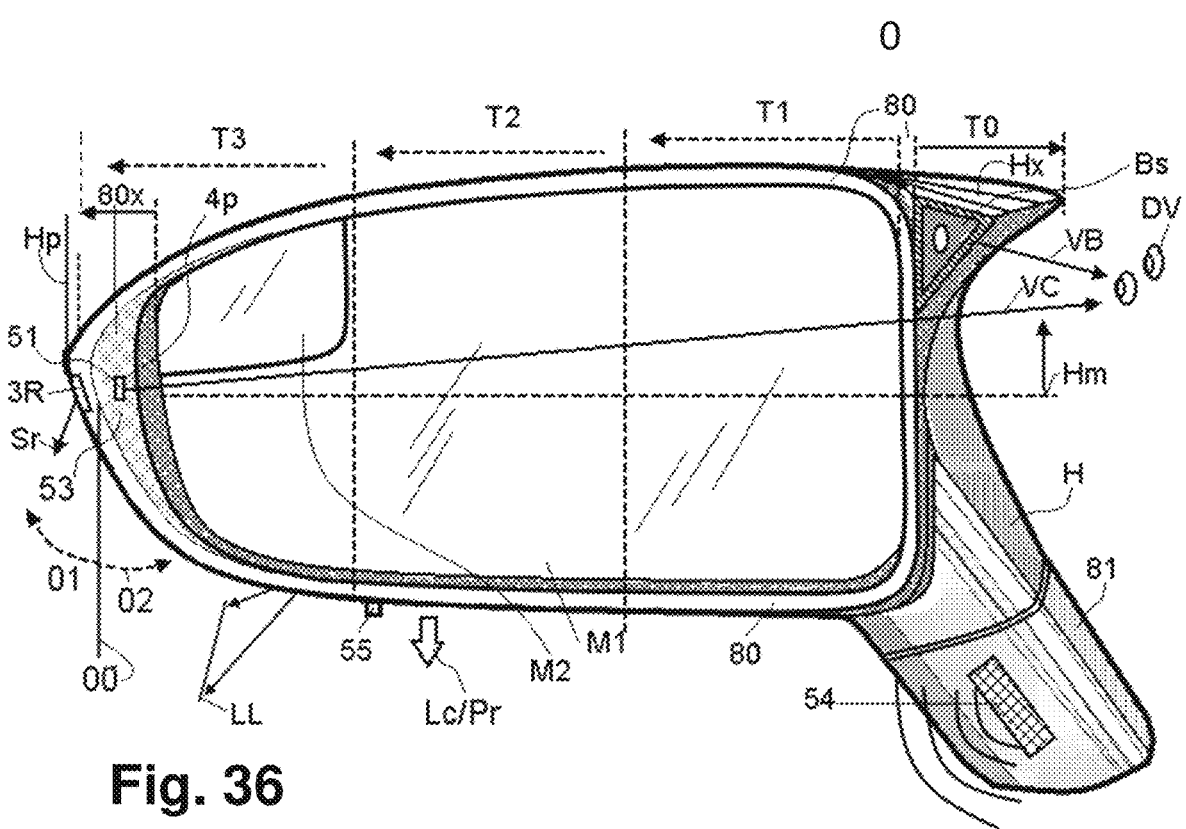

FIG. 36—Rear view of a rearview mirror as a VIS system with multifocal mixed signal DS, corresponds to FIG. 35, the housing H or Hc and frame 80 considered as a block is divided into three vertical thirds T1, T2, T3, the third T1 is the closest to the CAR body of the vehicle, in block T1 it begins at a line 0 coinciding with frame 80 in the area closest to the driver's eyes and body of the vehicle and divides the casing H into two horizontal blocks from a median plane Hm, it is characteristic, the frame 80 which is of homogeneous width in the T1 and T2 third blocks, and has an 80x widening in the third T3 furthest from the CAR body, has an external part, it is the rear signal output RS with illuminating surface 3R and horizontal focal axis Sr, and an internal part has the opaque anti-reflective surface 53, it has the independent signal output 51 anti-stress locator of the mirror M1 and spotter M2, the thirds that vertically limit the housing are They begin on a line 0, which coincides with the mirror frame M1 in the area closest to the CAR body. It is the beginning of area TO, which is characteristic of the middle block above the plane Hm and in the direction of the driver's eyes DV, a protruding projection of The cover is the appendix Hx, (part of the general cover of the casing H), this projection Hx performs two functions;

Help and safety function, houses a Bs warning signal from the BLIS blind spot detection system that emits a focal axis VB oriented to the driver's eyes DV, Aerodynamic function, generates an air channel Ch1 towards the CAR body to avoid turbulence with air A1.

Figures 37, 38:
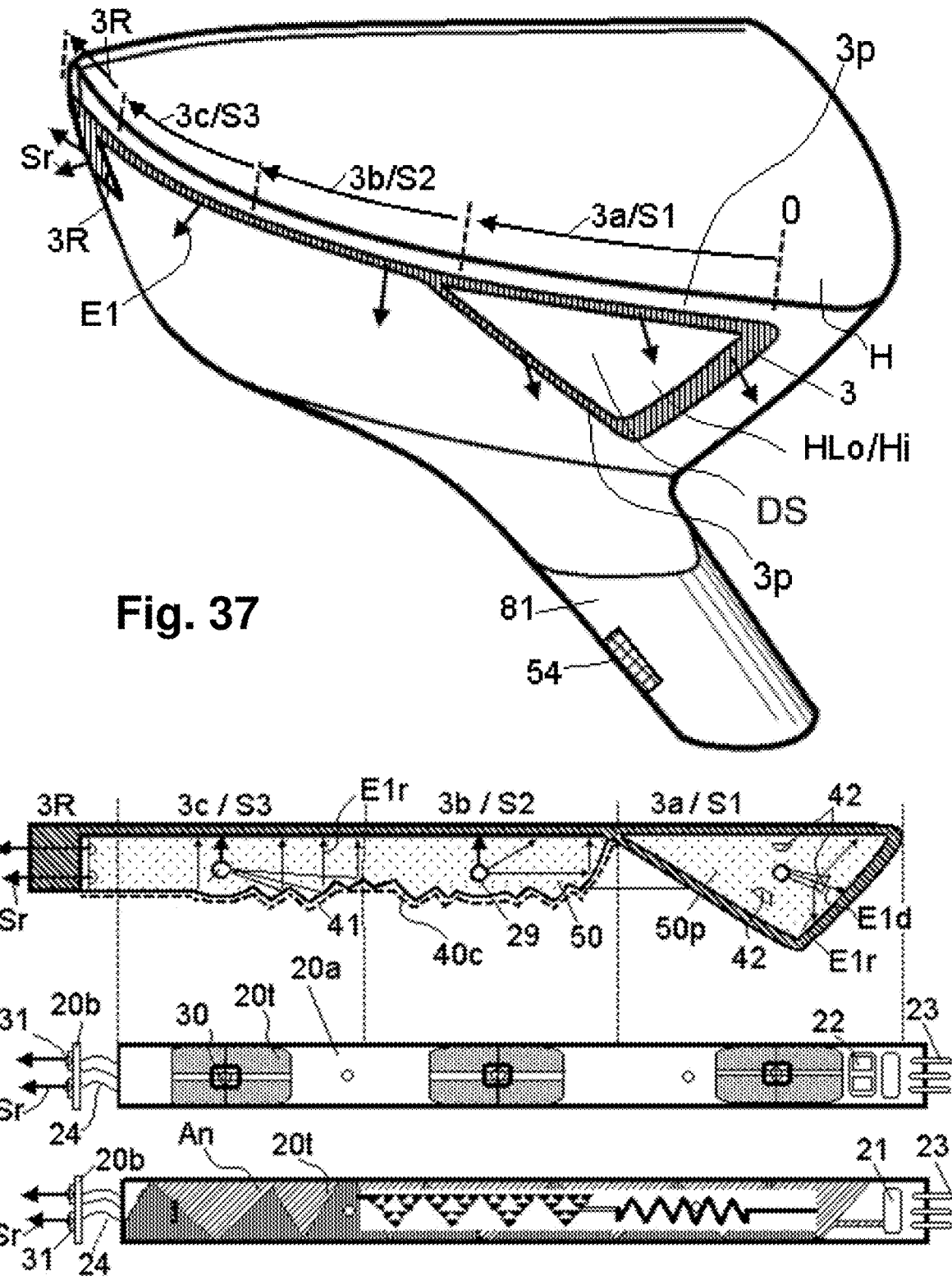

FIG. 37—Perspective of a rearview mirror as a VIS system with DS multifocal mixed signal device, the design of the illuminating surface combines a linear development with a closed perimeter figure, combining hidden reflector techniques 50.

FIG. 38—Exploded view of a DS multifocal mixed signal device with the hidden reflector 50, according to FIG. 37, highlighting the combination of development and design by sectors of said integrated chained reflector, the closed perimeter figure has an opaque inner cover Hi/HLo capable of including a logo and its circuit interface that includes temperature dissipating tracks 20t and tracks that function as an antenna An, the circuit in order to be standardized for use in different designs is composed of two parts 20a and 20b with a zone flexible cable 24 variable in extension.

FIG. 39—Front view of a VIS indirect vision system as in FIGS. 33 and 35 has the multifocal mixed signal device DS with the illuminating surface 3, 3a, 3b, 3c, 3R in separate linear sectors, part of the housing cover H intersects the luminous lines, each with its focal axis flush with the oak. The reflector and its source that are hidden, has an associated subset of projection functions towards the front floor, a front ScF camera with infrared light 66, an image/logo/courtesy light projector Lc/Pr, a laser projector Ls that generates a projected line LL. and a temperature sensor 55, said subset being interchangeable with another with more or less functions and is capable of interacting with the associated signal DS.

Figure 40:
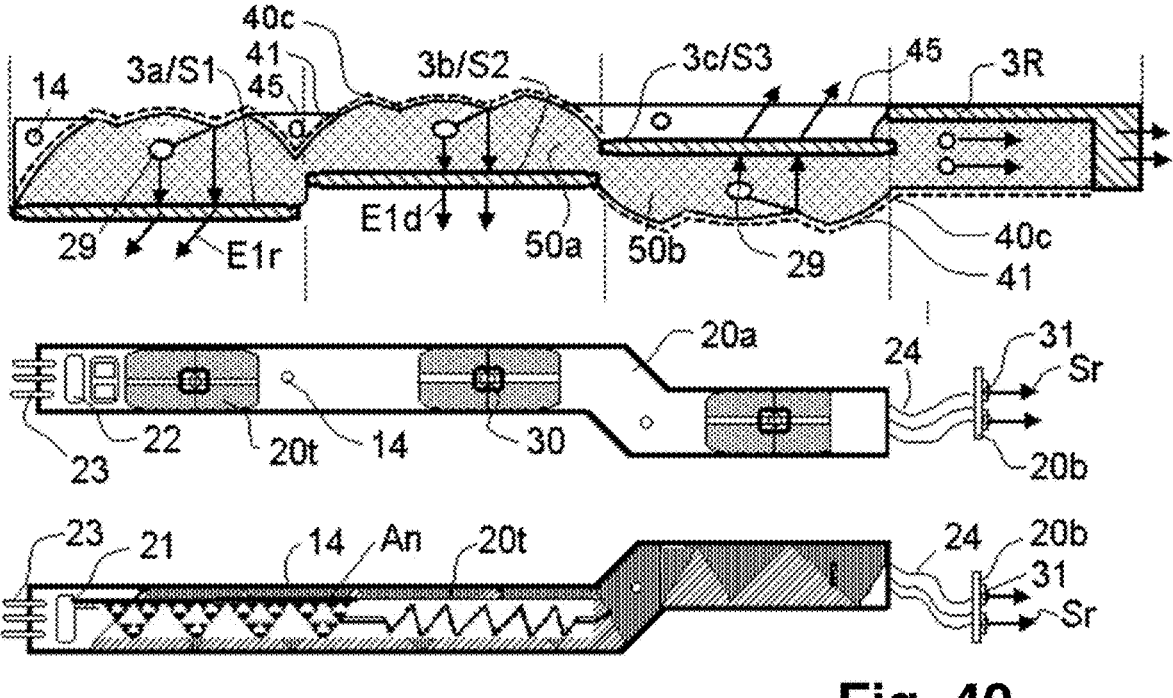

FIG. 40—Explosion of a multifocal mixed signal device DS with the hidden reflector 50, according to FIG. 39, characteristic of the illuminating surface by linear sectors separated at different levels and the hidden reflecting substrate 50 integrated by parabolic collimators 40c, arranged at a side or other 50a, 50b of said illuminating surfaces 3a, 3b, 3c, 3R of the same integrated hidden reflecting body or substrate, the source circuit 20a, 20b has a double function, it is in two parts extendable by the cable 24 and the other side has an antenna An.

Figure 41:
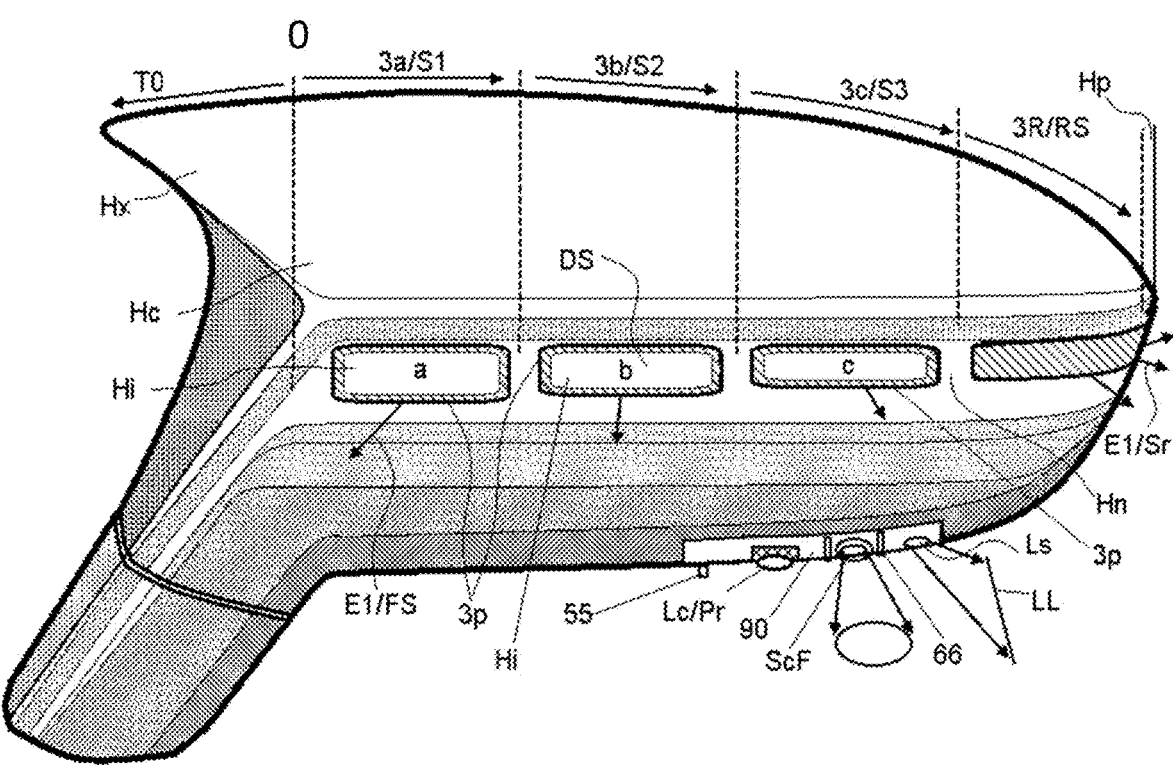

FIG. 41—Front view of a combined poly-functional indirect vision system, as in FIGS. 33 and 35 with multifocal mixed signal DS with the illuminating surface 3, 3a, 3b, 3c, 3R in separate sectors that correspond to the perimeter of separate closed or partially closed geometric figures, comprising the same reflector 50 hidden by various covers a, b, c in addition to the general casing Hc.

Figure 42:
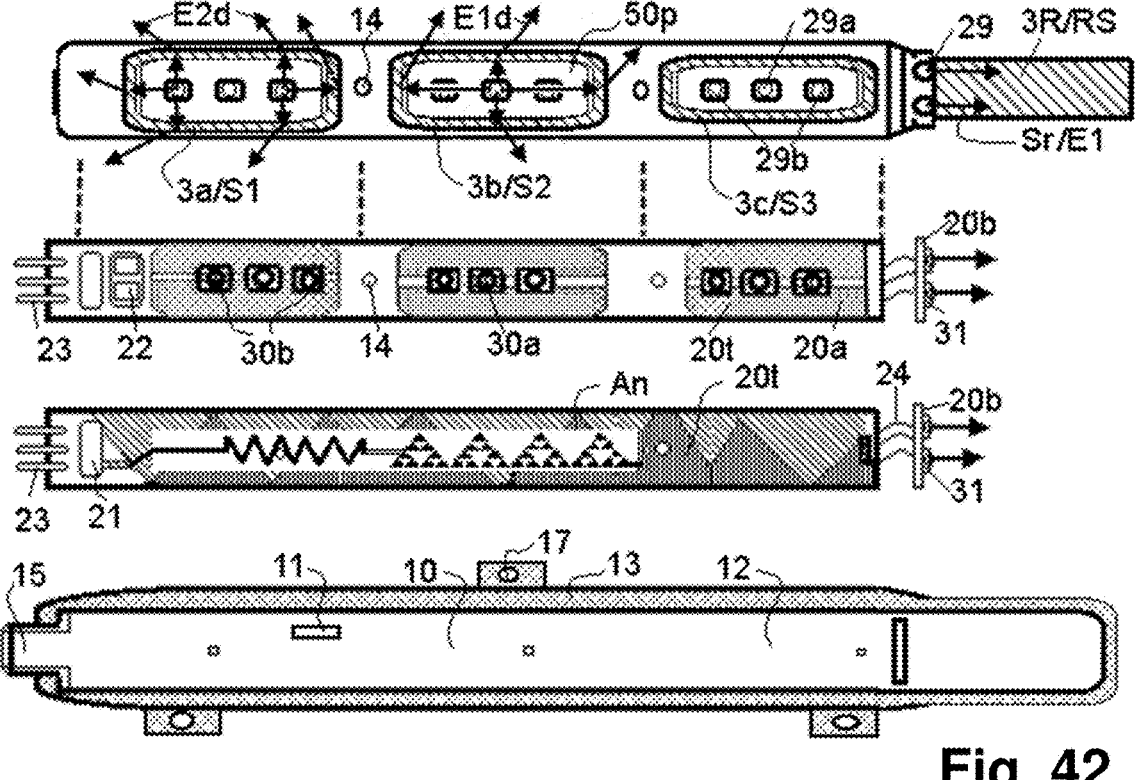

FIG. 42—Exploded view of a DS multifocal mixed signal device with the hidden reflecting substrate 50, corresponds to FIG. 41, the illuminating surface 3a, 3b, 3c, has separate sectors of closed or semi-closed perimeter figures that are part of the same reflecting substrate made up of perimeter reflectors 50p, each figure responds to the inclined surface R2 that is on the perimeter and middle areas of the reflecting substrate 50, always behind the exit illuminating surface according to the concept of FIGS. 8b and 18b, It is a triple function DS signal, with several light entry points 29a and 29b, corresponding to sources of different emitters to emit signal in different colors E1d, E2d, with a different mixed activation form E1d, E2d both towards the FS front or backwards 3R/RS.

Figure 43:
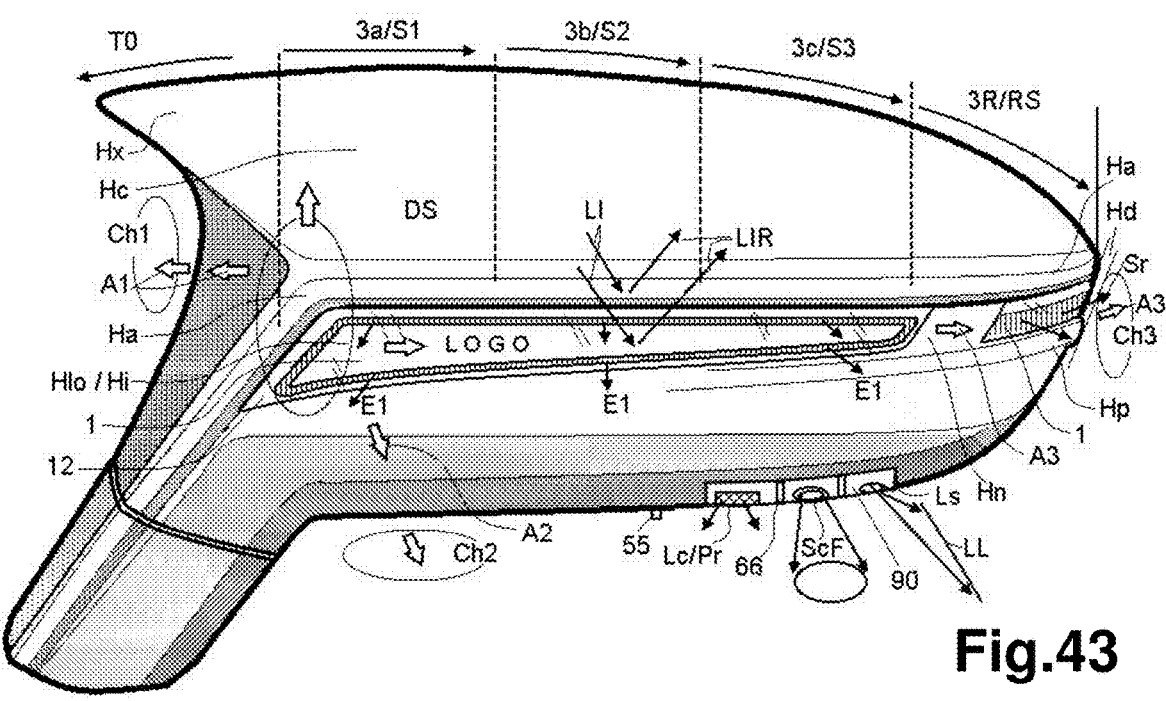

FIG. 43—Front view of a combined poly-functional indirect vision system, which as in FIG. 35, characteristic DS multifocal mixed signal, has a transparent cover 1 above the illuminating surface 3a, 3b, 3c to form a closed module with the same technical effect. the primary reflector and source are hidden. An area Hn stands out that is part of the cover H, Hc and is flush with a recess in said cover 1b, with respect to said cover 1 that hides the reflecting substrate 50 with the technical effect of facilitating the aerodynamic channel on the side A3, Ch3.

The advancing housing profile Ha and the protruding profile Hp, generate a four-fold effect and function of the housing designed to assist the illuminating surface, protects from impacts, protects from external incident light LI and creates an aerodynamic channel A3 of lateral output Ch3, and hides the source interface 20b that emits a signal behind the focal axis Sr.

Figure 44:
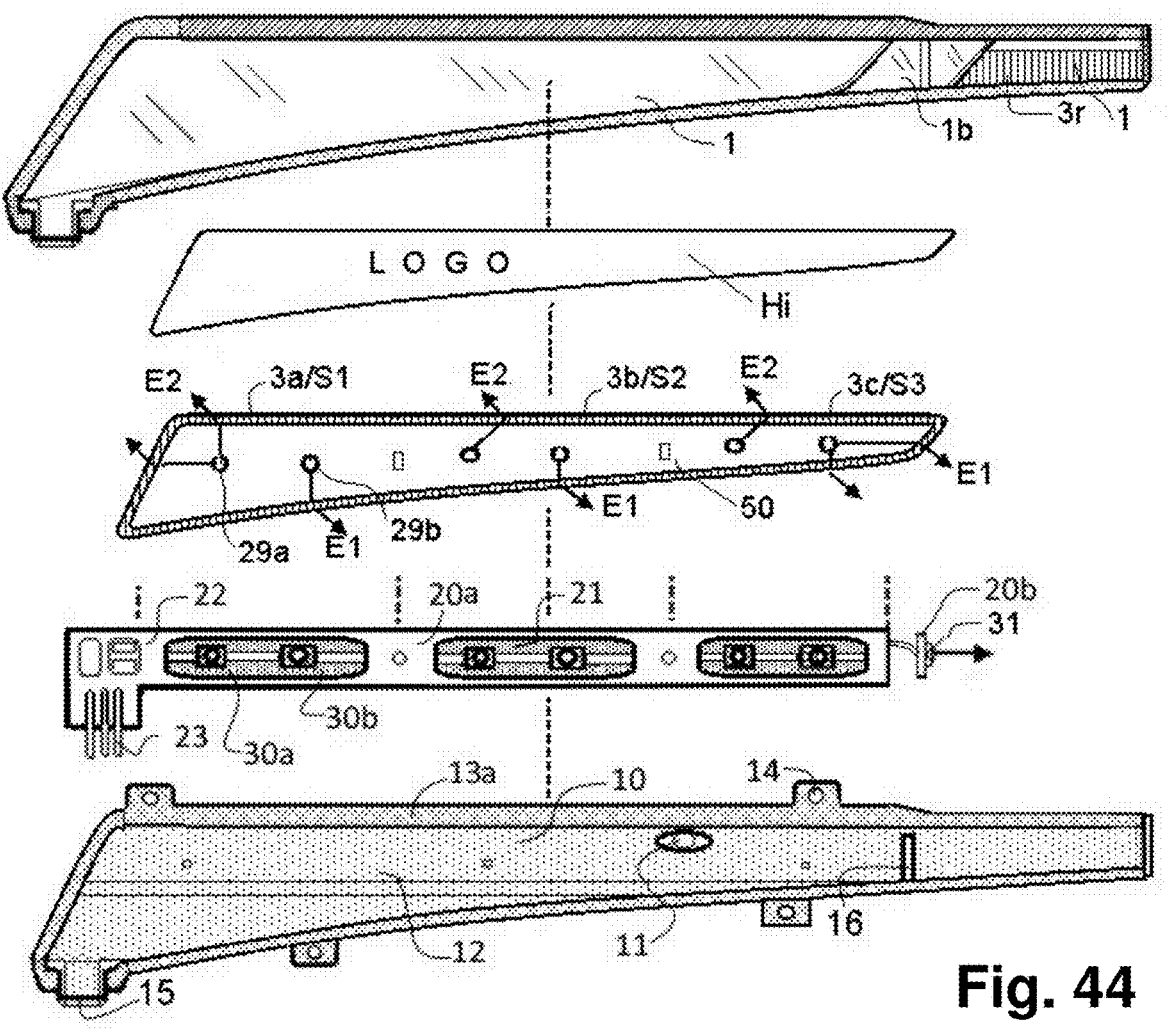
Figure 45:
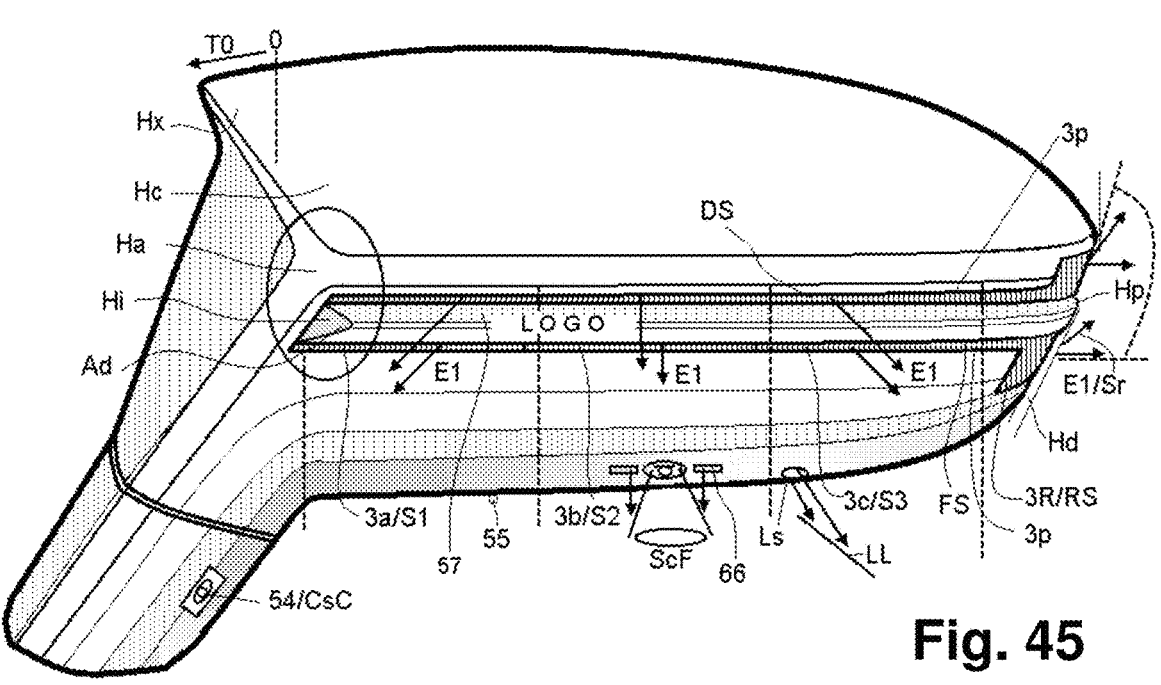

FIG. 44—Exploded view of a DS multifocal mixed signal device with the hidden reflector 50, corresponding to FIG. 45, but with an external transparent cover 1 above the linear illuminating surface. They highlight the combination of development and design of the illuminating surface 3a, 3b, 3c, defining a closed, semi-closed or linear perimeter figure forming part of the same reflecting substrate integrated by perimeter reflectors 50 (see concept of FIGS. 8b and 18b), but with several light entry points 29a and 29b, which correspond to sources of different emitting focuses capable of emitting signals in different colors or activation forms E1, E2 that define the mixed signal in functions and activation.

FIG. 45—Front view of a combined poly-functional indirect vision system, as in FIGS. 33, 35 and 37. The multifocal mixed signal DS has the illuminating surface 3, 3a, 3b, 3c, 3R formed and integrated by separate parallel or approximately parallel lines, and the cover of the hidden reflecting substrate 50, has a depression Ad, in contrast to the area of the advancing Ha cover next, another variant to generate an anti-turbulence aerodynamic channel towards the side, Ch3 and at the end of the third third away from the body, said Hi cover is developed in protrusion to avoid impacts and optimize light emission backwards E1/Mr.

Figure 46:
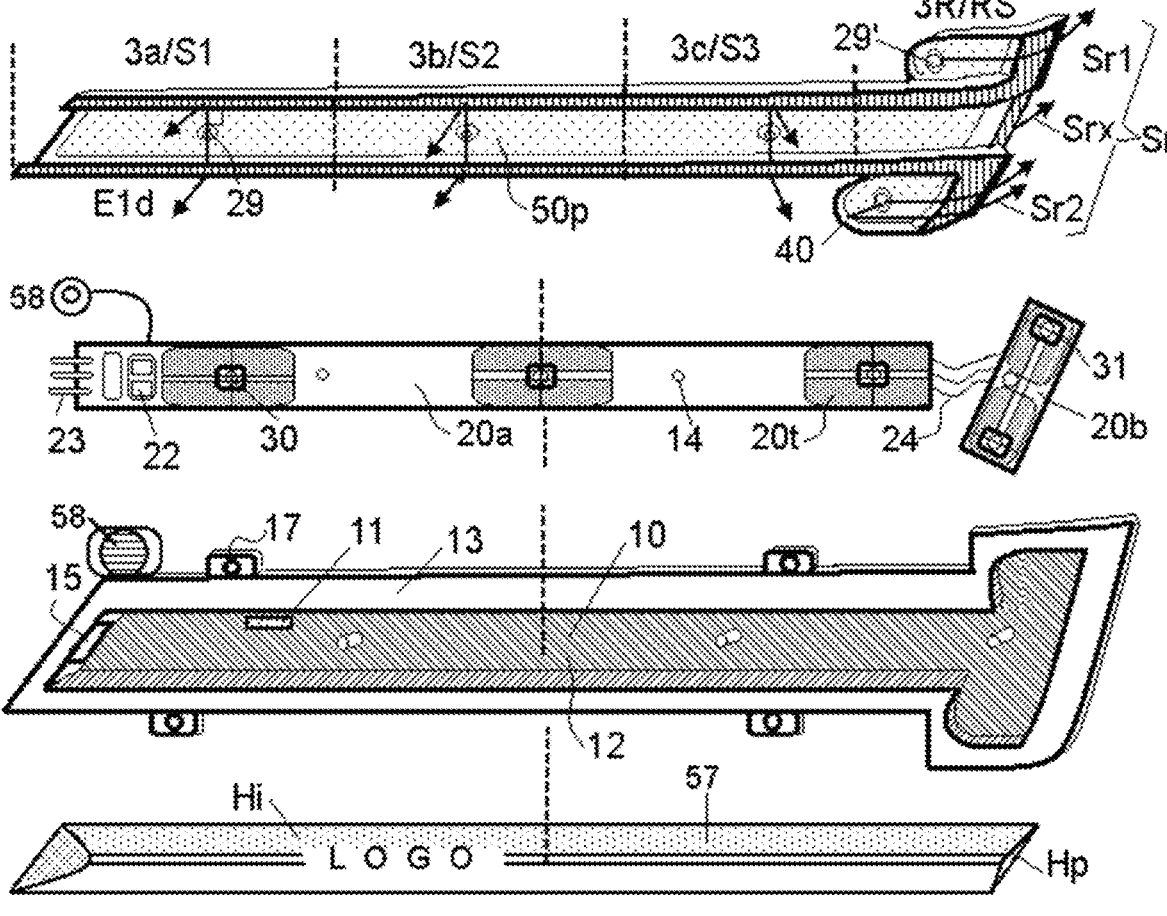
Figure 47:
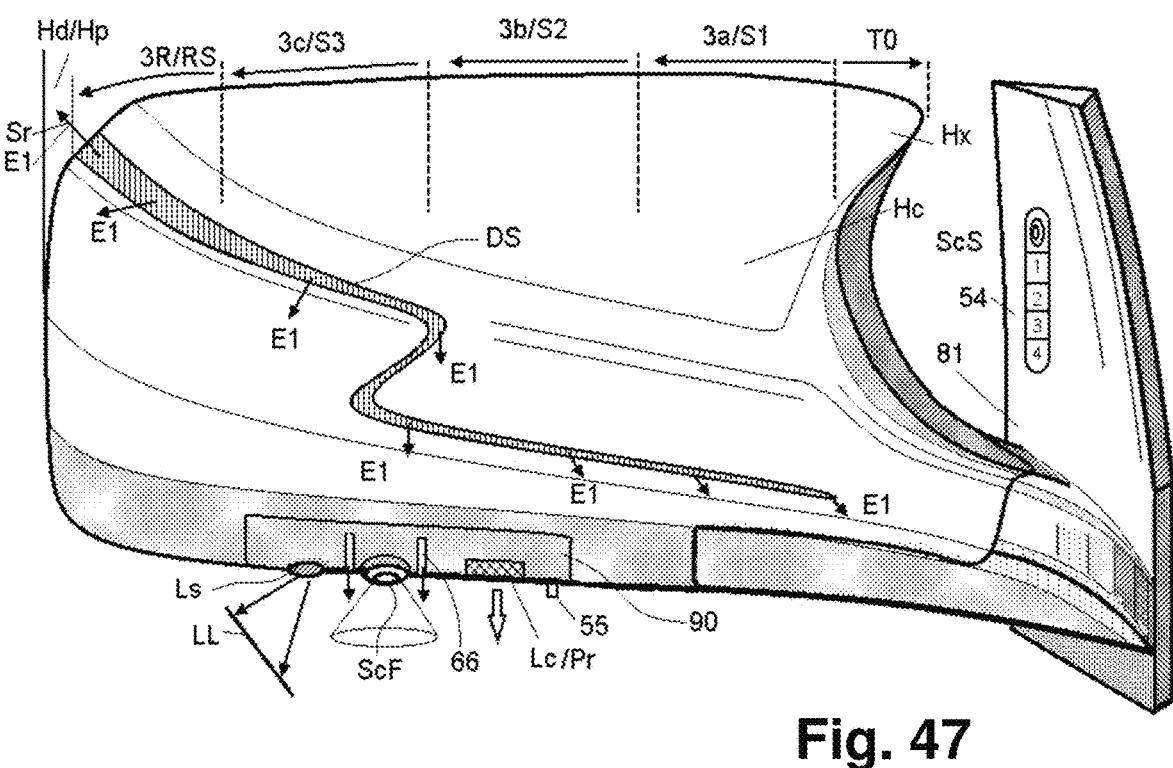

FIG. 46—Exploded view of a DS multifocal mixed signal device with the hidden reflector 50, which corresponds to FIG. 47. The design of the illuminating surface 3a, 3b, 3c, defines a figure of parallel lines, a concept similar to a closed, semi-closed or linear perimeter figure forming part of the same reflecting substrate 50 integrated by perimeter reflectors 50 according to the concept of FIGS. 8b and 18b, and the cover Hi that alternates a depression Ad and a projection at the end 3R capable of generate an aerodynamic channel and carry a logo. Characteristic in the optical body as a solution variant; —the reflecting substrate 50 does not have a profile that is part parabola and part inclined secondary reflector surface R2, there are two parts on both sides inclined reflecting surface R2 that generate said integrated light lines. The substrate 50 has several light inlets.—the rear focal ray axis Sr comprises two light outputs and two ray axes, Sr1, Sr2, unified by a laminar junction Srx that is inserted into the housing frame with exit surface as a technical effect, the illuminating surface 3R gains in continuity and generates better RS rear signal effect, greater amplitude, complying with homologation regulations.

Alternatively, the optical body has reflective parabolas 40 in the substrate in the rear signal RS to improve and concentrate the emission on said unified focal axes Sr.

FIG. 47—Front view of a VIS vision system, the DS signal device has the illuminating surface 3, 3a, 3b, 3c, 3R with integrated curved lines and counter-curves. The rear emission outlet Sr is in an area of the upper half in the third third T3 furthest from the body with the technical effect that the casing, frame or cover is the most prominent area as protection against impacts, avoiding interference as well. with the driver's vision Vm DV of the mirror M1.

The access key matrix keyboard module 73 is observed, and the remotely monitorable ScS side security camera, located on the support 81, an area strongly fixed on the body to obtain reliability and anti-vandalism in case the casing breaks to facilitate access. to the vehicle the same.

Figure 48:
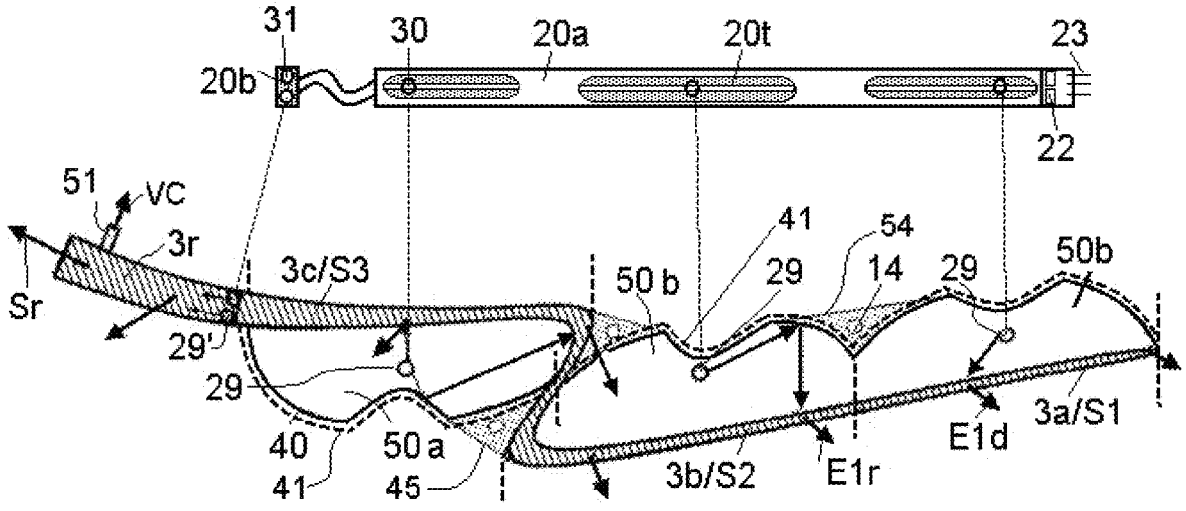

FIG. 48—Detail of the optical body reflecting substrate 50 and the illuminating surface 3 of curves and against curves in different sectors 3, 3a, 3b, 3c, 3R with parabolic reflector located on one side and the other 50a and 50b of said illuminating surface. The upper emission output towards the rear does not interfere with the driver's vision; it also has an independent signal output appendix 52 towards the driver 51 and his vision VC as a locator for the anti-stress mirror M1 for a third signal emission zone.

Figures 49, 50:
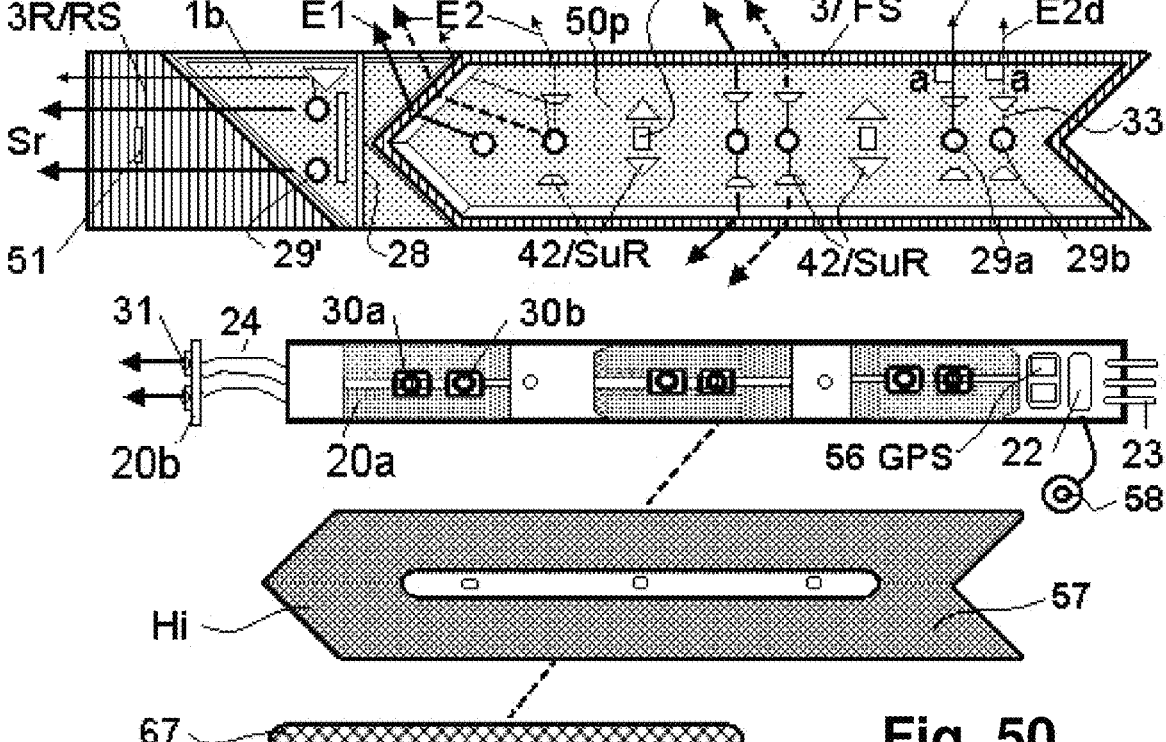

FIG. 49—Front view of a VIS system, which has a multifocal mixed signal device DS, a rearview mirror M1 and a poly-functional module subset 90 of a front camera ScF and functions towards the side ground of the vehicle as in FIG. 35. The design of the signal device DS is capable of having closed or open linear perimeter shapes that are icons for this example an arrow of the illuminating surface 3, enclosing an internal cover Hi that hides the reflecting substrate 50 and its source, a In turn, it includes a retro-reflector 67 with the technical effect; on the one hand it hides the reflector 50 and the source 20, 30 on the other it reflects in the same but opposite direction the external incident light LI, LIR especially from other vehicles.

The externally associated Hp, Hn, Hd, Hx protective cover is developed for robust vehicles with maximum protection, optional shock absorption material, has four functions;

Hn, covers the transparent body 1b to optimize the aerodynamic passage and hides the source 20b in the rear signal RS.

HD provides a difference in distance between the frame and the casing to protect the rear lighting surface from impacts in the extreme 3R area away from the body.

Hp protects from external light incidence LI,

Together they create the Ch3 anti-turbulence and noise lateral aerodynamic channel.

The iconic figure is capable of emitting different colors of light for different functions, especially developed for special, emergency, police, military, fire, cargo, rustic and/or more robust vehicle.

FIG. 50—Detail of the multifocal mixed signal device DS, said reflecting body 50 comprises multiple inputs 29a, 29b of light source 30a, 30b, to emit the bicolor mixed signal E1a, E1b and of different operation towards the frontal area FS of lit by dynamic sectors.

It is characteristic to avoid coloration between rear RS and front FS signal zones with the same optical body comprising a rear emission cut Sr, RS that is repetitive and orange in color approximately 583 nanometers; applies uneven means 28 with the technical effect of cutting light transmittance and avoiding coloration in the other emission zone, being the same integrated body when the emitted signal is of another color E1a, E1b.

To lighten the optical body and the entire optical assembly for any emission zone, the reflector substrate 50, save material and improve light distribution, has gaps, interposed surfaces and perforations 42, SuR sub-reflectors with the technical effect of distributing the light. reflected onto the front illuminating surface 3/FS which is iconically separated from the rear emission zone 3R/RS. The separation zone 1*b* stands out, which is part of the same transparent optical body.

FIG. 51—Front view of a combined poly-functional indirect vision system, which has a multifocal mixed signal device DS, a rear-view mirror M1 and a poly-functional module 90 subset of functions towards the ground and front camera ScF in as in FIG. 49. The closed or semi-closed perimeter shape stands out, enclosing another independent front lighting device DS2, with a plurality of special developments according to function, in some examples with orientation to the ground with a short range of approximately 10/15 meters. to the front-lateral ground or as a front position light, DRL daytime running light, or intelligent side light complementary to turning and parking maneuvers. Angle light for slow maneuvers "cornering light" linked to steering wheel movements and low speed less than 15 km/h. of the vehicle or emergency light for special vehicles or complementary light for frontal assistance warning to be associated with pedestrian recognition systems and automatic emergency braking. The access key keyboard module 73 is observed, and the remotely monitorable ScS side security camera located on the support 81, with data recording in memory separately inside the vehicle 75

FIG. 52-AA—Horizontal section AA of the indirect mirror vision system assembly M1 according to FIG. 51; the hidden reflector 50 arranged behind the opaque cover Hi, its chained sectors forming part of the same reflecting substrate 50, the circuit interface 20 of the light source, the distanced emitters 30 corresponding to each sector S1, S2, S3, and 30R for Sr, and its corresponding optical light entry means 29.

Highlights the focal axis of emission of the second frontal signal DS2 arranged associated inside the perimeter figure of the illuminating surface 3 with its focal axes of E2 emission and a transparent envelope injected in bi-material 1' or complete part of the independent covered lid Hi.

Said perimeter illuminating surface is suitable for enclosing another interchangeable functional device selectable between an intelligent front camera with presence sensor FcS with its electronic interface and complementary infrared light 66 as an assistant for night vision, logo and the circuit 20 of the source. light has 20*t* printed tracks to dissipate temperature associated with dissipation fins or for permanently on lights and on the opposite side printed tracks that configure at least one radio frequency antenna An., another signal device, a retro-reflector, a locator interface circuit GPS, or Bluetooth and its antennas, a radio frequency payment transmitter for parking lots or highways, covers varied in material and surface treatment, or partially opaque with light passing through patterns, forming a multi-functional set integrated together with the mixed signal DS capable of being exchanged for another of similar shape with more or fewer functions.

FIG. 53—Front view of a multi-functional indirect vision system combined with a reduced multifocal mixed signal device DS, a rearview mirror M1 and a front camera system ScF of subset 90 as in FIGS. 41, 43, 45 and earlier. The signal device is abbreviated from a low-cost concept, but is optionally capable of incorporating another interchangeable one with more functions and a premium version, mixed forming a DSM module that includes other functions such as an SS side position light that emits with a perpendicular focal axis to the vehicle's circulation axis 100, a laser projector Ls, a welcome light logo projector, an infrared IR complementary light 66 to assist the camera in night vision and a temperature sensor 55 all integrated in the assistance module. driving 90.

FIG. 54-AA—Horizontal section AA of the assembly of the indirect vision system by mirror M1 according to FIG. 53, it highlights that the hidden reflective substrate 50 is arranged perpendicular to the general cover of the housing Hc, H and has sub-SuR reflectors, intermediate in said reflector 50, to reduce cost, weight and material, comprise the application of holes with a specific shape that create an interposed surface that produces a change of direction by internal reflection both in the emission phase E1*d* and E1*r*, in the signal emission forward FS or backward RS, with the technical effect of optimizing the distribution of reflected or transmitted light or modulating a diffuse or semi-diffuse reflection on the illuminating surface 3.

Figure 55A:
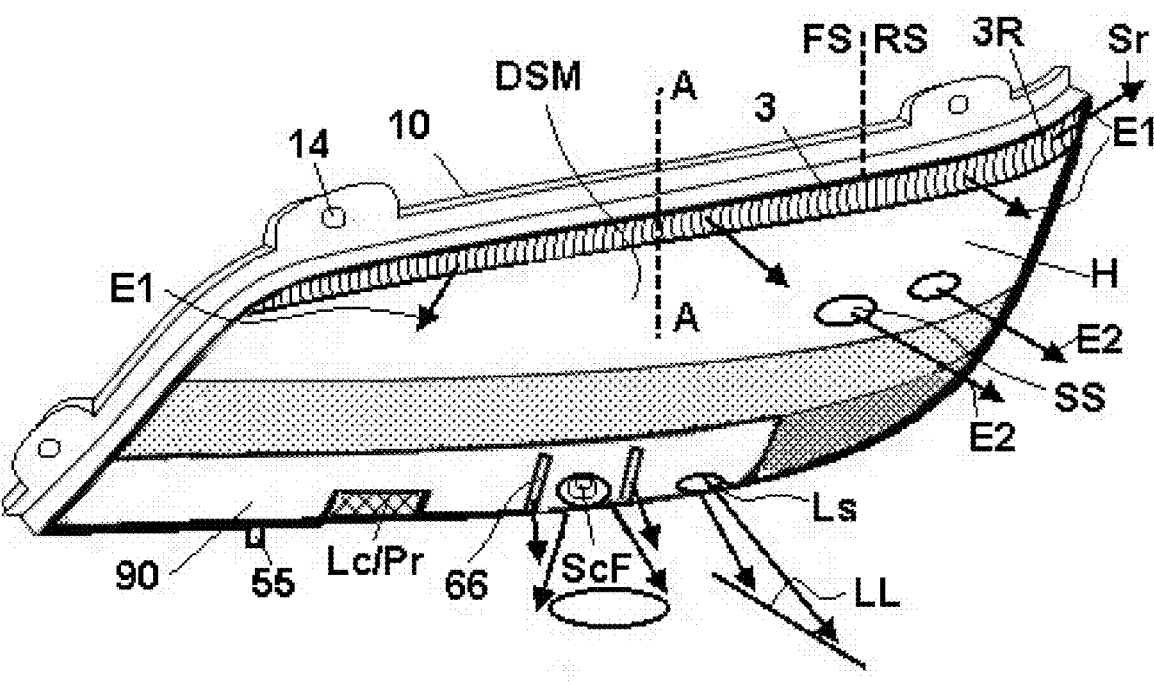

FIG. 55*a*—Detail of the mixed multi-functional DSM signal module that includes other functions such as a lateral position light SS that emits with a focal axis perpendicular to the axis of circulation of the vehicle 100 associated with a poly-functional assembly or sub-module (subject to standardization) 90 that includes an intelligent front camera system with the capacity to emit radio frequency and include other functions such as a sensor temperature 55, a front camera FcS, antenna, complementary infrared IR light 66, a laser projector Ls, an image or logo projector, courtesy light Lc/Pr. Can be exchanged for another module with a similar form of fixation and fit into the general structure of the VIS indirect vision system.

Figure 55B:
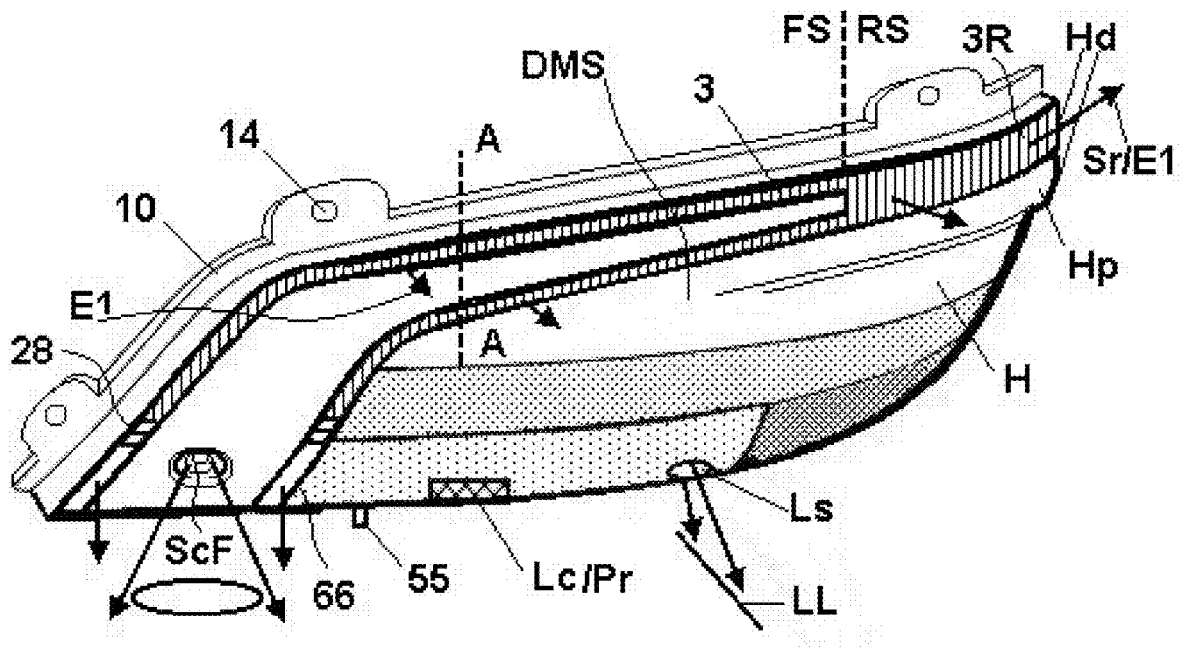

FIG. 55*b*—Detail of a DSM poly-functional mixed signal module that includes other functions. The flashing signal has the hidden reflective substrate 50, which is arranged parallel to the cover that hides it, similar to FIG. 55*a*, and includes the intelligent front camera FcS. Within the illuminating surface 3, said illuminating surface 3 shares the emission of the complementary infrared light 66 of said camera for night vision and has uneven means 28 to avoid the transmittance of said infrared light in the rest of the illuminating surface 3. being the same optical body.

Figure 56:
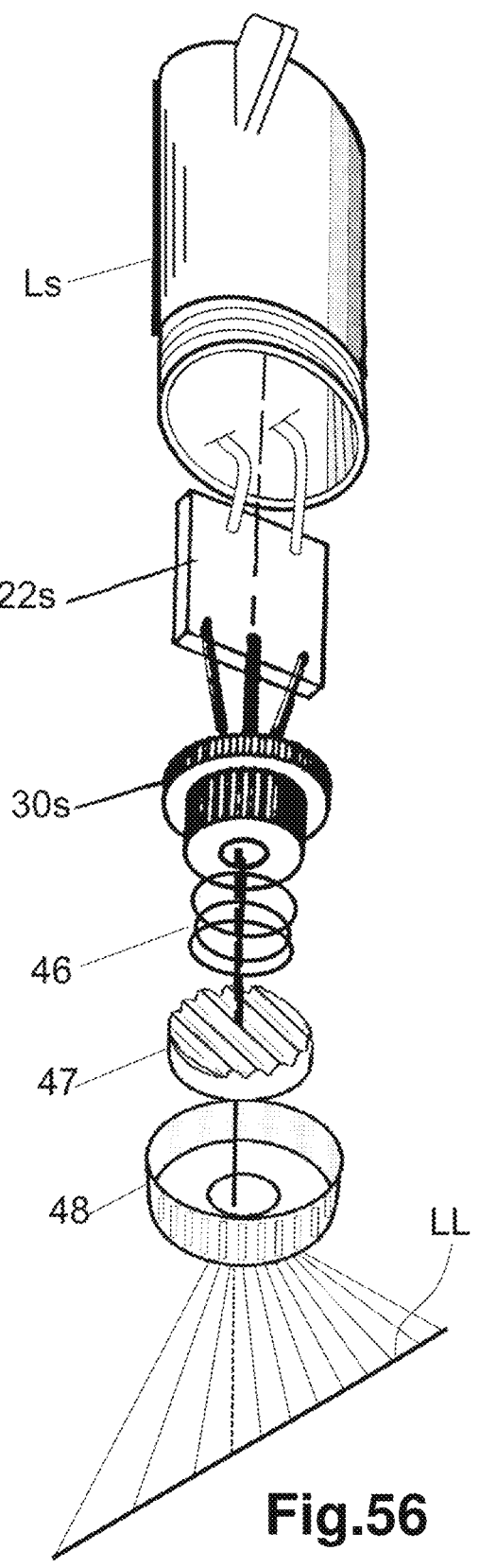

FIG. 56—Explosion of the laser projector Ls that generates a projection line LL on the ground next to the vehicle in assistance to an advance door opening warning system with the technical effect of warning how far the doors are opened, it is observed as said The line is generated by rectifying the light emitted by a 30*s* LED laser and highlights the pouden 47 effect collimated optics that, compared to optics for the same technical effect, save up to 10 times the volume, weight and material. The definition of emission can be regulated by an adjustable focus frame 48.

Figure 57:
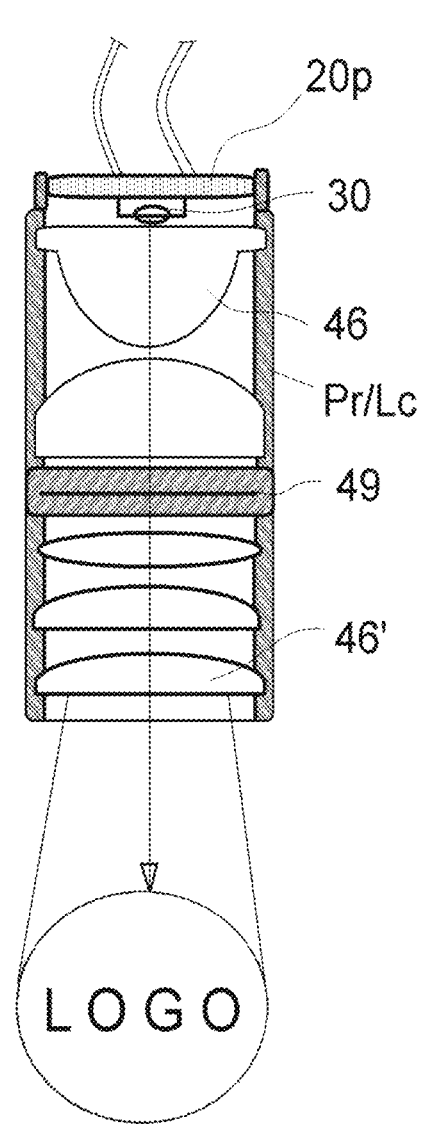

FIG. 57—Technical detail of the logo or welcome icon projector or courtesy and comfort light Pr/Lc, the concentration lenses 46 and focus lenses 46' are observed when the image is generated by a subtractive or projection method when transmitting the light from the source 30 through a slide-type film 49.

Figure 58:
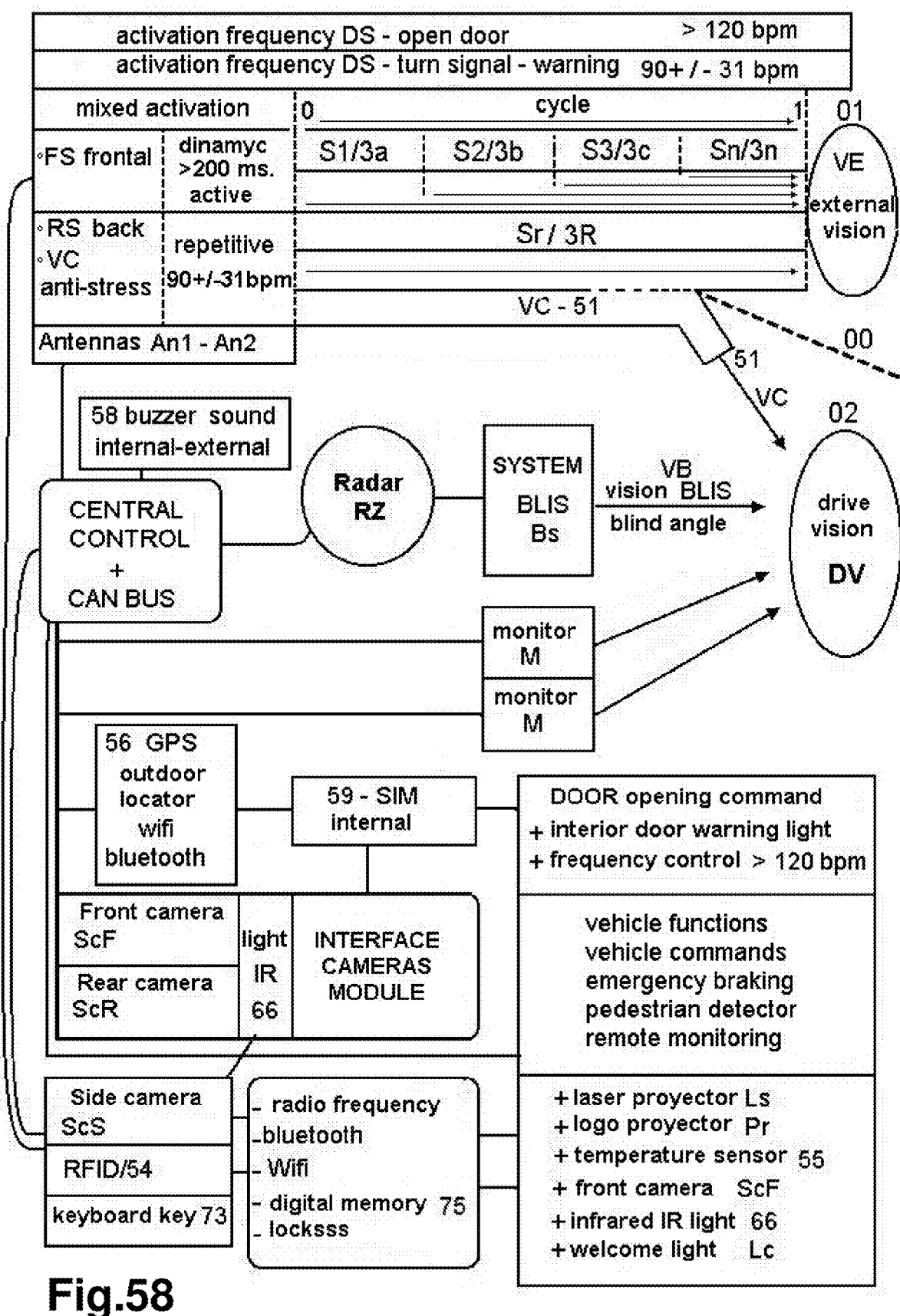

FIG. 58—Operating diagram, reveals the mixed activation operation of the multifocal signal device DS, which synchronizes in a period of repetitive activation the three emission zones it comprises, the steering part being the backward signal part RS, with a frequency of 90−/− 31 bpm (cycles per minute) each time it performs a cycle, the front part performs a dynamic cycle with at least 3 LEDs that add up in activation until they remain at least 200 milliseconds, all on the entire sequence On-off dynamics of the multiple focal axes S1, S2, S3, Sn, of the forward signal part FS.

It should be noted that the backward signal part RS is also the light source of the anti-stress locator 51 of the mirror M1, which has a different focal axis VC and function, therefore it is activated with the same repetitive frequency of said backward signal part RS.

The same device performs at least a second function of the same DS signal device, as an advance warning of door opening for differential the type of signal increases its activation frequency above 120 bpm, preferably 600/800 bpm.

The DS signal includes a radio frequency antenna An in its interface. It also reveals:

The operation of other devices of the indirect vision system with cameras or mirrors, the unified system module of two cameras, one in front ScF and one in the back ScR, with the auxiliary IR infrared light 66 that allows night vision to be developed.

The security module of a ScS side camera capable of being monitored remotely through a radio frequency interface via WIFI or Bluetooth, with a module separated from its interface in two parts that includes a port for a SIM card 59, or a memory digital data storage 75/USB and may be associated with an access key keyboard 73, or an RFID reader 54

The auxiliary functions module BLIS, Bs or blind spot detector that is capable of being applied with a BS warning device on the external casing of the system or on the monitors if the system is equipped only with cameras and is associated with the anticipated abyss of the system. door opening.

The operation of another standardizable module that includes a laser projector Ls that indicates how far the doors are opened by projecting a line of light LL on the ground next to the vehicle, a welcome light or a logo projector Pr, and a temperature sensor, this module is also capable of associating the ScF front camera.

The GPS or Bluetooth location module 56 has a two-part interface to guarantee operation or activation associated with a SIM card port 59.

DETAILED DESCRIPTION OF SOME EXAMPLES OF REALIZATION

To understand the best way to carry out the present invention, we illustrate and explain the following embodiments.

Figure 2:
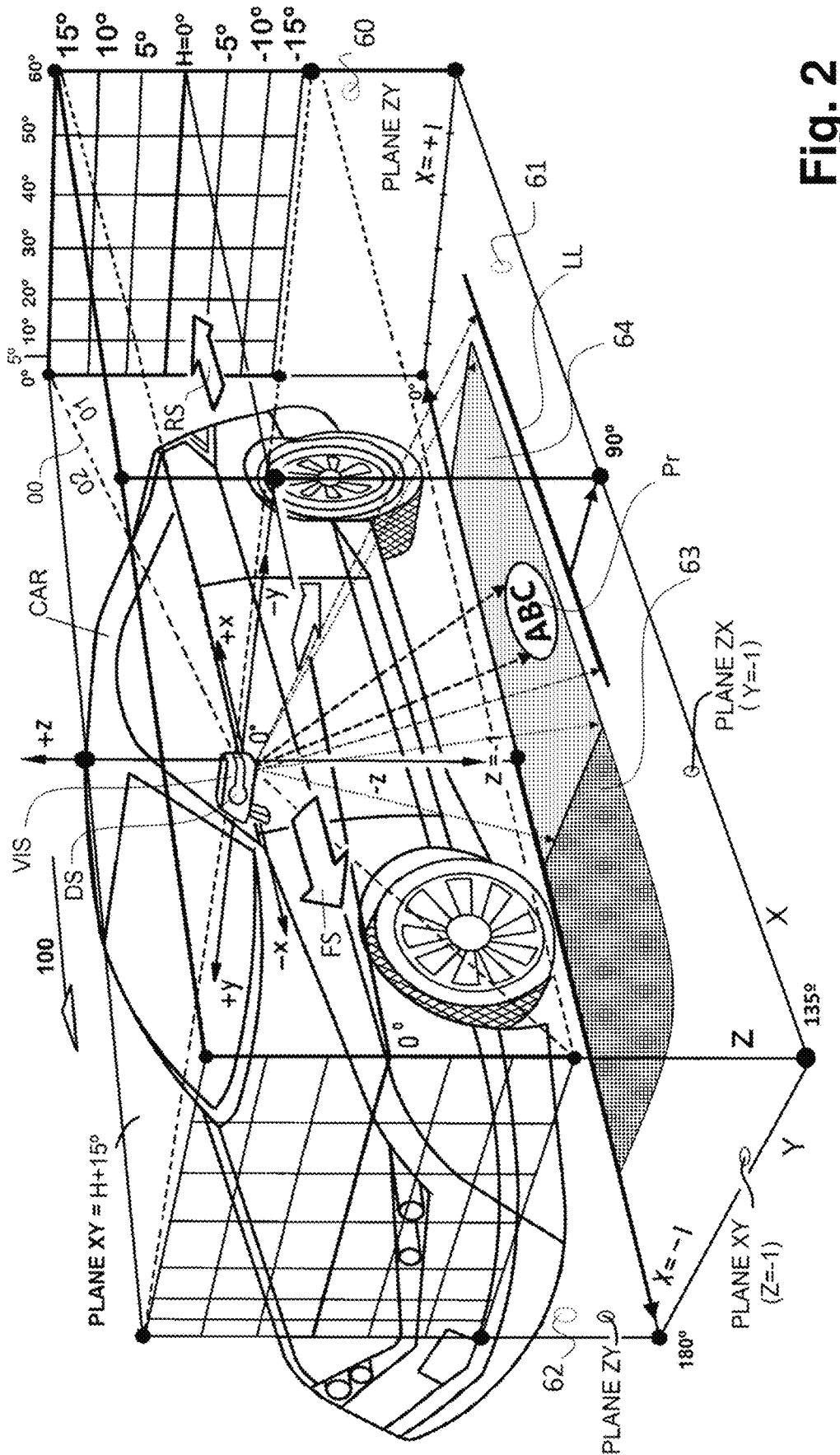
FIG. 2—IDEM Perspective FIG. 1, the VIS system is observed, it is multi-functional capable of developing other functions on the ZX ground plane, selectable, the projection of a logo, courtesy light, welcome ABC, Pr; an LL laser line that indicates projected on the ground to where the doors are opened to avoid the accident of slamming the door outwards "doored" complements the double function of the turn signal when it works to warn in advance and at another frequency of activation of the opening of the doors, or an infrared light with a focal-pattern axis close to the ground 63, in support of a frontal night vision camera of the ScF system.
Figure 3:
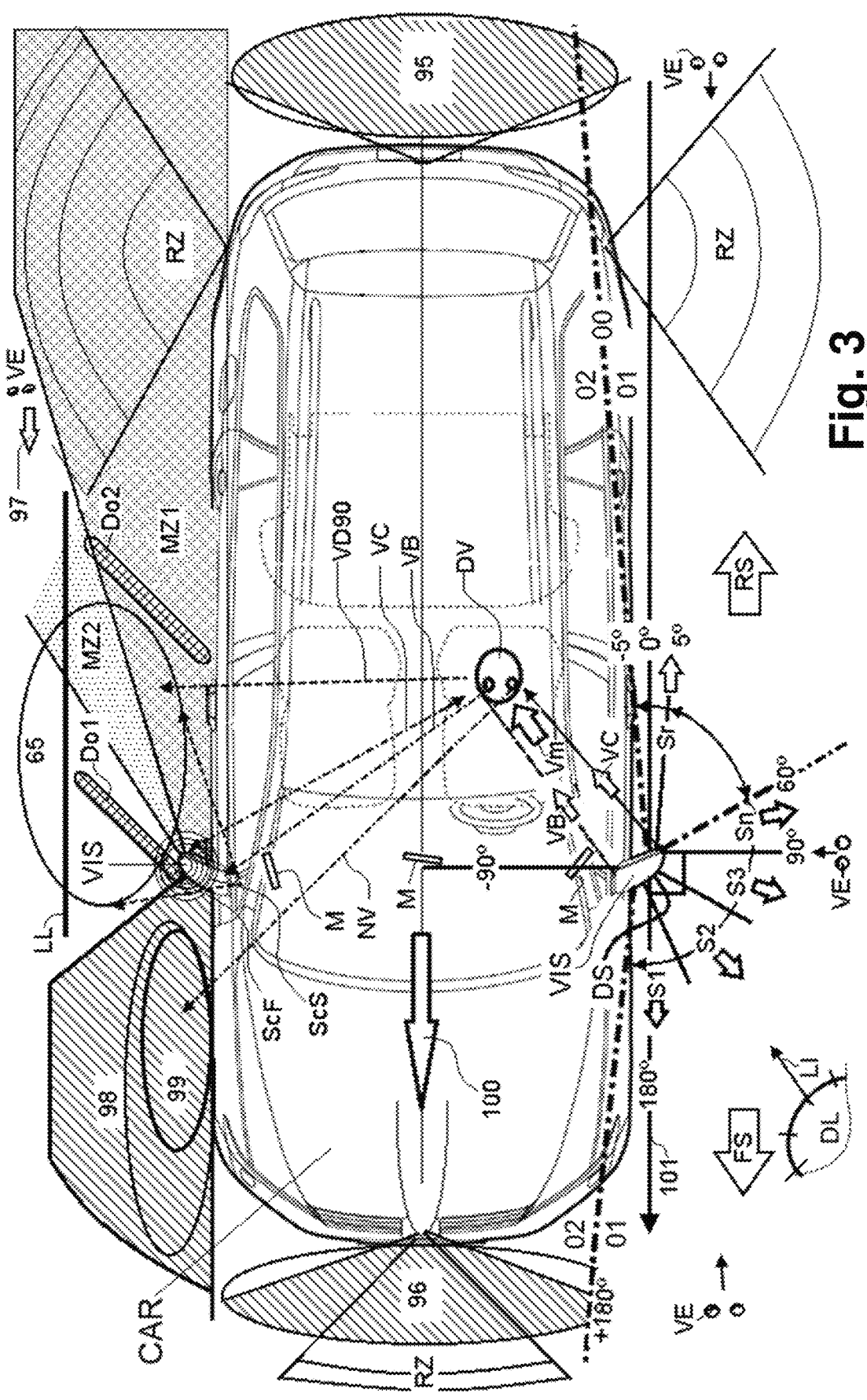
FIG. 3—Top view of a vehicle according to the circulation axis 100, shown on the left side.

The structure of the VIS indirect vision system occupies a position projected into the vacuum on the side of a vehicle, it comprises a housing H, Hc, a housing frame 80, 80x and a support arm 81, this position allows for viewing devices (mirrors, cameras) and be seen (light signals, auxiliary lights, projectors), and also be heard by a buzzer or speaker 58, and together with associated light-emitting devices, signals, and sensors in the same structure or in parts of the periphery of the vehicle in the front, sides and rear form a system to see and be seen at 360° degrees, but it has the disadvantage of being exposed to the incidence of external light, impacts and advancing air that creates turbulence, noise and dirties the mirror or camera. FIGS. 1-3.

In this patent we also present functions to help see, where and when to see and be seen, and also be seen better in all ambient light and weather conditions.

First, we explain the basic characteristic of the multifunction application multi-focal signal multi-focal device DS with hidden reflector 50, which concerns said VIS system, the concept and characteristic of said reflector for define the design versions of the product as an indirect vision system VIS by mirrors or cameras (front ScF, rear-lateral ScR, side vehicle access ScS) with flashing signal capable of including as an innovation a plurality of functions and advantages.

The signal device DS develops one of its functions as a flashing signal, it is characterized by having a hidden reflector 50 associated with a light source, and is part of an indirect vision system VIS comprised and associated with a structure that is a housing H, Hc and a support foot 81 that fixes it to the side of the CAR body of a vehicle. FIG. 1.

We know the principle of a parabola as a reflecting surface applied to a luminaire, FIG. 7 and its parts, a guideline D, the parabolic curve 40 according to the function (Y=nX2), the focus F, the radii R, and an axis of rotation A, its characteristic is that the distance FP from the focus F to a point P on the parabola curve 40 is equal to the distance from that point P to the directrix D, P-P', (FP=PP') and that the rays R that are emitted from the focus F, are reflected as internal reflection R-IN in said parabola 40 in a direction parallel to the axis A, as light emitted E1 by a total illuminating surface 3f.

We know the characteristics of a parabolic mirror applied to a Newton telescope, or of a satellite dish antenna, FIG. 7, which is the inverse effect, said parabola 40 as a reflector and its versions collect all the rays of the external ambient light DL as parasitic incident light LI, and reflects it towards the focus F which is where the light source is, therefore when the reflector is exposed by its transparent surfaces parasitic internal reflections are produced, this example applied to a signal device makes the received light intensity compensates for that emitted and the signal perception on the illuminating surface 3 f is diminished or cancelled.

The basic concept of the hidden reflector 50 of the invention concerns limiting between two tangential reflection surfaces 5 and 6, FIGS. 8, 13, 14 and 15, with a separation that defines a thickness T all the light emitted by a light source 30 and carry the concept of a parabola-shaped reflector 40 that occupies a 3D volume, approximate it a flattened substrate 50 that is a 2D concept and in this way concentrates all the light E0 emitted by a source 30 in said focus F, therefore a flattened substrate 50 with the shape of a reflective parabola 40 is defined on the one hand as a perimeter parabolic reflector and on the other hand a light output phase by a minimum illuminating surface 3 that concentrates the emitted light E1 into concentrated emitted light E1c said surface is equal to the edge of said substrate 50.

Said substrate has a short-stroke main ray-axis 33, parallel to the axis of the parabola A and perpendicular to the illuminating surface 3. If we join several substrates we obtain an elongated main reflective substrate 50 in the shape of a ribbon with at least one axis-ray 33 for each light input that propagates transversely to the reflective tape or substrate 50 and we obtain a linear illuminating surface 3 of minimum width and high concentration of emission light E1c. If on the illuminating surface 3 we intersect with a secondary inclined reflection surface R2/45° to produce a change in direction and add an advanced profile part PH2 we create a second phase of light output and obtain an "L" shape that allows us to position the main reflecting substrate 50 parallel to an opaque cover H, Hi, then the substrate 50 and the source are hidden, occupying a minimum of interior volume and free of external incident light LI.

The advanced profile PH2 has a horizontal emission axis 34 coinciding with the horizontal photometry axis of a signal applied to a car for a lateral signal device and the signal emission is capable of emitting a horizontal reference focal axis E1 which then The directions taken by the H housing will be different horizontal focal axes depending on the design.

We then define a vertical section in the shape of an "L", the larger side is the main reflecting substrate 50 and the smaller side is the advanced profile PH2 that ends in the illuminating surface 3 through which it emits the horizontal signal with the ray-axis E1. FIG. 1, 13-16.

The reflective substrate 50 is arranged inside a housing H that functions as an opaque cover, said reflective substrate is associated with a light source 20, 30 has an internal position, according to a reference plane P1 like a second skin capable of having a break R2, therefore its position is between parallel and perpendicular internal to said cover H that contains and hides it, at the same time the advanced optical-reflective profile of the output phase PH2 is represented by a reference plane P2 and axis-horizontal reference ray 34, coinciding with the horizontal emission axis E1; In this way it is hidden and also reduces the possibility of incidence of ambient light DL as external stray light LI and combined with the concentration of the light emitted by said edge, which is the illuminating surface 3 capable of emitting light with the maximum concentration E1c, because the main ray axis 33 and associated axis impact directly or perpendicularly reflected on the illuminating surface 3 with a short path to improve the perception of the signal emitted on the horizontal focal axis E1.

The parabola 40, FIG. 9 has interior points IN, and exterior EX, and we use reflection means based on an external or internal parabolic reflector for different parts of the reflecting substrate, it can be considered as an exterior reflector R-EX and displace part of said curve 40 to obtain a reflector or sub-reflector R-EX'/SuR capable of deflecting the rays E1 from the focal axis of a source 30-F in the perpendicular direction E2 or E2', characteristic and type of reflector is used in the coupling 29 of a light source 30 in order to divert the ray from the focal axis of said source E0 perpendicularly (angle â=) 90° towards an internal reference axis represented by mean ray vector 33 that is transmitted transversely within the reflecting substrate 50 and represents the set of rays associated and reflected by internal means. FIGS. 10*a*, 10*b*, 12; concept applied when the light entry 29 is through the middle zone of a reflective substrate 50 and especially when said reflective substrate 50 is parallel to the cover H that hides it and its perimeter includes means to make a break in the substrate to initiate a phase perpendicular reflection PH2 with an approximate reflection surface of 45°, R2/45° FIGS. 11, 18*a*, 18*b*, 18*c*, 20*b*; 23-26 or even with a light source 36 which is a multi-chip LED substrate or an OLED 36, FIGS. 19, 20*b*, The complex optical body as in a vertical section is described as two-part shape:

A—A portion of main tangential reflecting substrate 50 and associated source 20, 30, hidden.

B—A part of advanced profile PH2 secondary reflector R2 exit and illuminating surface 3 visible perimeter.

The main tangential reflecting substrate 50 hidden from said signal DS, has the shape of a flattened elongated ribbon with an internal reference ray-axis 33 in a transverse direction and is intersected on its perimeter or in any middle zone by an inclined reflection surface R2, that is, the perimeter light output reflector R2 or secondary reflector, an inclined reflection surface that comprises any type of reflector to change the direction of said ray-axis 33, to another ray-axis 34 and advanced short-haul profile PH2 normally with a narrowing of light concentration that generates the final horizontal ray-axis emission E1 and its diffuse ray-axis variants E2G or concentrated E1c.

For a better understanding, the changes in direction on the substrates reflector 50, and advanced profile PH2 are represented by two planes P1 and P2.

Said reflecting substrate 50, (plane P1), is capable of positioning itself with respect to the cover H, Hc, Hi, which hides it between parallel and perpendicular, that is, between 0° and 90°, (parallel or edge-on), Normally said planes P1 and P2, which represent the positions of the reflecting substrate 50 and the advanced phase profile PH2 output, are perpendicular to each other, defining an "L"-shaped section.

Typically the reflective substrate 50 and plane P1 is parallel to the housing cover H, and the advanced profile PH2 and plane P2 is perpendicular to the housing cover H.

For an example of application, said reflective substrate 50 is perpendicular to the cover of said housing H, the planes P1 and P2 coincide, they are the same plane, and the substrate reflector 50 and the advanced profile PH2 become one with a light output narrowing phase, but without the inclined output reflection surface. FIGS. 33, 34, 53, 54.

The change of direction due to internal reflection occurs at the nexus that represents the inclined surface R2 or peripheral secondary reflector, which relates the position of the reflecting substrate 50 with respect to the advanced profile PH2 and is variable between 0° and 90° depending on the position of the reflector profile 50, the H cover and the PH2 profile; and allow to obtain a final horizontal emission E1 coinciding with the ray-axis for each sector S1, S2, S3, Sn, Sr. that is more homogeneous and concentrated per sector and share areas with light from one sector and another combined without defined limits between sectors on said illuminating surface 3.

For another example of embodiment, the multifocal polyfunctional signal device DS has an extra transparent cover 1 above the illuminating surface 3 and forms a closed multifunctional DS signal module comprising, an inner cover 10 with an anti-condensation valve 11, the light source circuit 20, the reflecting substrate 50, and an independent opaque Hi cover or cover (as said Hi cover is not external or receives blows, it can be replaced with an opaque or semi-opaque sheet or film with the same technical effect of covering the reflector 50 and the associated source.

In such a multifunctional closed signal module DS, the advanced PH2 profile is not developed, or does not exist, the light output is only a sufficient slope to root the independent opaque cover or cover Hi, or apply a cover, paint, weave or film that eclipses said reflective substrate 50, the horizontal emission E1 is generated by the light emitted by the reflective perimeter R2, which has the necessary curve to define a horizontal ray-axis E1. FIGS. 20*a*, 20*b*, 45, 46, 50.

For another embodiment example. The reflective substrate 50 positioned perpendicular to the opaque cover H that hides it, or edge position, occupies a deep space in the housing that contains it. It covers part of the linear illuminating surface designs 3. FIGS. 33, 34, 53, 54.

For another embodiment example. The substrate 50 occupies a parallel position as a second inner skin, (covering most applications with greater options for illuminating surface designs 3) to the opaque cover H or Hi that hides it, then applies a break R2 through a perimeter surface as a second reflection means to define a second part of the advanced profile which is the output part PH2 or light emission E1. FIGS. 13 and 14, 13-20, comprises an internal reflector R-IN that corresponds to another parabola curve 40 as a second reflector R2 or alternatively a reflection surface of similar effect inclined at approximately 45° in order to substantially change the reference axis light 33 reflected light product 32*t* tangential, to obtain a horizontal emission ray E1 as focal axis to comply with the official signal requirement of Regulation R6, ECE/UN or similar for the USA and Japan, for signal devices.

Note, (to simplify the graph we represent throughout the document, the emitted light transmitted with vectors that we call rays, or axis-ray E0, E1, E2, E1r, E1c, Sr).

A vertical section of the VIS system allows us to observe in concept the position of the reflecting substrate 50 with respect to the housing H that hides it, FIGS. 15, 16 remain substantially parallel and with a separation to the opaque casing of the body that contains it H, and protected from the incidence of external parasitic light DL LI, at the same time the occupied interior volume decreases through a break that is a continuation of said substrate 50, the advanced profile PH2 of approximately 90° by means of an inclined perimeter reflection surface R2 at approximately 45°, identified as R2/45°, said separation defines a volume 70 that is a free volume substrate between said reflective substrate 50 and the opaque cover H, independent Hi, suitable for including other functional devices.

Said free volume 70 allows the signal device DS to be configured as multifunctional from the same illuminating surface and/or from the free interior volume 70 associated under said cover Hi with other devices such as an antenna An.

For any example of embodiment in vertical section, this break R2 of said reflector 50 of said multifunctional signal device DS produces two new tangential reflection surfaces 7 and 8, which define an advanced profile PH2, which is a shorter output reflective substrate. widthwise than the main reflector 50, (the short part of the "L") capable of having a widening or narrowing with respect to the thickness T of the reflecting substrate 50 that normally between said tangential reflection surfaces 5 and 6 is less than 10 mm, (<10 mm.) Figs, such that it allows having an illuminating surface 3 in the shape of a luminous ribbon of variable width, combinable with having:

A narrowing for concentration of emission light E1, E1c, said advanced optical-reflector profile functions as a tangential reflecting substrate of the output phase PH2, concentrating the light of the reference axis 34 into emitted light E1, E1c, which is always horizontal and generates the concentration of light based on a narrowing of thickness between said two tangential reflection surfaces 7 and 8, which allows the light to be concentrated on the illuminating surface 3, comprising the difference in thickness between the light entry thickness distance L2, which It decreases towards a smaller output thickness L1, that is, a thickness L2 greater than L1, L2>L1 and produces an emission E1c of concentrated light that generates an illuminating surface 3 that normally has a width less than 10 mm. (<10 mm.). FIGS. 13-18.

This difference between L1 and L2 that produces the narrowing is independent of the fixation edges that the illuminating surface may have; they are not considered.

A widening for diffusion of emission light, said profile advanced as output reflecting substrate PH2 forms a narrowing of thickness between said two tangential reflection surfaces 7 and 8, between said two tangential reflection surfaces 7 and 8 with respect to the thickness T of said surfaces 5 and 6 of the reflecting substrate 50, represented in said output phase PH2, by the difference between the distance between the light input base L2 that widens and increases towards the output L1, that is, L2 less than L1, L2<L1 and produces a deconcentrated, diffuse or lower intensity emission on the illuminating surface 3 that has a width greater than 10 mm. (>10 mm.)

An illuminating surface 3 in the shape of a luminous ribbon has a variable width, combinable or not, capable of maintaining a homogeneous linear width, decreasing, increasing its width with respect to the distance-thickness difference L2, L1 of its output phase PH2 along its path. without limitation, this width increases for areas preferably of diffuse emission E1, E1G or with a plot with a width greater than >10 mm, and decreases for other areas preferably of emission of concentrated intensity E1c in this case said illuminating surface 3 comprises a width between 10 mm capable of covering up to a capillary linear width of 1 mm. FIGS. 8, 10a, 10b, 11, 13-16, 23, 34, 43, 44, 53.

To understand the linear conceptual development of the illuminating surface 3. To said vertical section FIG. 16, an extrusion is applied according to a guideline 35 to form, in an integral of sections, a real solid 3D device and a linear illuminating surface 3; Depending on the extension of said guideline, the shape and design covered by the illuminating surface 3 capable of comprising a plurality of curved, straight, perimeter, open, closed, partial, total, regular, irregular shapes or a combination of these externally visible occupying at least one external opening 3p on the opaque cover of the housing H that contains it. These shapes are not visible to the eyes of the driver of the DV vehicle in his driving position. FIGS. 14-16, 21, 47.

Opening of the Illuminating Surface 3 and Associated Cover.

The aperture 3p that occupies the illuminating surface 3 is linear and variable.

It is a shared opening 3 illuminating surface+independent cover Hi; Normally it is the opening occupied by the illuminating surface 3 associated with the independent cover Hi.

For all embodiment examples it is configurable, selectable between;

is the gap of its perimeter or part of it,
is included and surrounded by said Hi cover,
surrounded by the housing surface H,
there are several openings when they are several geometric figures, with flush parts Hn separating said casing H covering the reflector 50 at the same time as several independent covers Hi, a, b, c, cover the reflector 50 plus the source, FIG. 41

The "NO" illuminating surface is a tape like all blinkers, it is the perfection of a complex optical body, the edge of an advanced PH2 profile, it is a luminous line.

The opening 3p that occupies the illuminating surface 3 is a linear gap 3p between an independent cover Hi and the rest of the casing when it is a perimeter figure or part of it, in the shape of a perimeter figure.

The opening 3p that occupies the illuminating surface 3 is a continuous or discontinuous linear gap 3p in the housing cover H.

The opening 3p is occupied by the sum of the surfaces 3 and the surface of the independent cover Hi.

For an example of embodiment, the illuminating surface 3 is the perimeter of a regular or irregular geometric figure that occupies the gap between the cover Hi and the rest of the housing H, the shape of the gap is the opening 3p that has the shape of a perimeter figure. at least in part and allows the illuminating surface 3 to occupy, with respect to said independent cover Hi, at least 10% of the perimeter of said independent cover Hi. FIGS. 18*a*, 18*b*, 21, 23, 27, 35, 37, 41, 45, 49, 51.

A vertical section when the illuminating surface is a perimeter figure or two separate lines represents an elongated "U", where the base is the main reflecting substrate 50 with its associated source and the upward projections are the advanced profiles Ph2 that end in the illuminating surface perimeter 3. The cover would hide the base, the reflective substrate 50 and the source.

For all embodiment examples, the external opening 3*p* that occupies the illuminating surface 3 corresponds to the sum of the illuminating surface 3 and the associated cover Hi independent of the housing H capable of forming a module or not with the multifunctional signal device DS. varying in occupying at least a gap part of its perimeter or included in at least another opening 3*p* within the perimeter of the cover Hi in an intermediate part of said independent cover Hi.

For another example of embodiment, the multifunctional signal device DS occupies, with another illuminating surface, apart from the external opening or openings 3*p* of the cover Hi associated with the external illuminating surface 3, another internal opening 4*p* for another signal output and illuminating surface that It performs another function, anti-stress locator 51 independent of external functions.

For another example of embodiment, said illuminating surface 3 may correspond to one reflecting substrate sector or to several. Said extension of the illuminating surface 3 makes it necessary to maintain the effectiveness and luminous intensity, to repeat and integrate the shape of parabolic reflectors, then forming a reflecting substrate 50 by sectors in the shape of a transparent solid ribbon where each sector responds to these characteristics;

has at least one source light input.

said light entrance has optical or reflection means 29 that preferably produce a change of direction at 90° when it enters through one of its limiting surfaces 5 or 6 to direct the light from the focal axis of the source E0 in a direction coinciding with the median axis reflection transmission reference 33 within said flattened substrate 50 and in a certain direction that comprises, a radial direction, omnidirectional or directed towards at least a part of its perimeter that corresponds to an illuminating light output surface 3.

The reference axis 33 is transverse to the shape of the reflecting substrate 50 and perpendicular to the illuminating surface 3 or to the light output perimeter reflector R2.

The interior light is reflected tangentially 32*t* between two surfaces 5 and 6 and/or 7 and 8.

The interior light is reflected on the one hand in a parabolic perimeter 40 or of similar effect to produce associated rays of similar effect to the transverse reference axis 33

The reference axis 33 is directed to a light output phase PH2 that begins at a break in said substrate, a product of the inclined surface, or peripheral secondary reflector R2 of said substrate 50 to be signal light emitted E1 by a illuminating surface 3.

Said reflective substrate 50 is capable of substantially copying the shape of the interior of the housing that contains it as a transparent optical body capable of transmitting and reflecting light internally in the shape of a curved, convex, preferably elongated substrate, like a ribbon, and said tangential surfaces of reflection 5 and 6, or 7 and 8 are surfaces that maintain their position substantially parallel to each other, they form an extrados and intrados.

Said hidden reflector substrate body 50 has a series of light emitters, 30, 31 (LEDs, OLEDs) that form the light source, installed in their respective support circuit 20, 20*b*, and are coupled to said reflector at entry points. of light 29 that has at least one for each sector S1, S2, S3, Sn, said entry points 29 have optical control and initial reflection means, which comprise a parabolic reflector PH1 FIG. 15 or surface with a similar effect with the in order to orient the transmission of said source axis E0 in a determined direction that comprises a transverse internal reference axis 33 with a direction, preferably vertical, transverse that is transmitted and runs along the width of said reflective substrate 50 along the shortest path, (unlike a light guide 150, 234 FIGS. 4-6, which is elongated tubular in shape, the reference axis is transmitted longitudinally, that is, along the longest path from one end to the other), The reflective substrate 50 comprises to create a light output break, in a part of its perimeter, or inclined surface as a reflective perimeter preferably formed by a second parabola PH2, R2 capable of reflecting at 45°, R2/45°; said reference axis 33 is incident perpendicular to said reflective perimeter R2, which becomes an output ray-axis 34 precursor of the horizontal signal emission reference axis E1, and corresponds to a portion of the illuminating surface 3 through which the light emits. to the outside E1, FIGS. 25, 26, 27, 37, 49.

Said vertical path by transmission-reflection of light inside said reflective substrate 50 comprises three technical phases:

A—A first coupling phase 29,

B—A transverse transmission-reflection phase 50 hidden from external vision and the incidence of ambient light DL, Li and, C—A third phase of output or emission E1 through an illuminating surface 3.

The characteristic concept of reflector substrate 50 and the advanced reflector optical profile applies combined optically reflective correction means of reflection of the substrate 50 selectable from;

smooth and polished surfaces 5 and 6 as means of tangential reflection, the internal parabolic 40 of a part of the perimeter of the reflecting substrate, the parabolic collimators extended 40', 40*c*, the internal covers 10 of dark or black color at least in part to produce an external effect on the illuminating surface 3 that is perceived as dark or black when not working paint or coating on the surfaces of the reflective substrate to facilitate reflection and prevent light leaks 41, gaps, 42 that generate interposed surfaces in the substrate 50 in order to create internal reflection surfaces, retro-reflection, SuR sub-reflectors, or etched surfaces to produce diffuse light G and diffuse reflections. FIGS. 10*a*, 10*b*, 14, 37, 50, 54.

The combination of these reflective optical means produce direct light rays E1*d* or reflected E1*r*, which are associated with the main reference ray-axis 33 with the technical effect of modulating the light on said illuminating surface in a homogeneous or heterogeneous way as a design option. and determined by studies done in a lightning bolt launch simulator program.

SOURCE FOCAL AXIS E0 versus EMISSION AXIS E1. For different embodiment examples. The reflective substrate 50 combines the position of the source focal axis E0, the circuit of source 20, 20*b* and the horizontal emission focal axis for any horizontal emission focal axis S1, S2, S3, Sn, Sr.

Said source axis E0 in its entry phase to the reflector 50 is capable of positioning itself between 0° and 180° with respect to the emission focal axis E1, which is always horizontal for the emissions of the frontal area FS horizontal axis S1, S2, S3, Sn, or the rear area RS horizontal axis Sr. and has:

A—The light entry means 29 according to their position on one of the limiting surfaces 5 or 6, on the edge on the perimeter thereof (middle area or on the perimeter), B—The direction of the focal axis of the emitter E0a, E0b, E0c, E0, of the LED source, OLED 30, which can be;

same direction as the focal axis of signal emission E1, FIGS. 15, 17a. 18b, 18c, 19, 34, 54.

perpendicular to the focal axis of signal emission E1, FIG. 17b inverse to the focal axis of signal emission E1, FIGS. 17c, 18a.

C—Position of the reflecting substrate 50 that coincides with the reflection transmission reference axis 33 define that its flattened ribbon shape can have a position between perpendicular (association by the edge) and parallel (association by one of its limiting surfaces 5 or 6), that is, between 0° and 90°, with respect to an association intersection point of the opaque cover H, Hc that hides it.

D—Interior released volume in the shape of substrate 70. When the position of the substrate 50 is substantially parallel to the surface of the cover H that conceals it, the signal device DS is capable of creating an interior volume 70 between said surface of the housing which covers it H and said reflective substrate 50. FIGS. 16-20a, 23, 24.

Said released volume 70 is capable of including another associated functional element that can include a plurality of functions to become a poly-functional module FIGS. 55-59b, with functions selectable between;

an antenna An on a PCB (printed circuit board), even forming part of the same circuit 20 of the light source, FIGS. 38, 40, 42.

a temperature sensor 55,

The multifunctional signal device DS is also mixed in functions with the same illuminating surface 3 by changing color and/or activation frequency and combining different activation zones, limiting said zones with a transmittance cut-off difference 28 in the reflecting substrate 50. of more than one light input 29a, 29b in each reflective substrate sector 50, uses LEDs of different wavelengths or RGB LEDs to emit a ray E1d, and another of a different color E2d, in the same area or between both signal areas Different FS at the front and RS at the back.

A second or third luminous or signal function, with the same illuminating surface 3, it is capable of changing light color and different application (emergency light, special vehicles, police (blue), firefighters (red), taxis (green) ambulances, (red, blue or white) use different LEDs or RGB LEDs with a controller 21, 22 capable of emitting at different wavelengths from 400 to 750 gauges, 30a, 30b. FIGS. 41-44, 50, 51.

ALTERNATIVE BLIS. The same DS device is capable of performing another independent function such as BLIS, alternative blind spot presence detection warning with the same complex optical-reflector body separating the front signal zone FS from the rear signal zones RS associated with the anti-stress locator 51, comprises the transmittance cut-off 28, a circuit with a cut-off interface to activate the independent part on another frequency and associate the activation to the BLIS system and the RZ radars.

A second or third luminous or signal function, by including another signal device DS2 with a different illuminating surface 1', and reference focal axes E2, a complementary infrared light 66 auxiliary light for night vision of a front camera ScF, an auxiliary light for slow maneuvers, parking, turning, cornering light, SS side position light with a lateral focal axis E2, FIG. 51, 52, 53-55.

An ScF front view camera, especially focused on capturing images of the wheel opposite the driver DV. FIG. 3, ref. 99 and 98, reproduced on an interior monitor of the M vehicle, An IR infrared light, 66, to support said cameras for night vision, FIGS. 35, 39, 41, 43, 45, 47, 49, 50, 55, 58.

An image projector by subtractive method that uses an LED light source, 30 a film 49 and a condensation optic 46 and another focal 46' to project a logo or an indication on the side floor of the vehicle, is activated as a welcome when unlocking access or with remote control. FIG. 35, 39, 41, 43, 45, 47, 49, 50, 55, 58

A laser projector Ls, which uses a laser LED 22s-30s that generates coherent light that has a collimated optic 47 that generates a plurality of rays and projects a light line LL, parallel and separated from the vehicle, on the lateral floor thereof and It extends from the height of the VIS system in overhead projection to the rear to approximately the distance of the rear wheel of the same to indicate how far the doors Do1, Do2, FIGS. 3 and 58, are opened, it is activated as a welcome when unlocking the access, with remote control, or touch, approach or operate the interior handle of the vehicle doors before opening the doors by means of a sensor-detector-switch any passenger thereof.

E—Position of the reflective substrate 50 with respect to the illuminating surface 3.

The illuminating surface 3 is the sum of integrated reflective substrates 50, capable of adopting different shapes, designs and variable widths, in the plurality of embodiment examples it influences the side on which the reflective sectors 50 are located.

The reflective substrate 50 comprises several integrated reflective substrates where at least part of its signal output reflective perimeter R2 coincides with the surface illuminant 3 and have a position with respect to said illuminating surface 3 according to its design, combinable between being;

on the same side when the surface 3 is a straight line, two lines, a line and an associated perimeter figure, a line and a curve that encloses part of a perimeter, FIGS. 21, 26, 27, 35, 37, 41-46, 49-52.

on different sides when surface 3 is a curve and counter-curve, separate surface sectors in unevenness, several separate perimeter figures, FIGS. 39, 40, 47, 48.

enclosed at least in part when surface 3 is a partial or total closed geometric figure, two parallel lines, or combines figure and lines. FIGS. 35, 36 (applicable to BLIS Bs), 35, 36, 37, 41, 43, 45, 46, 49-51.

For another example of embodiment, the multifunctional signal device DS has for its front part FS, the perimeter linear illuminating surface 3 in the shape of a geometric figure at least partially closed, several luminous lines, perimeter figures, discontinuous luminous sectors independent of each other, or two substantially parallel lines, associated with an opaque cover Hi independent of the casing H, said cover generates an eclipse effect on the reflecting substrate

50 that hides except for its perimeter that comprises said illuminating surface. FIGS. 35, 43, 45, 49, 51.

For another example of embodiment, the part of the illuminating surface 3 affected for dynamic activation comprises at least one section of the linear design or a sector selectable between S1, S2, S3, Sn substantially horizontal.

For another example of embodiment, when said closed cover Hi eclipses said reflector substrate 50, said cover Hi capable of being interchangeable with another different cover Hi selectable between being of the same or different material and, of aluminum, carbon, polycarbonate, with a weave decorated, partially opaque surface finish of a transparent or translucent material suitable for partially allowing light to pass 57 through a logo, openwork, screen printing, film, light-dark subtractive method, (opaque—not opaque), weave or gradient. FIGS. 26, 35, 43, 45, 49, 51.

For another example of embodiment, the illuminating surface 3 is capable of extending throughout the entire length of the housing H from end to end FIGS. 33, 34, 39.

For another example of embodiment, the signal device DS, the visible end of the advanced optical-reflector profile PH2 that forms the illuminating surface 3 is transparent in appearance, it is capable of having a surface treatment selectable between having;

micro optics or micro engraving to generate diffuse light,
a translucent cover in bi-injection material,
a tinted coloration in the material said advanced profile,
an engraving or hatching.
F—Integrated optical-reflector body. For all embodiment examples, source axis 30R, 31 that generates the backward signal is positioned between 0° and 90° with respect to the horizontal rear emission reference focal axis Sr.

If said source axis is not aligned with the emission focal axis Sr, it comprises characteristic upstream reflective means that configure an integrated optical-reflector body 50, 50' that provides a signal to the front part FS, forming an integrated optical body with the backward signal part RS with optical-reflective means that generate said horizontal backward reference axis Sr selectable between;

(Sr covers an illuminated field with a minimum angle between −5° and 60° with respect to the axis of circulation of the vehicle 100 and includes, together with the front signal part FS, the entire signal area 01 FIG. 1, independent of the design of the front part FS, applies optical-reflective techniques for the rear emission part RS with optical means that give continuity to the signal in the horizontal field of the external signal 01), a reflective substrate 50' with gaps that form a parabolic subreflector 42.
a reflection surface 43 placed before the source axis,
a 30R emission LED, 31 direct emission, or reflected,
a prism 40' or an associated cover comprising an upstream metallized reflective surface 40',
an external light guide 50', or internal, to said LED 31, 30R, FIGS. 28-32, The same integrated optical-reflector body 50, 50' and employs a circuit 20b connected by cable 24 to the circuit 20 of the front emission part FS. FIGS. 38, 40, 42, 44, 46, 48, 50.

G—Standard adaptive circuit. Therefore, multifocal mixed signal DS, by associating the front part FS with the rear part RS, preferably has a two-part circuit adaptable to the light source PCB 20 with LEDs 30 for the front signal FS, associated with another PCB 20b with LED 31 or 30R for the rear signal part RS joined by a flexible cable 24, or an adaptable part.

Said PCB part 20b is capable of having a different operation applied to another function other than the front signal FS and/or being exchanged for another to vary the distance that allows said circuit to be standardized by being able to vary the mounting distance between said circuit 20 and 20b only varying said cable.

The distance variation is a solution and advantage of saving development costs, the interface of the dynamic activation chip 21, 22, references, gaining reliability and being able to use it in different models of signal device and even for the left and right side, or change the rear PCB part 20b for another one with greater luminous intensity for industrial vehicles with a higher photometry requirement.

Said PCB 20 is preferably rigid or rigid flexible, or partly flexible material, fiberglass or polyester capable of adapting to the curvature of said substrate.

reflector 50 although the light entry points 29 in its radius R or distance Ra capable of varying in different lengths to equalize the curvature of the circuit of the light source 20 in the light entry phase PH1 and minimize the curve of said circuit. FIGS. 15, 16, 17a, 18c.

H—An antenna+20 LED circuit+temperature sink or 20t base metal plate, three functions in one.

Furthermore, the circuit is multifunctional, capable of including:

An, An radio frequency antenna.
An integrated radio frequency amplifier circuit 22, integrated on the other side of said circuit or separately and its connectors 21.
A GPS or Bluetooth locator circuit.
A 20t metal base metal plate or temperature dissipating element.
The interface of a front camera FcS and the camera.
Infrared lights 66 to support the night vision of said camera.
A dynamic activation frequency controller circuit that controls at least 3 LEDs.
A circuit to accelerate the activation frequency to more than 120 bpm for a second function of the same door opening advance warning device.
A cutting diode to separate the operation of the DS signal from the rest of the vehicle's turn signals, this separation defines an independent operation that is another function in itself different from the known blinkers.
Other LEDs of different light color, wavelength or RGB so that the same illuminating surface develops another function.
An activation circuit associated with emergency braking.

ANTENNAS AND ASSOCIATED OPERATION. The position of the VIS system and its structure projected into a vacuum and away from the metallic part of the CAR body and large sheet metal surfaces, the reception-emission of radio frequency waves is favored and without interference. Said PCB 20, in addition to being the basis of a standardized light source, is suitable for printing metal tracks on the other side of the circuit support with a radio frequency antenna geometry An with its corresponding amplifier circuit and connector 21, 22 capable of incorporating at least one An antenna or several An1, An2 antennas, and function as a miniaturized multi-band printed antenna to emit or receive radio frequency waves for a GPS location device, or devices capable of connecting via WLAN, Bluetooth, SIM card, 4G, 5G, or 6G broadband and provide data services, have improved wave gain based on combining mono-polar, bipolar, logarithmic, fractal variable geometry. In addition, this impression of metal tracks that serve as an antenna is capable of fulfilling a third function as a 20t metal layer suitable for dissipating the temperature of the LED chip from the source or antenna amplifier to improve this dissipation function has metallized thermal dissipation perforations in different parts of the PCB that connect the solder pins of the LEDs, and their associated anode and cathode tracks with the metal tracks on the other side of the circuit 20 which also has anther geometry.

THERMAL SINK. Failing that, to improve the heat sink or to have another lighting function that keeps the light fixed, a white daytime running light (DRL) or a cornering light, cornering light or parking aid (cornering light) at a higher intensity or a permanent on light said circuit applied PCB is capable of associating a base as a metal substrate (AL aluminum) to fulfill said triple technical effect antenna, light source and dissipate temperature.

For another example of embodiment, the VIS system is capable of having more than one antenna An or also associate it with the interior part of said lid or cover H that hides the reflector 50, or independently of the circuit 20 of the light source occupying the empty substrate space 70 between the reflector 50 and the cover H, or that the antenna itself is part of said cover H when it is an independent cover Hi delimited perimeter from the rest of the cover H, for this example it has a material composition or bi-material adapting to antenna operation, associating at least one part of aluminum, copper.

Said An antenna is capable of functioning in support of associated indirect active devices capable of issuing and/or receiving messages, warnings and communicating by radio frequency, Wi-Fi, Bluetooth, or different telephone bands, selectable between; beacon modules, a router, mobile phone, tablet, GPS, laptop PC, music players or augmented reality glasses or similar NON-limiting vehicles carried by pedestrians and vehicles with drivers, autonomous or remotely driven, or for entering parking lots, gas stations or highway tolls, or ADAS driving assistance systems or for autonomous vehicles or for some automated maneuvers.

Said device; In general, they are active devices of the vehicle or the periphery, which perform an activated function in some way, selectable between sensors, PIR sensors, volumetric sensors, barrier sensors, detectors, switches, RF transmitters, WIFI or Bluetooth low energy, microphones, beacon or similar modules, or internet networks, switches, light and acoustic visual signals, readers, scanners, displays, screens, cameras, cameras with intelligent recognition software for opening the vehicle or for security, remotely monitorable like the camera ScS side located on support 81 of the VIS system to avoid vandalism and not lose effectiveness even if the casing H of the VIS system is broken or torn off, ticket validators, card, barcode or QR code readers, RFID sensors (radio frequency identification) and receivers.

We also consider active vehicle devices, those associated or indirect that are momentarily connected by radio frequency (mobile phones or similar, vehicles equipped with devices for autonomous driving or remote control).

I—Aerodynamic and protective shell. Various active devices and passive elements such as the housing cover H or the advancing aerodynamic shape Ha, FIGS. 33, 35, 43. combined with the depression zone FIGS. 45, 47 and 48, for protection against the incidence of external stray light LI DL, against Hp shocks or arrangement of aerodynamic channels Ch1, Ch2, Ch3, can be integrated and combine several functions, forming a device that also integrates a VIS system of indirect vision that we call integral polyfunctional.

J—Interchangeable combinable. Said indirect vision VIS system capable of having cameras, sensors and the integral multifunctional mixed signal device DS, is combinable, expandable and capable of adapting to other structures of different vehicle models; It is the main external device for light signals and data collection for the side of the vehicle For all embodiment examples.

K—Anti-stress. The light source 31, 30R that generates the rearward signal RS, visible to the environment from behind VE and also provides a luminous locator device 51 of the mirror M1, located in an opening 4$p$ inside the frame 80, 80$x$ with the In order to help the driver create an automatic anti-stress behavior by quickly locating said mirror M1 in anticipation of the maneuver when turning or changing lanes, it comprises an optical extension or light guide as an optical appendage 52, and is visible to the driver's eyes DV by means of a reference focal axis VC therefore both emissions are repetitive, applicable when the VIS system uses flat M1 mirrors, or curved or aspherical M2 mirrors and also backward ScR or forward ScF cameras, the light output is a small surface illuminant 51 with means that generate a diffuse light, surrounded by an opaque area that favors contrast preferably in the 80$x$ widening of the frame 80 of the housing structure H located in the third T3, furthest from the body FIG. 22, 28, 36, 38, 52, or on the anti-reflective rear part 53 protected from external incident light DL, LI.

Said frame in the 80$x$ widened area provides two different lighting functions, on its external side, part of the signal light output backwards through the illuminating surface 3R and horizontal reference axis Sr, and on its internal side, a light output of the anti-stress locator with an independent illuminating surface 51 as a mirror locator with a reference axis VC directed to the driver's vision, surrounded by an opaque surface 53 starts from the widening of said frame 80$x$ when the system uses mirrors M1, M2.

L—Opaque cover, materials and logo. The cover H that hides the reflector 50 can develop more than one selectable and combinable function in relation to the material that composes it, and be or have:

1—Part of the opaque casing H.

2—Part of the device as a module with a Hi cover, independent of the H housing but associated with the multifunctional signal device DS to form a module or not.

3—Partly translucent (preferably made of a transparent but highly hard material such as PC polycarbonate, when it is included in a perimeter illuminating surface represented in the shape of an eclipse or when it is substantially flat), FIGS. 13, 15, 16, 17$a$, 17$b$, 21, 23, 26, 35, 43, 45, 50, and 51, have an internal surface 72 with a surface treatment, paint, screening, film or screen printing as a subtractive method to the it passes light in parts, that is, it lets part of the light from the reflector 50 pass through a diffuse surface in a sense as an emission that defines a TR frame, brand, logo, openwork, indication, in translucent bi-material or an image; or have a film with holographic treatment, or dichroic properties, that is, it allows light to pass in one direction and reflects it in others, or a paint cover that favors internal reflection. FIGS. 49-52.

4—A smooth cover flush with the rest of the VIS system H casing or have the following selectable and combinable variants:

A depression Hi associated with the rest of the shell to generate an aerodynamic channel Ch3 and direct the air A3 towards the third T3 furthest from the body. FIGS. 18$b$, 34, 35, 37, 43, 45, 47

An area of opaque cover Hn at the level of the illuminating surface 3 and the rest of the housing H, above the optical body or transparent cover 1b and reflector 50 and the transparent cover 3 at the transition between the front signal part FS and backward RS, or between their sectors when they are linear sectors or separate FIGS. 3a, 3b, 3c, 3R. FIGS. 45, 46, 51, 43.

Surround at least part of the illuminating surface 3.

Surround at least in part the illuminating surface 3 partial eclipse type of the Hi cover.

An associated element, in low relief, protrusion, aggregate, or high relief, especially when it is a closed perimeter boundary cover Hi or that eclipses the reflecting substrate 50 different from the rest of the housing H, Hc, selectable between a catadioptric substrate, a logo, an added metal insignia, be made of another material, aluminum, carbon or with a film or weave, or of a characteristic color different from the rest of the H casing that helps to locate or contrast the signal emitted by DS, orange, white or black, or anti-reflective or matte finish.

5—Be made of transparent, translucent PMMA, polycarbonate material, with a glossy exterior finish screen-printed on the inside or with an attached film (preferably if said cover is flat) to represent a pattern or figure with parts that allow the passage of residual light from the reflector that leaks through one of the tangential reflection surfaces 5, and 6, in this way it acquires a function of representing an iconic or gradient luminous figure, in addition to the turn signal, and to facilitate its assembly it is associated with a perimeter of another material welded by ultrasound or adhesive to facilitate assembly.

6—Have a protrusion area Hp with a level above the illuminating surface 3, especially in the rear signal part RS close to the third third T3 to avoid bumps and scratches. Furthermore, said area Hp part of the structure is the area furthest from the body of the outgoing vehicle and is capable of including a part in another material, composite material or bi-material with an elastomeric cover of a plastic or rubber compound or even with content of air in cavities, capable of having sponging or bubbles to absorb shocks with a Shore or Rockwell hardness, depending on the material, calculated to cushion said shocks. FIGS. 13, 14, 15, 16-21, 27, 28, 49, 51.

7—Have an advancing zone Ha as an aerodynamic attack profile and defensive protection against external light DL and incident LI on the illuminating surface 3, to reject it as reflected external light LIR. FIGS. 33, 34, 35, 43, 45, 53.

8—Have an Hd level zone that defines a distance above the illuminating surface 3, 3R and the rest of the casing H, especially in the third T3, at the farthest end of the vehicle body to avoid bumps and scratches, or to separate parts of the illuminating surface when it comprises separate sectors. All figures.

For all embodiment examples. The mounting method supports:

On the reflective substrate 50, fixing means that pierce said substrate 50 in areas where the loss of light transmission is negligible 33 applicable to the fixing of said cover, cover Hi when it is included in a perimeter, cables of the interface of the circuit of source 20 or other function, ultrasonic welding edges, adhesive bonding, elastomeric profiles, clip, screws and profiles that leave the reflection surfaces without influencing the final result of light emission.

An internal cover 10 for the interface of the source circuit 20, 20b, the antenna An, comprises various fixing means 17 by screw or clips 14, elastomeric edges 14e, with a support area for the connectors 15 and a valve to prevent condensation 11; Depending on the design, it is capable of being attached to the chassis 18 or to the housing cover H, FIGS. 16, 20a, 20b, 23, 24, 26, 27, 34, 44, 46.

This cover 10 has the purpose of forming the polyfunctional signal assembly DS as an integrated unit, fixing it to said reflecting substrate 50 and promoting internal reflection within it and preventing internal light leakage from the VIS system. Its attachment to the reflective substrate 50 is preferably by ultrasonic welding or adhesive, if it is not possible to cover the entire reflector 50, the signal device is suitable to have a cover 41. FIGS. 10a, 10b, 14, 25, 38, 40, 48, based on a paint or surface layer, preferably apply two layers, one that favors the internal reflection of metallic or white pigment, or a deposit of aluminum, titanium dioxide, or a reflective film and a second layer of opaque black or matte gray. In this process, the illuminating surface 3, which is transparent or translucent through which the light emits, is masked.

DARK BACKGROUND. LIGHT LEAKAGE. For all embodiment examples, the multifocal polyfunctional signal device DS comprises a set of internal parts and opaque background cover 10 that has a technical effect on the illuminating surface 3 and reflection, preventing light leakage, giving coloration or not to said surface 3 or generate a diffuse light, selectable between;

a treatment covered with reflective paint, aluminum, titanium dioxide, or a reflective film, a dark, gray or black background surface of the reflector, a background surface cover colored or white paint or film, an interposed surface 42 or gaps with diffuse surfaces G to generate diffuse light.

PROTECTION AND AERODYNAMICS. For all embodiment examples, we define the casing structure H of the VIS system as having a design form developed, configured and associated expressly to improve the functions of the DS signal device in order to fulfill, in addition to the protection functions, shock Hp, a distance above the transparent illuminating surface 3, and is capable of developing 4 combined functions, aerodynamics, protection against the incidence of external light LI that transforms into reflected or absorbed light LIR, protection against impacts Hp and bringing the signal and increase the contrast of signal perception.

It applies a shape with an advanced aerodynamic zone Ha that generates anti-turbulence channels Ch1, Ch2, Ch3, and at the same time protects with a profile the incidence of external light DL, LI on said reflector 50 and surface 3, and improves aerodynamic turbulence generating up to 4 air channels A1 channel Ch1 between said casing H, Hc and the vehicle that concerns a projection as an appendage, Hx that also brings a light indicator Bs closer to the driver's vision DV.

To understand this projection, its function and the function of the frame 80 of the VIS system, we define the shape of the structure from the external point of view VE from behind the vehicle, facing the mirror M1, we consider that said mirror must provide a field of vision which complies with UNECE/UN Regulation R46, which has positioning means and motors, some mirrors are composite M1, M2 and are capable of obtaining an extended field of vision, associating another mirror, spotter, aspherical M2 or a supplement, all framed in a housing frame 80 that is of homogeneous width, to ensure that the signal output backwards along the horizontal reference axis Sr does not bother the eyes of the driver DV, and a third illuminating surface 51 of the anti-stress locator of the mirror M1 that emits light specifically developed at low intensity and diffused with micro-machining means to create automatic conditioned anti-stress behavior, emitting a VC reference focal axis directed and visible specifically by the eyes of the DV driver. FORM AND BLOCKS. We define the VIS indirect vision system as a whole with respect to shape and location of parts considering the body shell H when it uses mirrors M1, M2, it is a block divided into three thirds vertical blocks T1, T2, T3, the first block T1 being the most close to the body and T3 the furthest and in two blocks with respect to horizontal volume from a midline Hm, two horizontal blocks at the top and bottom.

The illuminating surface 3 or integrated by sectors 3*a*, 3*b*, 3*c*, 3R is always placed before said secondary perimeter reflector R2 and is capable of covering the external surface of the housing H from one end to the other, occupying at least part of the three blocks. vertical lines T1, T2, T3 into which said casing H is divided with a continuous or discontinuous luminous linear shape. FIGS. 21, 33, 35, 39, 41, 45, 47, 49

The 80 frame has a homogeneous width for the T1, T2 blocks and an 80*x* widened frame for the T3 block furthest from the body, The VIS system has the following characteristics regarding form:

Said frame 80 in the area furthest from the CAR body. It has an 80*x* widening with an interior and exterior side capable of:

House on the exterior side the illuminating surface 3R, backward signal output RS emitted by the horizontal reference ray-axis Sr, suitable to comply with the photometry of UN/ECE Regulation R6.

Functions as a dividing wall, said 80*x* frame creates with an imaginary line 00, on one exterior side a signal field 01, differentiated on the other side, interior side or vehicle from a field 02 without signal where the DV driver's eyes are located.

House on its inner side an opaque or matte anti-reflective area 53 away from the incidence of external light DL, LI capable of housing and surrounding said illuminating surface 51 of the mirror locator M1, M2, in order to provide anti-stress aid to the conductor through a reference axis that emits diffuse ray VC of low intensity less than 0.6 candela visible by the eyes of the conductor DV. FIGS. 22, 24, 28-32, 36, 54.

The frame 80 defines at the beginning of the first third block T1 a limit 0 from which the casing H is capable of extending in direction TO towards the body of the CAR vehicle and providing an appendix-shaped surface Hx, which defines a volume narrow, substantially triangular antler-shaped, said volume is preferably located in the upper block above said midline Hm and is developed in the area closest to the eyes of the driver DV with the double technical effect of;

create an anti-turbulence aerodynamic channel Ch1 that diverts and organizes the air in direction A1, between the structure of the VIS system and the body of the CAR vehicle.

accommodate a light warning device part of the lane change warning system, blind spot detection Bs (BLIS, Blind spot detector) associated with the RZ perimeter radars and the electronic activation interface that issues warnings with a focal axis VB, oriented and visible by the eyes of the DV driver. FIGS. 3, 35, 36, 39, 41, 43, 45, 47, 49, 51, 53. This BLIS device is capable of applying the same technical concept of hidden reflective substrate 50, when the substrate is perpendicular to the axis of the parabola A, FIG. 11 with an illuminating surface 3 in the shape of a luminous eclipse, with any shape and surface treatment technique engraved or silk-screened, preferably triangular in shape to signify danger capable of in turn applying a second warning light to emit a double message in a differentiated way Bs, Bs' of another shape or color with a figure included in the eclipse perimeter FIGS. 22, 35.

For the application examples where the VIS system comprises viewing mirrors and/or mirrors and cameras, the multifunctional signal device DS comprises the reflecting substrate 50 for its front signal part FS positioned behind the mirror M1, M2, indicated by an axis horizontal FSx that represents a plane indicated by the opposite arrows FSx between an upper tangent tgs and lower tgi to the edge gap Mx of said mirrors, which allows the volume of said reflector 50 and signal device to be included in said housing H, Hc and with its aerodynamic profile against advancing air Af reduce resistance as a ballistic element by lengthening the object in the FSx direction and deflecting the air into channels Ch2 and direction A0 upper and A2 lower. FIG. 23, 24, 34, 36, 52.

DOUBLE FUNCTION DOOR APPLIANCE+FLASHING+LASER. For the application examples where the VIS system includes vision cameras, or mirrors, the multifunctional signal device DS and especially in the rear part RS, provides a luminous anti-stress locator 51, in order to alert the person who opens the door. the door from the inside, driver or passengers, The system is capable of assigning, combining and associating devices from other systems and the system with each other with another activation frequency other than the turn signal and provide a second, third or fourth function independent of those known for the selectable DS flashing signal. between:

A—Door Opening.

Activates the DS signal independent of the rest of the vehicle's signals, (said independence of operation is a function in itself), in response to generate an advance warning of door opening to visually and audibly notify the external environment and the vehicle occupants. At the same time, it works;

before opening the door associated with a short-distance actuator-sensor-detector on the interior handles of said doors or that is activated in the movement gap before activating the latches by means of a switch, the DS signal at an accelerated activation frequency greater than 120 bpm, by means of an independent controller activates only the DS signal of the indirect vision system, cutting off the activation by means of an interposed diode or interface with a similar effect that leaves the rest of the vehicle's turn signals for that side without activating, activates a laser projector Ls that projects a laser line LL on the side floor of the vehicle to indicate how far the front doors Do1 or rear doors Do2 are opened, activates a buzzer with frequency and singular sound, a sound directed towards the external environment (cyclists, motorcycles or scooters) that indicates in an identifiable sound manner that the door is going to open.

Simultaneously, it draws attention to the vehicle's occupants visually and soundly;

said anti-stress locator 51, the internal buzzer 58, which may have other applications, is activated with at least a set of 3 beeps before opening the door and with a set of more than 3 beeps once the door is opened, (a proven frequency that creates a conditional behavior).

an interior light preferably located on the interior panel of the door in question or associated with the opening handle.

the associated BLIS warning device as a double warning device towards the interior of the vehicle.

For all embodiment examples when the VIS indirect vision system uses cameras, the anti-stress locator function 51, or the BLIS is capable of being represented on the monitors M visible by the driver DV in normal driving position by signs or marks superimposed on the appropriate position on the screen of the same monitors through application software, the early door opening warning function associates the other devices in the same way.

B—Detection of Pedestrians in Danger in Front.

Activates the DS multifunctional signal independent of the rest of the vehicle's signals in response to the detection in front of pedestrians in a dangerous situation detected or recognized by the front cameras or RZ front radar, with the technical effect of stimulating attention and creating a warning to the pedestrian. in the face of possible danger and make a defensive movement.

C—Emergency Braking.

Activates the DS multifunctional signal independent of the rest of the vehicle's signals in response to automatic emergency braking.

ANTI-STRESS LOCATOR. Said locator is a function specifically developed with the same light source as the external signals that convert a Ds device into a dual-function device in the simplest version.

Understands; an illuminating surface 51, an optical extension or light guide as an optical appendage 52, is visible to the eyes of the driver DV by means of an axis-reference focal ray VC, fulfilling the anti-stress object even without having a mirror and without exerting the image location function, said anti-stress function has the purpose of helping the driver to automatically stimulate the behavior of paying attention, in several functions that include; at least when turning on the turn signal to indicate the change of direction, in the advance warning of door opening that differs because it increases the activation frequency on and off>120 bpm, in the warning of a vehicle passing nearby associated with the RZ radars of the BLIS system also with an increase in frequency since it justifies its official approval as a failure in the turn signal indicator system.

MONITORS WITH EXTRA FUNCTIONS. For another example of application, the system when applying cameras performs the same warning and locator functions by over-editing an image, line, mark, coloration or signal on the cabin monitor of the vehicle M to develop a similar automatic conditioned behavior as an aid to the driver. DV.

For all embodiment examples, the VIS system is capable of associating multifunctional modules that associate the ground projection functions and the ScF front view camera with limited vision to the front wheel area FIG. 3, this module comprises selectable and expandable: a front view camera ScF, infrared IR lights 66 to support night vision, a temperature sensor 55, a sound emitter, speaker, buzzer, ring, buzzer 58, a laser projector Ls that projects a light line on the floor in support of the early warning system for door opening, front Do1, rear Do2, an image or logo projector, a courtesy or welcome light.

ACCESS AND SURVEILLANCE MODULES. For all embodiment examples, the VIS system is capable of associating modules outside the multifunctional signal device DS, especially with security, surveillance or vehicle access functions, preferably arranged on the body fixing arm 81 or on a platform of said support firmly fixed to the CAR body selectable between;

an intelligent ScS side camera with motion sensor and night vision, remotely monitorable by radio frequency suitable for recording images and communicating remotely over emergency internet networks.

an RFID 54 (radio frequency identification) reader for access control and locks.

a 73 touch matrix keyboard for access control key and locks.

a GPS 56 or Bluetooth position locator.

ANTI-VANDALISM RELIABILITY. Part of the interface of one of these devices arranged as a split circuit 59, which comprises two separate parts in order not to be disabled due to breakage or vandalism of the housing body H of the rearview mirror or cameras, and so that its controls or activation are inaccessible from the outside;

a first part comprises (An antenna or circuit 20, 21, 22) located in the VIS system, in its body or in the support arm, in the DS signal device, in some set of multifunctional or multi-camera MM or in a platform associated with the fixing support and the body, a second part comprises a reader for a digital memory 75 (with USB connection port or housing, Compact flash card (CF), micro SD or similar), or SIM card 59, located inside the vehicle. FIGS. 27 and 58.

These modules concern:

an RFID reader module (radio frequency identification), a touch activation circuit by a matrix keyboard 73 by capacitor for key recognition, a GPS location transmitter module 56 or an intelligent ScS side camera, with motion sensor, and vision night, suitable for association with a vehicle access and surveillance system in the case of the camera that can be monitored remotely by connection to a mobile internet network via SIM card (Subscriber Identity Module), Bluetooth, beacom database modules or said memory digital storage 75 inside the vehicle.

All VIS system cameras can be connected to the M indoor monitor wirelessly or with a simplified cable system and have a motion detector.

POLYFUNCTIONAL. For all the implementation examples of the VIS system, the multifunctional signal device DS and the associated warning devices have a variable activation and configuration, selectable in some cases with a double object:

A—The signal device as a mixed multifocal polyfunctional DS is activated when actuated;

the turn signal to indicate a change of direction, emergency lights notify the opening and closing of the vehicle, when the 360 system by camera, RZ front radar detects the presence of a pedestrian in front FIG. 3.

Automatically perform emergency braking on the vehicle's ADAS system.

When the ScS side intelligent camera detects a suspect near the vehicle automatically or by voluntary activation by monitoring the image captured from a distance.

Operate or touch or approach the door opening commands before or during the opening of any of the vehicle doors, especially from inside the vehicle and below a certain speed (15 km/h) or stopped, associated with a controller that increases the activation frequency >120 bpm, an internal and/or external sound buzzer 58 that operates for at least 3 cycles with a determined frequency oscillation (hertz Hz) and a level of sound intensity, volume (decibels dB) perfectly audible characteristic, preferably between 800 and 4000 Hz and a volume between 40 and 85 dB for a sound inside the vehicle, if the device is external located in the structure of the VIS system it can be higher intensity up to 95 dB; and the laser projector Ls that indicates with the luminous line preferably of red color of 650 nm (nanometers) in length projected the ground next to the vehicle LL, to where the doors will open before opening.

B—The BLIS warning device is activated when actuated; the turn signal above a certain speed to change lanes. when RZ side radars detect the presence of a vehicle in advance and range.

when operating the interior handle before opening the doors to avoid the door slamming outwards, associated with the DS signal and a buzzer sound module 58 and/or the laser projector device Ls.

DEFENSIVE FUNCTION, WARNS THE NEXT VEHICLE AND THE DRIVER AT THE SAME TIME. The system combines with the detection field of the RZ radars, an independent automatic activation and at a frequency higher than the turn signal of the multifunctional signal device DS, at least in the rear emission zone RS, to indicate to a vehicle that advances from rear to front and that it is dangerously close and is capable of receiving the message in that rear side illuminated field by the rear reference focal axis Rs and indicating that it is close to the vehicle. This function can be associated with a BLIS function, and is capable of simultaneously informing the driver of the DV vehicle through the BLIS warning device, VB signal or through the anti-stress locator 51.

DIDACTIC FUNCTION. OF SECURITY. The VIS system combines and associates devices from another system and the system with each other with the same or different activation frequency to provide a new safety educational function by not putting the turn signal flasher below a certain speed, preferably below 15 km./h. and bend the steering wheel to turn with the effect of teaching and correcting the lack of application of the turn signal DS is capable of activating the BLIS, and/or the intermittent DS signal, independent of the rest of the signals and the side of the turn at low speed by turning the steering wheel and not turning on the turn signal, and/or optionally the internal buzzer that creates a conditioned behavior.

For another example of embodiment, the signal device DS has a smaller development in the front part FS, with less than three sectors of reflective substrate 50 maintaining the dynamic activation capacity by coordinating a different activation between the front part FS, and the part towards back RS.

For another example of embodiment, the signal device DS has a minimal development on the front part FS, with a single focal axis with a hidden reflective substrate 50 without the capacity for dynamic activation.

For any example of embodiment, the different devices of the VIS indirect vision system are suitable for flexible development, contemplating different levels of equipment in functional packages and form independent multifunctional modules interchangeable with other modules with more or fewer functions. They have a compatible fitting profile. and assembly system capable of equipping a vehicle with more or fewer functions using a basic structure in assembly.

Standardized industrialization that provides the innovations presented such as extendable circuits, interchangeable modules, double or triple use of devices to create new functions all aimed at improving safety, lowering development and industrialization costs, aids to the driver, passengers and Vehicles from the environment are added advantages that arise to improve the product, safety, and lower the cost.

The design of the H shell, and its Ha, Hp, Hi, Hc, Hx, Hlo covers designed is an association function to improve and protect the DS signal device with four functions, create aerodynamic channels that prevent turbulence and noise, especially the lateral channel Ch3, taking advantage of the horizontal section that defines the illuminating surface 3, protecting from impacts, the incidence of external light on said signal output surface 3 and hiding the light source 20, 30 and the reflector 50 from external parasitic light. FIGS. 18b, 23, 34, 35, 36, 43, 45.

For all embodiment examples, the reflective substrate 50 has negligible and blind areas of 100% reflection, and other areas that can be improved in light distribution that can be oriented to the signal output; In these areas as a characteristic and advantage it has;

perforations to have fixing holes 17 for cover, logos, or cables, perforations, gaps, holes and surfaces with a determined shape in order to interpose surfaces in the substrate 50 or in any part of the complex optical body with the function of sub-reflectors 42, SuR, G, or light distributors with reflector sectors of internal or external parabolas R-EX, R-IN, internal, with the technical effect of homogenizing or associating the main transverse axis-ray 33 and associated axis-rays 34, or to optimize the rear emission axis Sr, and all the direct or reflected emissions E1, direct E1d, reflected E1r, diffuse E2G, reflected diffuse E2Gr, Furthermore, these perforations allow us to obtain extra advantages, lighten the weight of the substrate, save material and cost.

This action of lightening weight with perforations, empty or hollow areas is "NOT" viable in light guides because they are tubes and the main emission ray-axis is only one and is longitudinal, therefore it would cut off the emission and the tangentiality that always It is longitudinal, as a difference, in the reflective substrate 50, (patent concept) the main ray-axis is transverse, directed or omnidirectional, by sectors of short distance, widthwise and of concentrated light reflected or direct towards the same surface illuminant where 3, 3a, 3b, 3c, 3R is integrated, that is, in all directions with great intensity towards a target.

Signal and light devices with the explained and claimed technique of hidden reflector for indirect vision VIS systems of similar technical effect are capable of being applied on vehicles with 2, 3, 4 or more wheels and on other pairs of the vehicle.

REFERENCES, PARABLE OF THE MAIN
HIDDEN REFLECTOR 50 a—Perpendicular 90° angle formed by the average ray 33 when it hits the perimeter surface of light output R2.

A—Axis.

D—Guideline.

D'—Parallel guideline to shorten parabola.

Db, Di, Dx, lines of displacement of part of the curve of the reflecting parabola 40 to develop a parabolic collimator 40c, of another type of curve, conical or plane of internal or external reflection to reduce volume or an extension of the reflector and the illuminating surface 3.

DL—External parasitic light, ambient or artificial light from other media or vehicles.

Ds—Distance of the sector associated with the length of the 3x sector.

E1—Light emitted as a signal in one of its multiple axes according to the horizontal plane in front, side or behind, represented as a ray or vector.

E1d—Lightning emitted directly.

E1r, E1r'—Ray emitted in a reflected manner.

E2—Ray emitted by parabola as an external reflector or with another color of light.

E2G—Ray emitted diffusely.

EX—Exterior points of the parabola.

G—Surface with diffuser engraving

IN—Interior points

F—Internal emitting focus coinciding with the focus of a parabola.

F2—External emitter focus.

L1—Output width that defines the distance between the tangential reflection surfaces 7 and 8 in the output phase PH2

L2—Entry width that defines the distance between the tangential reflection surfaces 7 and 8 in the output phase PH2 is the art that links with the reflection perimeter R2 of the reflecting substrate 50

P1—Plane representing the reflective substrate 50.

P2—Plane that represents the reflecting substrate in the output phase PH2 with a change in direction generated by the break of the perimeter reflection surface-light output R2, P2 is preferably perpendicular to the plane P1.

R1—Inclined reflection surface of approximately 45°, simple, collimated or nano-faceted in the PH1 input phase that produces a reflection similar to a parabola.

R2—Inclined reflection surface of approximately 45°, simple, collimated or nano-faceted in the output phase PH2, which occupies part of the perimeter of the reflecting substrate 50, produces an initial reflection of the light output or emission phase E1 with the shape parabola or surface that produces a similar reflection effect. it receives perpendicularly, (right angle to) the average ray 33 that is transmitted across said reflective substrate 50.

R—Radius of the parabola.

R'—Equivalent to the radius of the parabola, distance to the directrix.

Ra—Source axis coupling ray E0, coinciding with the radius of the parabola 40, capable of varying in distance to match the curve of the source circuit 20 between different light entry points 29 along the reflective substrate 50, represents the initial phase PH1, entrance to reflector 50. FIG. 15

R-EX; R-EX'—External points or external part of the reflecting parabola 40. concentrated displaced to reduce space mainly on the light coupling control surface to the optical body 50.

R-IN—Internal points or internal part of the reflecting parabola.

SuR—Sub-reflector and optics combined, is an element that defines an intermediate surface within the reflector

50 that produces a change in direction and distribution of light, consists of a perforation that forms a displaced reflection parabola surface 40 that includes optics coupling 29, capable of favoring the passage of direct light in part and in part producing a retro-reflection to distribute the light towards the simple or collimated perimeter parabola 40, 40c that reflects it back towards the illuminating surface 3 for light output.

T—Thickness of the reflecting substrate 50 between the tangential reflection surfaces 5 and 6 normally less than 10 mm, (<10 mm.)

V—Vertex.

3f—Total or "full" illuminating surface of a luminaire with a reflecting parabola.

REFERENCES, INDIRECT VISION SYSTEM VIS AND DS SIGNAL

00—Limit line that divides the illuminated field of signal 01 from the field not illuminated by signal 02 where the DV driver's vision points are.

01—Signal area emitted to the environment.

02—No signal or shadow area

0—Vertical line that defines the initial point of the set occupied by the signal sectors and the T0 sector as a protruded part that occupies the blind spot detector warning indicator Bs or Blis (blind spot detector) and also includes a part of anti-turbulence structure of the Hx casing as an appendage closer to the vehicle body

1—External transparent cover.

2—Opaque cover associated with the illuminating surface 3, when it is an external supplementary cover capable of acting as impact protection, as an aerodynamic channel or as protection against external incident light LI or internal located under the transparent cover 1 and is of any color, or material similar or different to the rest of the casing H or preferably dark or matte black capable of absorbing external incident light Li in any of its reflected or refracted forms.

2—Internal opaque cover 3 when the signal device has an external transparent cover 1, or is the perimeter at least in part of an external or internal geometric figure.

3—Illuminating surface through which the light from the DS signal device is emitted.

3a, 3b, 3c . . . 3n-differentiated illuminating surface sectors that emit the signal in different axes towards the lateral frontal area FS.

3p—Aperture that defines the accommodation of the illuminating surface 3 of the DS signal device in the external part of the housing H, or the opening combined and associated with the surface 3 and the independent cover Hi, "NOT" visible to the driver's eyes DV.

3R—Illuminating surface that emits the signal in the rear focal axis RS, located on the outer side of the 80x frame.

3x—Length of the illuminating surface 3 for a sector 3a, 3b, 3c, 3n, capable of being lengthened based on the combined use of collimated reflectors 40c and R-EX, corresponds to the hidden reflector 50x.

4p—Opening that defines the housing of the anti-stress locator 51, in the internal part of the frame 80x. Visible by the driver of the DV vehicle.

4—Base section of the signal output phase of the device on the reflection edge and change of direction of the reflector-transmitter 50, said section wider than the illuminating surface 3.

5 and 6—Internal tangential reflection surfaces of the reflector-transmitter 50.

7 and 8—Tangential reflection and signal output phase narrowing surfaces that begin at base 4 and end at illuminating surface 3.

10—Internal opaque cover that concerns the electronic interface of the light source, its circuits, emitters, connectors, antennas, and fixing elements.

11—Valve to prevent condensation when the device has an external transparent cover 1.

11E-Valve to prevent condensation of an external casing when it contains the interface of a camera vision module.

12—Internal surface of the opaque cover 10 that covers the reflector 50, which can be colored that favors reflection, consisting of a painting process or with an associated film.

13*a* and 13*b*—Adhesion edge between the structural parts of the device, preferably ultrasonically welded.

14—Elements to facilitate fixation to the system structure, perforated ears, clips, centering and position teeth.

14*e*—Elastomeric gasket.

15—Connector fixing mouth.

16—Positioner of circuit 20 of the internal electronic interface.

17—Screws or clips for fixing to the chassis.

18—Chassis or support structure for the entire indirect vision assembly.

20—Light source printed circuit.

20An—Printed circuit associated with the LED 20 support circuit on the reverse side with a geometry and integrated amplifier, adapted to function as an antenna.

20*a*—Printed circuit board of the multipoint light source, PCB (printed circuit board) for the lateral front focal axes.

20*b*—Printed circuit board of the light source, PCB (printed circuit board) to emit on the rear focal axis

20*c*—Printed circuit of the light source, PCB (printed circuit board) for a complementary lateral signal or lateral position light that emits with a focal axis at 90° with respect to the axis of circulation of the vehicle.

20*t*—Metallic printed tracks on the PCB, adjacent to the LED as a thermal interface with the function of dissipating LED temperature, the track opposite to the insertion of the LEDs when it has a geometry and functions as an antenna, it can also have the double function of dissipating the temperature generated by said LEDs and interconnected by thermal connection channels or perforations.

21—Antenna amplifier integrated circuit.

22—Integrated circuit controller for the dynamic switching on of the SM mixed signal LEDs.

22*s*—Ls laser device controller circuit.

23—Antenna-signal-cam mixed signal circuit connector.

24—Cable de extensión del circuito de la señal que permite variar la posición del circuito 20*b* que posiciona los LED que emiten señal hacia atrás RS.

28—Líneas de corte transmitancia de la luz dentro del reflector 50 para evitar la coloración en otro sector de señal cuando la señal mixta es de más de un color de luz.

29—Óptica de acoplamiento y control en el cuerpo óptico 50 para la señal frontal FS.

29'—Óptica de acoplamiento y control en el cuerpo óptico 50' para la señal atrás RS.

30—Emisor de luz preferentemente LED.

30C—Emisores de una señal complementaria, luz de posición lateral.

30*s*—Emisor laser.

30R—Emisores de luz de señal hacia atrás preferentemente LEDs.

31—Emisor de luz de señal hacia atrás que es capaz de hacer la doble función auxiliar del sistema BLIS de detección de ángulo ciego e intermitente a la vez.

32*t*—Rayo reflejado de forma tangencial o en ángulos menores de 15° en las superficie laterales 5 y 6 limitadoras del sustrato reflector oculto 50.

33—Haz interior del cuerpo 50, es el eje-rayo transversal de referencia de emisión, transmisión reflexión, interior, perpendicular al perímetro reflector de salida R2.

34—Haz en fase PH2 o de salida y concentración sobre superficie iluminante 3 genera el eje de emisión final horizontal E1.

35—Línea de extrusión de la sección del cuerpo óptico 50 que se asocia a la cubierta *opaca* H como una segunda piel interna para quedar oculto a la luz incidente externa LI.

36—OLED en sustrato como fuente de luz.

40—Parábola reflectora interna en fase de entrada PH1 o de salida PH2.

40'—Parábola reflectora por encima del LED 30R con el efecto técnico de facilitar la emisión de señal hacia atrás Sr, preferentemente es metalizada y tiene una parte encima de los LED 30R y el circuito 20 para establecer una transición de diseño entre la señal al frente FS y la señal atrás RS. También llamada Hi o cubierta interna.

40*c*—Parábola colimador que ocupa parte del perímetro del cuerpo reflector 50, opuesto a parte del perímetro de 50 que genera la PH2, fase de emisión de luz al exterior.

41—Sustrato en depósito o pintura sobre las superficies de reflexión 40, 40*c*, o pieza metalizada, pintada asociada para mejorar la reflexión y evitar la fuga de luz 33 del cuerpo óptico reflector 50 en cualquiera de sus versiones.

42—Medios de reflexión interna en face 1 consiste en una perforación del cuerpo 50 para formar un sub-reflector SuR y optimizar la distribución de luz emitida, directa E1*d* y reflejada E1*r* por la fuente de luz 30.

43—Medio de reflexión interna para corrección de la emisión de señal hacia atrás RS.

44—Elemento para ocultar y sujetar el LED que emite hacia atrás 30R.

45—Parts for joining and rectification of areas of the hidden reflector body 50, outside the range of the reflector or transmitter, developed to facilitate injection, mold closure or fixing areas 14.

46—Projection optics that concentrate the emitted light for the Ls laser projector or for the film icon or logo projector.

46'—Optical focus lens for projection of the logo, icon or image.

47—Pouden optics are an optics that reduces its volume based on a collimator, generating a number of rays whose result is a projected line LL of coherent light or laser light on the side ground next to the vehicle to indicate as a safety measure how far they open. the doors.

48—Cap of the Ls laser capsule that allows the projected light to be adjusted.

49—Image projector film Pr or welcome or courtesy light Lc.

50—Reflector-hidden transmitter of the mixed signal formed by a transparent laminar body in turn formed by chained sectors whose optical means are suitable for emitting the forward-lateral signal FS, it is crossed widthwise by the reference ray-axis transversal 33.

50'—Mixed signal transmitting reflector whose optical means are capable of emitting the backward signal RS.

50*a*/50*b*—Reflector 50*a* of a signal device arranged on one side of the illuminating surface 3 when another reflector 50*b* of the same signal device is on the other side of said illuminating surface even though they are the same or different chained sectors.

50*p*—Hidden reflector with a laminar body when its edges form a geometric figure.

50*x*—Length of the hidden laminar reflector 50.

50*y*—Width of the hidden laminar reflector 50.

51—Locate the behavior or anti-stress automation mirror, helps the driver to develop a reflex action, works with the same light source as the signal on the rear emission part RS, therefore it is also a witness of operation, it comprises a transparent appendage derived from the reflecting optical body 50, it is also applicable when the vision system is a rear camera.

Capable of taking the shape of any geometric figure as a small illuminating surface of diffuse emission surrounding an opaque area 53 of the housing.

52—Appendix with the optical and reflection means to divert part of the signal light with a diffuse emission surface and low luminous intensity.

53—Widened frame surface that provides a contrast area surrounding said illuminating surface of the anti-stress locator and operating indicator light 51.

54—Vehicle access recognition sensor zone by key or RFID alternatively is capable of being associated with a side surveillance camera or ScS access to the vehicle.

55—Temperature sensor.

56—Vehicle locator via Bluetooth or GPS with SIM card.

57—Weave, finishing finish on the H, Hi cover, which allows part of the light to pass through through film or laser surface processing, with a weave, logo or image.

58—Sound emitter, speaker, buzzer, ring, buzzer.

59—SIM card module inside the associated vehicle and part of the interface or antenna An of the Bluetooth or GPS locator 56.

60—ZY plane when X=+1 is a plane at the rear of the vehicle where the signal light photometry is performed that extends from 5° to 60° as a minimum angle.

61—ZX lateral plane.

62—ZY frontal plane when X=−1

63—Complementary lighting area with infrared IR in association with a night vision camera.

64—Danger zone when opening the door and courtesy light illumination.

65—Image capture and surveillance area of a ScS side-focus camera that covers access to the vehicle and is suitable for remote monitoring and for saving data and images in an internal memory 75.

66—Complementary lighting for IR night vision and complementary lighting area for the front side camera, preferably infrared IR light for night vision with a hidden reflector system whose optics can use a hidden reflector system similar to that of the DS signal and to BLIS, BS.

67—Catadioptric surface associated with the signal device that receives the incident light LI and reflects it in the opposite direction. LIR.

70—Substrate volume preferably included in the perimeter of the luminous geometric figure open or closed by the signal output phase included between the hidden reflector 50 and the external opaque surface of the structure H, Hi, Hc, which hides it, susceptible to include another functional device such as an An antenna, an ScF front camera and its interface or another lighting module with a different function such as DS2 DRL light (daytime running light), or cornering light.

71—Air line directed towards an aerodynamic channel associated with the signal device and its opaque cover H.

72—Internal surface of the cover H that hides the reflector 50, depending on the material, said cover H can be translucent and the internal surface can be a surface treatment, paint, film or silkscreen and allow part of the light from the reflector 50 to pass through in a sense as the emission of a plot, brand, indication or logo.

75—SD secure digital memory, digital data storage medium located inside the vehicle associated with a device located in the indirect vision VIS system or in its DS signal subsets and external devices cameras, GPS with a USB type connection, micro SD, or similar.

80—Frame of the indirect vision system assembly that defines the opening that houses the mirror.

80*x*—Frame, structural of the VIS system widened at the end of the third T3 furthest from the body C has two sides, one inside and one outside and defines the division 00 of a signal field 01, of a NO signal field where the DV driver eyes.

81—Support foot that fixes the body of the system to the body of the vehicle.

82—Fixing element, screw or bolt to the bodywork.

83—VIS system body rotation axis.

84—VIS system body rotation axis spring

86—VIS system body rotation motor

87—Wiring of the functional components of the VIS system

88—Multifunction connector.

90—Integrated lighting and camera assembly and module.

91, 91'—Support arms when the system is at least one camera more than 100 mm away from the vehicle body and the structure, to be more stable, has two supports that link it to the vehicle body.

95—Indirect vision or rearward detection system by camera, radar or sensors capable of acting associated with vision systems or side signals.

96—Indirect vision system or forward detection by camera, radar or sensors, capable of acting associated with vision systems or lateral signals.

97—Object advancing and overtaking the position of the vehicle from the side, from back to front, capable of being captured by the side radars, even outside the field of vision of the side mirrors MZ1 and MZ2

98—Front side view area close to the front wheels of the vehicle captured by the front side camera. ScF 99—Area close to the front wheel on the side opposite the driver and with no vision for the driver.

100—Vehicle circulation axis.

101—Line parallel to the circulation axis 100 and passes through the lateral indirect vision assembly Sm, it serves to evaluate the horizontal angle of the emitted signal.

Af—Front air, as an aerodynamic incident

At—Lower casing anti-turbulence profile.

A0—Upper air outlet.

A1—Interior side directed air outlet.

A2—Lower directed air outlet

A3—Air outlet directed towards the outer side.

Ad—Depression in the H shell to channel the air flow and obtain aerodynamic optimization with active intervention of the DS signal device.

Adc—Depression associated with the objective of a dark matte cam to avoid external parasitic reflection on the objective.

An—Antenna circuit, associated with the DS signal device circuit, the LED source 20/30, OLED 36, to the reflector 50, to the cover/housing H or internal independent cover Hi.

An1, An2—When the DS signal device has more than one antenna associated with different capabilities.

Bs and Bs'—Blind spot detection warning signal of the BLIS system that uses a hidden reflector optic with a similar hidden reflector concept according to FIG. 8_b_.

C—Body of the vehicle to which the VIS indirect vision system is attached.

Ch1—Lateral aerodynamic channel towards the interior and anti-turbulence vehicle.

Ch2—Aerodynamic channel towards the bottom of the structure, anti-turbulence

Ch3—Aerodynamic channel for concentration and lateral air outlet formed by the advanced Ha cover and Hi in the Ad depression.

Do1—Front door open

Do2—Rear door open

DS—Multifunctional mixed signal device, which works associated with other vehicle signals or independently, emergency, flashing or advance door opening warning, vehicle nearby warning, pedestrian warning in front that emits light to the front, side and rear on several focal axes E1 and with a different way of activation between them, with a hidden reflector 50 and light source 30, 31.

DSM—Multi-function mixed signal device as a module with the possibility of interchangeability with another of other functions or design.

DV—Driver's vision and eye points in the normal driving position.

E0—Focal direction of the light source with respect to the final emitted light.

E0_a_—Focal direction of the source same as the emitted light E1.

E0_b_—Focal direction of the source orthogonal or transversal with respect to the emitted light E1.

E0_c_—Focal direction of the light source reverse that of the emitted light E1.

E1—Light emitted as a light signal in one of its multiple axes according to a horizontal plane in front, side or behind.

E2—Emission of the same device or another device, of another color of light.

FcS—Front Focus Camera Indirect Vision System.

FS—Front sign and illuminated field. (Front signal)

FSx—Arrow indicating a horizontal or flat axis for positioning the front signal output FS, illuminating surface 3 and reflecting substrate 50 are positioned behind mirror M1 a horizontal level included between an upper tangent plane tgs and a lower tgi plane with respect to said mirror M1.

H—Opaque cover that hides the reflector 50. (Housing)

Ha—Zone of the deck in advance of the rest of the general deck H of the VIS system structure, as an aerodynamic attack zone.

Hc—General cover of the VIS indirect vision system assembly capable of being painted or made of another material compared to the rest of the assembly (carbon, aluminum or anti-shock elastomer).

Hi—Opaque cover is capable of having a depression part that generally occupies the inner or enclosed part of the DS signal device with the technical effect of initiating an aerodynamic channel Ch2 downwards and Ch3 towards the outer side. It can also have the shape of a closed geometric figure or be metallized when it has the technical effect of facilitating the reflection of the rearward signal RS and Sr of the LED 30R that it covers as well as the interface of circuits 20, 20_a_, or 20_b_.

HLo—Cover with logo in low relief or perforated by over-injection or silk-screen printing or added at an adhered or fixed level.

Hn—Cover between signal emission parts at the front FS and rear RS of the signal device DS, when parts of the illuminating surface 3, 3_a_, 3_b_, 3_c_, 3_n_ of the front sector FS, and 3R of the rear sector RS, are separated; covers this separation as a design option or by the technical effect of facilitating the reflection of the signal emission towards the rear RS, at the same time the aerodynamic exit of the air A3 in the aerodynamic channel Ch3, which is created between the protrusions as above level of the shock protection cover Hp, and advanced housing Ha, said cover Hn is at the same level and flush with the associated or neighboring illuminating surface 3 and 3R.

Hp—Protruding part of the opaque cover or extra piece, with respect to the illuminating surface 3 as protection from external incident light LI and impacts.

Hd—Protection distance or over-level of the protruding opaque part with respect to the illuminating surface 3.

Hx—Protruded part of the opaque general cover H, Hc, which houses the radar blind spot lateral detection warning device Bs, (BLIS), located at a recessed level with respect to the frame and develops beyond line 0 towards the body of the vehicle at the point closest to the driver's eyes DV.

itv—Shared electronic cam vision interface for more than one camera or for other functions such as radio frequency emission or infrared IR lighting, LS laser emitter or logo projector. or courtesy light. Pr/Lc.

Lc/Pr—Courtesy light or complementary light or welcome light capable of projecting a Logo or icon on the side floor of the vehicle.

LI—external incident light capable of invading any reflector-transmitter (light guide, parabola, or optics) as external stray light.

LIR—External incident light, reflected or rejected by the protections, the external transparent 1 or the cover H, Hc in protrusion or projection above the illuminating surface 3.

LL—Laser line projected from the side vision device on the side floor of the vehicle, which indicates before opening the doors and when stopped, to where the doors are opened Ls—Laser projector or laser image logo.

MM—Unified module that integrates the front ScF and rear side ScR cameras standardized with a single interface that can be associated with other functions.

M—Monitors associated with the cams, visible by the DV driver in a normal driving position.

Mo—Mirror position actuator motor M1.

Mx—Housing opening for the indirect vision mirror or cam element.

M1—Main mirror. (Mirror)

M2—Supplementary mirror or spoter or convex area of expanded vision, aspherical sector of the mirror MZ1—Field of view area of the main side mirror.

MZ2—Zone of the field of vision of the spoter or supplementary convex curved mirror capable of expanding the field of vision from the side, part of the same spherical side mirror associated with MZ1.

NV—Line of NO vision or zero vision of the driver DV of zone 99 that is close to what the driver's opposite wheel is stepping on.

Oa—Optics for coupling to the reflector body-transmitter 150.

Ox—Vertical axis that passes through the front or rear camera lens.

PH1—Coupling phase of the light source 30 to the reflector 50

PH1', PH1"—Alternative coupling phases with LEDs 30 with LEDs that have an integrated optics emitting perpendicular to the mounting or "L" mounting, or LEDs mounting in a double-sided circuit 20 with focus of the light source, LEDs 30 in opposite directions and are coupled by intrusion, within the reflector 50.

PH2—Light output phase that comprises an advanced optical-reflector profile, generates the ray-axis 34 derived from the inclined output reflection surface R2 or secondary reflector to generate output or emission of the final horizontal signal E1 through the illuminating surface 3 and its sectors 3a, 3b, 3c, 3n, 3R.

RZ—Detection zone of the lateral radars on the left and right capable of detecting objects 97 advancing and overcoming the position of the vehicle from rear to front and beyond the lateral field of vision of the side mirror MZ1 and MZ2.

RcS—Rear View Camera Indirect Vision System.

RS—Backward signal and illuminated field that complements the front signal FS to define a mixed drive signal from the same multifunctional signal device DS, dynamic forward through sectors 3a, 3b, 3c, . . . 3n, and repetitive backward through a single 3R sector. (Rear signal).

S1, S2, S3 . . . . Sn—Sectors of the field illuminated by the signal emitted to the lateral front FS, capable of being activated dynamically in response to a sequence, independent of each other and independent of the activation of the backward signal RS which is repetitive and without differentiated sectors.

Sr—Sector of the illuminated signal field backwards with respect to the vehicle's circulation axis 100, and whose focal axis is the official photometry axis, 5° in the horizontal plane according to UNECE/UN Regulation R6, for a class 5 flashing signal device.

Sf—Sector of the illuminated signal field forward with respect to axis 100.

Ss—Sector of the field illuminated towards the side with respect to the 100 axis.

SS—Side marker light.

ScF—Sietma front focus side camera.

ScR—Side Rear Focus Camera System

ScS—Third side-facing camera of the VIS system, capable of capturing images of the side of the vehicle in front of the access door, recognizing images for security with remote monitoring, activating access to the vehicle as a replacement or complement to the RFID sensor vehicle access control, said images are stored in a memory inside the vehicle 75.

ScM—Multiple camera system with more than one camera, interface. Integrated electronics capable of adding other complementary lighting functions: infrared, IR, 66 or radio frequency emitters, laser light emitter.

tgs—Upper tangent passing through the upper limit of the viewing mirror M1.

tgi—Inferior tangent that handles the lower limit of the viewing mirror M1.

T3—Third of the VIS assembly furthest from the body with respect to vertical cutting planes, and the opening that houses the mirror M, where it has the surface 3R that emits the signal in the rearward direction SR.

T1—Third of the assembly closest to the bodywork.

T2—Middle third.

T0—Area in protrusion or above-level with respect to the VIS body casing, with initial point in the frame 80 and the vertical line 0, and located towards the body C, which houses the warning signal of the vehicle detection system. blind angle BLIS, BS, activated by sensors and radars preferably located in the upper area, closest to the DV driver's eyes, also capable of improving aerodynamic turbulence.

V—Vertex of the parabola.

VB—BLIS vision or indicator activated by the detection of lateral radars or other sensors of objects approaching from the side inside or outside the field of view of the lateral indirect vision device.

VC—Reference focal axis oriented to the driver's eyes DV of the mirror locator device M1 located on the inner side of the 80x frame of the rearview mirror M1, acts as an assistant in;

a first function to center the image when activating the turn signal with an anti-stress effect in the anticipated turning maneuver action.

a second function at a different frequency associated with the commands, handles and an activation controller before and during the opening of the doors together with an internal and/or external audible warning 58.

VIS—Mixed indirect vision system consisting of a side mirror and/or cam. (Vision Indirect System)

Vm—It is the driver's vision from the normal driving position of the field of vision captured by the mirror, without taking his eyes off the road in front.

VD90—It is the direct vision of the driver from the normal driving position, turning the head approximately 90° and dangerously looking ahead while driving.

X—Axis parallel to the axis of circulation of the vehicle.

Y—Axis perpendicular and horizontal to the axis of circulation of the vehicle.

Z—Vertical axis perpendicular to the vehicle's circulation axis and the XY horizontal plane.

Z=−1—Determines the XY plane at ground level.

Z=0—Determines the.

ZR—Zoom detail of optical solution to enlarge the signal emission area at the rear RS located in the farthest third of the body.

The invention claimed is:

1. Indirect vision system with multifunctional hidden reflector signal for vehicles, comprising:

A structure projected into the lateral vacuum of a vehicle formed by a casing body, a frame and a support arm fixed to the body, with at least one opening occupied by a rearview mirror, a camera and/or a combination thereof to reflect, capture or transmit direct and indirect images;

A multifunctional luminous signal device that emits in at least two associated zones, an external zone towards the rear and another external zone to the front-side, characterized in that it has a complex optical-reflector body that comprises:

A reflective substrate associated with a multipoint light source, in the form of a transparent elongated solid substrate, integrated by a plurality of sectors in a single complex optical-reflector body that substantially copies in parallel the interior shape of the housing that contains it like a second internal skin, A light entry phase with light control means with at least one light entry point of said source in each sector capable of deflecting the light from the source axis until it coincides with a guideline ray axis of reference of said reflective substrate, A position of said reflective substrate and the associated source located behind said housing or associated opaque cover, hidden, eclipsed and free from the incidence of external stray light, A secondary light output reflector comprises an inclined reflecting surface interposed in said reflecting substrate that generates a change in direction in the light and in the shape of the substrate, A light output phase with an advanced horizontal optical-reflector profile with a horizontal ray-axis, said advanced profile ends in an external illuminating surface made up of sectors arranged in al at least one opening associated with the housing capable of generating a multifocal light output of mixed activation consistent with the integrated sectors of said reflective substrate;

At least one transverse reference ray axis that crosses the width of said elongated reflecting substrate, originating in a source axis limited between two lateral surfaces of tangential reflection, substantially parallel to each other that form said substrate reflector to associate and direct a series of direct, reflected, sub-reflected rays similar to said reference ray-axis in a direction substantially perpendicular to said secondary reflector, which generates a change of direction between 0° and 90° to produce at least a horizontal ray axis oriented to said illuminating surface, capable of emitting a signal with at least one horizontal reference focal axis;

A mixed multifocal polyfunctional signal emission in two different focus areas visible by the environment surrounding the EV vehicle, comprising;

a first external monofocal rearward emission zone with a horizontal rearward focal axis with the optical-reflective means that generate it arranged in the third furthest from the body and, a second external front-lateral emission zone with several horizontal focal axes, with the optical-reflective means and interface that generate it, upstream of the aperture of the mirror, behind the mirror on the casing, according to a horizontal plane between an upper tangent and a lower tangent to said mirror.

2. Indirect vision system according to claim 1 characterized in that the housing body H when it uses mirrors, is a block divided vertically into three vertical third blocks being the closest to the CAR body and in two upper and lower horizontal blocks by a median plane Hm, it has a frame of homogeneous width for the blocks and an 80x widened frame for the block furthest from the body, which provides two lighting functions different, on its external side part of the signal light output backwards through the illuminating surface and horizontal reference focal axis directed backwards Sr and on its internal side an anti-stress light output with an independent illuminating surface as a locator of the mirror with a reference focal axis directed to the driver's vision, surrounded by an opaque surface part of the widening of said frame 80x.

3. Indirect vision system according to claim 1, characterized in that the hidden reflective substrate has an inclined reflection surface that occupies at least part of the perimeter of said reflective substrate, forming a perimeter surface that it is the signal output reflector that provides light with said ray-axis to the external illuminating surface, extended 3x, or integrated by sectors.

4. Indirect vision system according to claim 1, characterized in that, the external opening on the external surface of said housing, so individually or associated with the independent cover, it is configured with variants based on the design and functions of the multifunctional signal module, selectable between; at least one opening in the housing, a gap between the casing and the associated independent cover, an opening inside the cover which in turn is the geometric figure that occupies the opening, the luminous perimeter eclipses a geometric figure that surrounds the cover, more than 10% of the perimeter of an associated cover, which is the one that occupies an opening in said casing.

5. Indirect vision system according to claim 1 characterized in that, in said reflective substrate 50, when the illuminating surface 3 is linear, the reference ray-axis 33 is transverse, crossing it widthwise, said reflective substrate 50 is on one side with respect to the illuminating surface 3, it comprises at least one reflective parabola profile 40, an extended reflective parabola collimator 40c or a reflecting substrate with a similar technical reflective effect.

6. Indirect vision system according to claim 1 characterized in that the complex optical-reflector body in a vertical section when the illuminating surface is linear, represents an "L" profile, where the larger side is the main reflecting substrate, and the smaller side the advanced profile that ends in the illuminating surface.

7. Indirect vision system according to claim 1 characterized in that the complex optical-reflector body in a vertical section when the illuminating surface is a perimeter figure or two separate lines, represents an elongated "U" profile, where the base is the main reflective substrate and the upward projections are advanced profiles that end in two illuminating surfaces.

8. Indirect vision system according to claim 7 characterized in that the illuminating surface 3 comprises designs of curved, straight luminous lines, perimeter geometric figures, open, closed, regular, irregular, continuous, discontinuous or their combination.

9. Indirect vision system according to claim 1 characterized in that the hidden reflective substrate and the reflective optical appendage apply combined optical reflective correction means selectable between; smooth and polished surfaces as means of tangential reflection, the internal parabolic of a part of the perimeter of the reflecting substrate, the parabolic collimators extended, the internal covers of dark or black color at least in part to produce an external effect on the illuminating surface that is perceived as dark or black when not working, paint or a coating on the surfaces of the reflective substrate to facilitate reflection and prevent light leaks, the thickness between said tangential reflection surfaces is less than 10 mm, holes that generate interposed surfaces in the substrate in order to create internal surfaces of reflection, retro-reflection, sub-reflectors, or etched surfaces to produce diffuse light and diffuse reflections and direct rays, reflected.

10. Indirect vision system according to claim 1, characterized in that the source axis that generates the backward signal is positioned between 0° and 90° with respect to the horizontal reference axis of backward emission and configures an optical body, integrated reflector that provides the rearward signal part with optical-reflective means that generate said rearward axis selectable between;

a reflective substrate with gaps that form a parabolic subreflector,
  a reflection surface placed before the source axis,
  a emission LED, direct emission, or reflected,
  a prism or an associated cover comprising an upstream metallized reflective surface,
  a external light guide, or internal.

11. Indirect vision system according to claim 1, characterized in that the signal has said perimeter linear illuminating surface in the shape of a geometric figure at least partially closed, several luminous perimeter lines or figures, independent of each other, associated with a opaque cover independent of the casing, said cover generates an eclipse effect on the reflective substrate that hides except for its reflective perimeter that comprises said illuminating surface.

12. Indirect vision system according to claim 11 characterized in that said independent lid cover is capable of being interchangeable with another different lid, selectable between being of different material, color, surface, aluminum, carbon, polycarbonate, with a decorated, partially opaque surface finishing pattern of a transparent or translucent material suitable for partially allowing light to pass through a logo, openwork, screen printing, film, light-dark subtractive method, pattern or degraded.

13. Indirect vision system according to claim 12 characterized in that said independent cover or the cover part of the housing develops several selectable and combinable functions between having;

a catadioptric substrate,
  a depression area to generate an aerodynamic channel and direct the air outwards,
  a protrusion area with a level above the illuminating surface, especially in the rear signal part RS close to the third third to avoid bumps and scratches;
  an level zone that defines a distance above the illuminating surface and the rest of the housing, especially in the third, at the farthest end of the vehicle body to avoid bumps and scratches,
  a part in another material, composite or bi-material with an elastomeric cover capable of sponging to absorb shocks,
  a logo, in low relief, openwork or added, translucent in bi-material or screen printed,
  an area of opaque cover at the level of the illuminating surface and the rest of the housing, above the reflector and the transparent cover at the transition between the front signal part and the rear, or between their sectors when they are linear sectors or separate figures.

14. Indirect vision system according to the claim 1, characterized in that the multifocal polyfunctional signal device has mixed dynamic-repetitive activation, with respect to the vehicle's circulation axis it combines; a repetitive activation with a frequency of 90+/−31 cycles per minute (bpm) with a dynamic zone, comprising;

a monofocal rear zone with a rear reference axis, which extends from −5° to more than 60°, repetitive and an area oriented to the eyes of the driver of the vehicle by an independent illuminating surface with a reference focal axis such as spanning from −5° to −90°, repetitive, combined with,
  a multifocal front zone of dynamic activation with at least reference focal axes, ranging from 60° to more than 180°, of dynamic activation that begins when activating the focal axis closest to the body to the farthest focal axis, keeping all focal axes on at the end of the cycle for at least 200 milliseconds before turning off, synchronized each cycle with the repetitive zones and.

15. Indirect vision system according to claim 1 characterized in that the light source circuit is capable of including other functions or part of the interface of other functions selectable between;

an radio frequency antenna,
  an integrated radio frequency amplifier circuit, integrated on the other side of said circuit or separately and its connectors,
  a GPS or Bluetooth locator circuit,
  a metal base metal plate or temperature dissipating element,
  the interface of a front camera and the camera,
  infrared lights to support the night vision of said camera,
  a dynamic activation frequency controller circuit that controls at least 3 LEDS,
  a circuit to accelerate the activation frequency to more than >120 bpm for a second function of the same door opening advance warning signal device,
  a cut-off diode to separate the operation of the DS signal from the rest of the vehicle's turn signals,
  other LEDs of different light color, wavelength or RGB so that the same illuminating surface develops another function,
  an activation circuit associated with emergency braking.

16. Indirect vision system according to claim 1, characterized in that it is multifunctional capable of associating other functions in the space included within the surface surrounded by said perimeter illuminating surface, under the independent cover or in the free space between the housing and the reflective substrate hidden or in a separate module in the housing for emission or downward viewing functions or in the bracket selectable from;

another lighting device such as smart light, corner light, or cornering light or auxiliary light for slow maneuvers,
  a temperature sensor
  an RFID 54 reader (radio frequency identification),
  a matrix keyboard for access key, activation or door opening,
  an front camera with forward focus to see the rolling area of the front wheel, especially the one opposite to the driver,
  an IR infrared light to support the night vision of any camera,
  a laser projector, which uses a coherent light laser LED that has a collimated optic that generates a plurality of rays and projects a light line, parallel and separated from the vehicle, to indicate how far the doors are opened,
  an image projector by subtractive method that uses an LED light source, a film to project a logo or an indication on the side floor of the vehicle,
  a side welcome or security light,
  a sound signal emitting device or buzzer, or mini speaker,

a side marker light, with a lateral focal axis of reference, a keyboard matrix for vehicle access code.

17. Indirect vision system according to claim 1 characterized in that it assigns, combines and associates devices from another system and the VIS system with each other with another activation frequency to provide a second function independent of the intermittent signal and generate a system advance warning of door opening to visually and audibly warn the external environment and the vehicle occupants, it works;

before opening the door associated with an actuator-sensor-detector on the door handles, the signal at an accelerated activation frequency greater than 120 bpm, by means of an independent controller, activates only the signal, cutting off the activation by means of an interposed diode or interface with a similar effect to the rest of the vehicle's turn signals for that side, a laser projector that projects a laser line on the side floor of the vehicle to indicate how far the front doors or rear doors are opened, a sound buzzer directed to the external environment, simultaneously alerts vehicle occupants visually and soundly;

said anti-stress locator, the internal buzzer which may have other applications, an interior light preferably located on the interior panel of the door in question, the optionally associated BLIS warning device.

18. Indirect vision system according to claim 17 characterized in that the same device is capable of performing another independent function such as BLIS, alternative blind angle presence detection warning with the same complex optical-reflector body separating the area of front signal of the rear signal zones associated with the anti-stress locator, comprises the transmittance cut-off, a circuit with a cut-off interface to activate the independent part on another frequency and associate the activation with the BLIS system and the radars.

19. Indirect vision system according to claim 1, characterized in that the multifunctional multifocal signal device comprises a set of internal parts and opaque background cover that has a technical effect on the illuminating surface and reflection, preventing leakage of light, giving color or not to said surface or generating a diffuse light, selectable between;

a treatment covered with reflective paint, aluminum, titanium dioxide, or a reflective film, a dark or black background surface of the reflector, a background surface cover, paint or colored or white film, an interposed surface or gaps or part of the parabola profile or side surfaces with etched or diffuse surface treatment to generate diffuse light.

* * * * *